United States Patent

Sugimura et al.

Patent Number: 6,136,743
Date of Patent: Oct. 24, 2000

[54] OLEFIN POLYMERIZATION CATALYST, OLEFINS POLYMERIZATION METHODS, AND OLEFIN POLYMER COMPOSITIONS, AND HEAT MOLDED PRODUCTS

[75] Inventors: Kenji Sugimura; Kiyotaka Yorozu; Yasuhiko Suzuki; Tetsuo Hayashi; Shin-ya Matsunaga, all of Yamaguchi, Japan

[73] Assignee: Mitsui Chemicals, INC., Tokyo, Japan

[21] Appl. No.: 09/155,876

[22] PCT Filed: Apr. 9, 1997

[86] PCT No.: PCT/JP97/01217

§ 371 Date: Oct. 7, 1998

§ 102(e) Date: Oct. 7, 1998

[87] PCT Pub. No.: WO97/38024

PCT Pub. Date: Oct. 16, 1997

[51] Int. Cl.⁷ .............. C08F 4/653; C08F 4/646
[52] U.S. Cl. .......... 502/113; 502/108; 502/117; 526/114; 526/116; 526/119; 525/268; 525/270
[58] Field of Search ................... 502/113, 108, 502/117; 528/114, 116, 119; 525/268, 270

[56] References Cited

U.S. PATENT DOCUMENTS

| | | | |
|---|---|---|---|
| 5,145,818 | 9/1992 | Tsutsui et al. | 502/113 |
| 5,840,808 | 11/1998 | Sugimura et al. | 525/268 |

FOREIGN PATENT DOCUMENTS

| | | |
|---|---|---|
| 0454231A2 | 10/1991 | European Pat. Off. . |
| 874005A1 | 10/1998 | European Pat. Off. . |
| 5-194636 | 8/1993 | Japan . |
| 8-081515 | 3/1998 | Japan . |
| 4-227608 | 8/1998 | Japan . |
| WO96 23010 | 8/1996 | WIPO . |
| WO98 30609 | 7/1998 | WIPO . |
| WO98 42664 | 10/1998 | WIPO . |
| WO98 42665 | 10/1998 | WIPO . |

OTHER PUBLICATIONS

L.K.Johnson et al., "New Pd(II)–and Ni(II)–Based Catalysts for Polymerization of Ethylene and α–Olefins", J. Am. Cem. Soc., 1995, 117, pp. 6414–6415.

Primary Examiner—Yogendra Gupta
Assistant Examiner—Derrick G. Hamlin
Attorney, Agent, or Firm—Birch, Stewart, Kolasch & Birch, LLP

[57] ABSTRACT

The invention provides catalysts which have a high polymerization activity, enable the obtaining of olefin polymers of wide molecular weight distribution, and which comprise (a)(a-1) a metallocene compound or (a-2) a titanium catalyst component containing magnesium, titanium, and halogen, (b) a compound of a transition metal from Groups 8 to 10 of the periodic table and is of the general formula shown below, and a cocatalyst component.

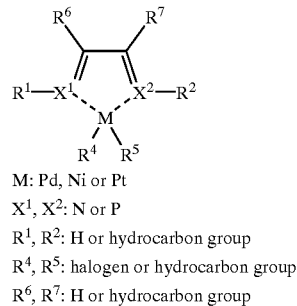

M: Pd, Ni or Pt
$X^1, X^2$: N or P
$R^1, R^2$: H or hydrocarbon group
$R^4, R^5$: halogen or hydrocarbon group
$R^6, R^7$: H or hydrocarbon group The invention also provides olefin polymer compositions excellent in rigidity and impact resistance which can be produced using a catalyst comprising the transition metal compound (b) and which comprises a non-crystalline olefin polymer having a specific intrinsic viscosity, glass transition temperature and density, and another known olefin polymer.

15 Claims, 1 Drawing Sheet

FIG. 1

Transition metal compound of Group 4 containing a ligand having a cyclopentadienyl skeleton,
or
Titanium catalyst component containing magnesium, titanium and halogen as the essential components

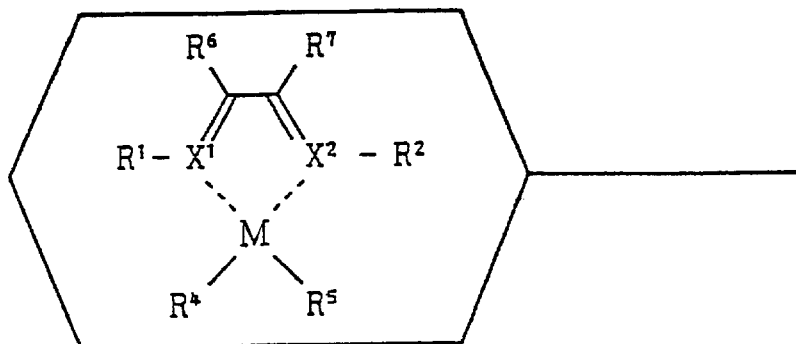

M: Pd, Ni or Pt
$X^1$, $X^2$: N or P
$R^1$, $R^2$: H or hydrocarbon group
$R^4$, $R^5$: halogen or hydrocarbon group
$R^6$, $R^7$: H or hydrocarbon group Olefin At least one selected from Organic aluminum-oxy compoundes, Alkylboronic acid derivatives and Ionizing ionic compounds ( Organometallic compound )

(Fine particulate) carrier

OLEFIN POLYMERIZATION CATALYST, OLEFINS POLYMERIZATION METHODS, AND OLEFIN POLYMER COMPOSITIONS, AND HEAT MOLDED PRODUCTS

This application is the national phase under 35 U.S.C. §371 of prior PCT International Application No. PCT/JP97/01217 which has an International filing date of Apr. 9, 1997 which designated the United States of America, the entire contents of which are hereby incorporated by reference.

TECHNICAL FIELD OF THE ART

The present invention concerns olefin polymerization catalysts and olefin polymerization methods using the catalysts and also concerns olefin polymer compositions and heat molded products. To be more specific, the present invention concerns new olefin polymerization catalysts that exhibit high polymerization activity and enable the obtaining of olefin copolymers of wide molecular weight distribution and olefin polymerization methods using the catalysts, and also concerns olefin polymer compositions having excellent mechanical properties as well as excellent molding properties (moldability), and heat molded products obtained by heat molding the compositions.

BACKGROUND ART

Titanium catalysts which comprise a solid titanium catalyst component containing magnesium, titanium, halogen, and if necessary, an electron donor, and an organic aluminum compound, and vanadium catalysts which comprise a vanadium compound and an organic aluminum compound, have conventionally been known as catalysts for producing olefin polymers such as ethylene polymers, propylene polymers, ethylene-α-olefin copolymers, etc. Also, Ziegler catalysts comprising a metallocene compound such as zirconocene, and an organic aluminum oxycompound (aluminoxane), have been known as catalysts that can be used to manufacture olefin polymers with a high polymerization activity. Furthermore, olefin polymerization catalysts comprising a nickel compound or a palladium compound and a cocatalyst such as aluminoxane, an ionic compound, etc., have been proposed recently as new olefin polymerization catalysts (J. Am. Chem. Soc. 1995, 117, 6414–6415).

Ethylene polymers, propylene polymers, and other olefin polymers are used as molding materials for various needs due to their excellent properties such as mechanical strength, heat resistance, transparency, chemical resistance, etc. Such olefin polymers are thus required to have good molding properties (moldability).

However, though the above-mentioned catalysts comprising a nickel compound or palladium compound and a cocatalyst exhibit high polymerization activity, the olefin polymers obtained using the catalysts are narrow in molecular weight distribution and thus do not necessarily have good molding properties (moldability). Improved catalysts comprising a nickel compound or palladium compound and cocatalyst which can produce olefin polymers of wide molecular distribution and excellent molding properties (moldability), without decreasing the high polymerization activity, have thus been desired.

Olefin polymers having excellent physical properties mentioned above are desired for use in a wide range of applications, and the desired physical properties differ according to the application. For example, in producing films from an olefin polymer, the olefin polymer requires excellent melt tension in order to prevent drawdown, etc., and the resulting films require good impact resistance, heat resistance, etc.

Furthermore, physical properties of olefin polymers are modified according to application. For example, propylene block copolymers, having both a crystalline polypropylene component and a rubber component, are known as materials that provide improvement in the impact resistance of crystalline polypropylenes. Japanese laid-open patent publication No. 4-337308 discloses a method of producing polypropylene block copolymers that exhibit an excellent balance of impact resistance and rigidity by the use of catalysts containing a silylene group bridge type metallocene compound as a catalytic component.

There are also known methods of forming polypropylene compositions by blending a rubber material such as non-crystalline polyethylene, non-crystalline or low-crystalline ethylene-propylene random copolymer, polyisobutylene or polybutadiene, as an impact resistance modifier, in crystalline polypropylene. For example, Japanese laid-open patent publication No. 5-202152 discloses a method of obtaining a polypropylene molding material of excellent low-temperature impact strength from a crystalline propylene polymer and a non-crystalline ethylene-propylene copolymer (EPR), wherein the EPR that is used is produced using a catalyst comprising a specific bridge type metallocene compound and aluminoxane.

Furthermore, the blending of atactic polypropylene as a modifier in polypropylene has been proposed, for example, in Japanese laid-open patent publication No. 6-263934.

There are also known methods in which an inorganic filler, such as talc, etc., is blended in a polypropylene composition to compensate for the lowering of rigidity that accompanies the addition of an impact resistance modifier.

In view of the prior art described above, the present inventors have examined catalysts that have high polymerization activity and enable the obtaining of olefin polymers of wide molecular weight distribution and excellent molding properties (moldability), and found that olefin polymers of wide molecular weight distribution can be obtained with a high polymerization activity when olefins are polymerized using a catalyst comprising the above-mentioned nickel compound or palladium compound, (i) a metallocene compound or (ii) a titanium catalyst component containing magnesium, titanium, and halogen as the essential components, and a cocatalyst such as aluminoxane, an ionic compound, etc.

The present inventors have furthermore examined olefin polymer compositions suitable as heat molding materials in view of the prior art described above and found that compositions formed from a non-crystalline olefin polymer which is produced using an olefin polymerization catalyst comprising the above-mentioned nickel compound or palladium compound and a cocatalyst, such as aluminoxane, an ionic compound, etc., and which has an intrinsic viscosity, glass transition temperature, and density within specific ranges, and another known olefin polymer, exhibit excellent rigidity and excellent impact resistance and are suitable as heat molding materials. The present inventors have also found that compositions formed from a crystalline olefin polymer which is produced using an olefin polymerization catalyst comprising the above-mentioned nickel compound or palladium compound and a cocatalyst, such as aluminoxane, an ionic compound, etc., and which has an intrinsic viscosity, glass transition temperature, and density within specific ranges, and another known olefin polymer, exhibit excellent mechanical properties, heat resistance, and molding properties (moldability) and are suitable as heat molding materials. The present invention has been accomplished on the basis of the above findings.

DISCLOSURE OF THE INVENTION

The olefin polymerization catalysts according to the present invention comprise:

(a) (a-1) a compound of a transition metal from Group 4 of the periodic table, which contains a ligand having a cyclopentadienyl skeleton, or (a-2) a titanium catalyst component containing magnesium, titanium, and halogen, (b) a compound of a transition metal from any of Groups 8 to 10 of the periodic table, expressed by the general formula (I) below, (c) at least one compound selected from among (c-1) organic aluminum oxycompounds, (c-2) alkylboronic acid derivatives, and (c-3) compounds reacting with the transition metal compound to form an ion pair, and if necessary, (d) an organometallic compound:

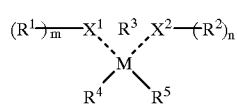

(I)

wherein M indicates a transition metal from any of Groups 8 to 10 of the periodic table, $X^1$ and $X^2$ may be the same as or different from each other and are each a nitrogen atom or a phosphorus atom, $R^1$ and $R^2$ may be the same as or different from each other and are each a hydrogen atom or hydrocarbon group, m and n may be the same as or different from each other and are each a value of 1 or 2 that satisfies the valence of $X^1$ and $X^2$, respectively, $R^3$ is a group that binds $X^1$ and $X^2$ and indicates

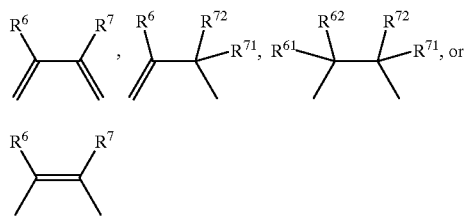

(where $R^6$, $R^7$, $R^{61}$, $R^{62}$, $R^{71}$, and $R^{72}$ may be the same as or different from each other and are each a hydrogen atom or hydrocarbon group), $R^4$ and $R^5$ may be the same as or different from each other and are each a hydrogen atom, halogen atom, hydrocarbon group, $-OR^8$, $-SR^9$, $-N(R^{10})_2$, or $-P(R^{11})_2$ (where each of $R^8$ to $R^{11}$ indicates an alkyl group, cycloalkyl group, aryl group, aralkyl group, or organic silyl group, the groups $R^{10}$ may be bonded mutually to form a ring, the groups $R^{11}$ may be bonded mutually to form a ring), and $R^4$ and $R^5$ may be bonded to each other to form a ring, and two or more among $R^1$, $R^2$, $R^6$ (or $R^{61}$, $R^{62}$), and $R^7$ (or $R^{71}$, $R^{72}$) may be bonded to each other to form a ring.

In the present invention, it is preferable that the transition metal compound expressed by the general formula (I) given above is a compound of the following general formula (I'):

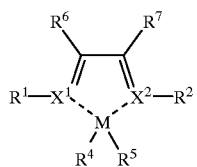

(I')

wherein M, $X^1$, $X^2$, $R^1$, $R^2$, $R^4$, $R^5$, $R^6$ and $R^7$ are the same as those in the general formula (I).

The olefin polymerization catalysts of the present invention exhibit high polymerization activity and enable the obtaining of olefin polymers with a wide molecular weight distribution.

The olefin polymerization methods according to the present invention are characterized in that an olefin is polymerized or copolymerized in the presence of the catalysts described above.

The olefin polymer compositions according to the present invention are olefin polymer compositions (olefin polymers) obtained by the methods described above. Such an olefin polymer composition has a wide molecular weight distribution and is excellent in molding properties (moldability).

Olefin polymer compositions comprising (A-1) 99 to 1 weight parts of a non-crystalline olefin polymer which is produced using a catalyst containing a transition metal compound (b) of the general formula (I) indicated above and which has (1) an intrinsic viscosity [η] within the range of 0.5 to 20 dl/g, as measured in decalin at 135° C., (2) a glass transition temperature (Tg) of −40° C. or less, as measured by a differential scanning calorimeter (DSC), and (3) a density of 0.88 g/cm$^3$ or less; and (B) 1 to 99 weight parts of at least one olefin polymer produced using a catalyst other than that mentioned above, can be given as another embodiment of the olefin polymer compositions according to the present invention.

Such an olefin polymer composition is excellent in molding properties (moldability) and the heat molded products obtained by heat molding this olefin polymer composition are excellent in ridgidity characteristics such as tensile modulus and mechanical characteristics such as impact resistance.

Olefin polymer compositions comprising (A-2) 99 to 1 weight parts of a crystalline olefin polymer which is produced using a catalyst containing a transition metal compound (b) of the general formula (I) indicated above, and which has (1) an intrinsic viscosity [η] within the range of 0.5 to 20 dl/g, as measured in decalin at 135° C., (2) a melting point (Tm) of 60° C. or more, as measured by a differential scanning calorimeter (DSC), and (3) a density of 0.88 g/cm$^3$ or more; and (B) 1 to 99 weight parts of at least one olefin polymer produced using a catalyst other than that mentioned above, can be given as yet another embodiment of the olefin polymer compositions of the present invention.

Such an olefin polymer composition is excellent in molding properties (moldability) and the heat molded products obtained by heat molding this olefin polymer composition are excellent in mechanical characteristics and heat resistance.

The above-mentioned olefin polymer (B) in the olefin polymer compositions according to the present invention may be a polymer produced using a catalyst comprising, for example, (a) (a-1) a compound of a transition metal from Group 4 of the periodic table, which contains a ligand having a cyclopentadienyl skeleton, or
   (a-2) a titanium catalyst component containing magnesium, titanium, and halogen,
(c) at least one compound selected from among (c-1) organic aluminum oxycompounds, (c-2) alkylboronic acid derivatives, and (c-3) compounds reacting with the transition metal compound to form an ion pair, and if necessary,
(d) an organometallic compound.

BRIEF DESCRIPTION OF THE DRAWINGS

FIG. 1 is an explanatory drawing which shows one example of the producing process for the olefin polymerization catalysts according to the present invention.

BEST MODE FOR CARRYING OUT THE INVENTION

The olefin polymerization catalysts, olefin polymerization methods using the catalysts, olefin polymer compositions and heat molded products made by heat molding the composition according to the present invention shall now be described specifically.

In the present specification, the term "polymerization" may refer not only to homopolymerization but also to copolymerization inclusively and the term "polymer" may refer not only to a homopolymer but also to a copolymer inclusively.

The olefin polymerization catalysts according to the present invention are formed from:

(a) (a-1) a compound of a transition metal from Group 4 of the periodic table, which contains a ligand having a cyclopentadienyl skeleton, or
   (a-2) a titanium catalyst component containing magnesium, titanium, and halogen,
(b) a compound of a transition metal from any of Groups 8 to 10 of the periodic table,
(c) at least one compound selected from among (c-1) organic aluminum oxycompounds, (c-2) alkylboronic acid derivatives, and (c-3) compounds reacting with the transition metal compound to form an ion pair, and if necessary,
(d) an organometallic compound.

First, the respective catalyst components that form the olefin polymerization catalysts of the present invention shall be described.

(a-1) Compound of a Transition Metal from Group 4 of the Periodic Table

The compound (a-1) of a transition metal from Group 4 of the periodic table that is used in the present invention is a transition metal compound that contains a ligand having a cyclopentadienyl skeleton of the following general formula (II-1):

$$M^1L_x \ldots \quad (II\text{-}1)$$

In the above formula, $M^1$ indicates a transition metal atom selected from among Group 4 of the periodic table. To be more specific, $M^1$ is zirconium, titanium, or hafnium and is preferably zirconium.

x indicates the valence of transition metal atom $M^1$ and indicates the number of ligand L coordinated to transition metal atom $M^1$.

L indicates a ligand coordinated to the transition metal atom and at least one ligand L is a ligand having a cyclopentadienyl skeleton and L other than the ligand having a cyclopentadienyl skeleton is a hydrocarbon group of 1 to 20 carbon atoms, a halogenated hydrocarbon group of 1 to 20 carbon atoms, an oxygen-containing group, a sulfur-containing group, a silicon-containing group, a halogen atom, or a hydrogen atom.

Alkyl-substituted cyclopentadienyl groups, such as cyclopentadienyl group, methylcyclopentadienyl group, dimethylcyclopentadienyl group, trimethylcyclopentadienyl group, tetramethylcyclopentadienyl group, pentamethylcyclopentadienyl group, ethylcyclopentadienyl group, methylethylcyclopentadienyl group, propylcyclopentadienyl group, methylpropylcyclopentadienyl group, butylcyclopentadienyl group, methylbutylcyclopentadienyl group, hexylcyclopentadienyl group, etc., as well as indenyl group, 4,5,6,7-tetrahydroindenyl group, fluorenyl group, etc., may be given as examples of ligands having a cyclopentadienyl skeleton. These groups may be substituted by a (halogenated) hydrocarbon group of 1 to 20 carbon atoms, an oxygen-containing group, a sulfur-containing group, a silicon-containing group, a halogen atom, etc.

If the compound expressed by the above general formula (II-1) contains two or more ligands having a cyclopentadienyl skeleton, two of such ligands having a cyclopentadienyl skeleton may be bonded to each other via a divalent bonding group such as a (substituted) alkylene group, a (substituted) silylene group, etc. Transition metal compounds of the general formula (II-3), to be described later, may be given as examples of the transition metal compounds in which two ligands having a cyclopentadienyl skeleton are bonded via a divalent bonding group.

The following specific examples can be given as the ligands L other than those having a cyclopentadienyl skeleton.

That is, examples of hydrocarbon groups having 1 to 20 carbon atoms include alkyl groups, cycloalkyl groups, alkenyl groups, arylalkyl groups, aryl groups, etc., and to be more specific, alkyl groups, such as methyl, ethyl, propyl, butyl, hexyl, octyl, nonyl, dodecyl, eicosyl, etc.;

cycloalkyl groups, such as cyclopentyl, cyclohexyl, norbornyl, adamantyl, etc.;

alkenyl groups, such as vinyl, propenyl, cyclohexenyl, etc.;

arylalkyl groups, such as benzyl, phenylethyl, phenylpropyl, etc.; and aryl groups, such as phenyl, tolyl, dimethylphenyl, trimethylphenyl, ethylphenyl, propylphenyl, biphenyl, naphthyl, methylnaphthyl, anthryl, phenanthryl, etc.

The above-mentioned hydrocarbon groups of 1 to 20 carbon atoms which are substituted by a halogen or halogens may be given as examples of halogenated hydrocarbon groups of 1 to 20 carbon atoms.

Hydroxyl group; alkoxy groups, such as methoxy, ethoxy, propoxy, butoxy, etc.; aryloxy groups, such as phenoxy, methylphenoxy, dimethylphenoxy, naphthoxy, etc.; and arylalkoxy groups, such as phenylmethoxy, phenylethoxy, etc., can be given as examples of oxygen-containing groups.

The above-mentioned oxygen-containing groups in which the oxygen is replaced by sulfur, as well as sulfonate groups, such as methylsulfonate, trifluoromethylsulfonate, phenylsulfonate, benzylsulfonate, p-toluenesulfonate, trimethylbenzenesulfonate, triisobutylbenzenesulfonate, p-chlorobenzenesulfonate, pentafluorobenzenesulfonate, etc.; and sulfinate groups, such as methylsulfinate, phenylsulfinate, benzylsulfinate, p-toluenesulfinate, trimethylbenzenesulfinate, pentafluorobenzenesulfinate, etc., can be given as examples of sulfur-containing groups.

Monohydrocarbon-substituted silyls, such as methylsilyl, phenylsilyl, etc.; dihydrocarbon-substituted silyls, such as dimethylsilyl, diphenylsilyl, etc.; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl, trinaphthylsilyl, etc.; silyl ethers of hydrocarbon-substituted silyls, such as trimethylsilyl ether, etc.; silicon-substituted alkyl groups, such as trimethylsilylmethyl, etc.; and silicon-substituted aryl groups, such as trimethylphenyl, etc.; can be given as examples of silicon-containing groups.

Fluorine atom, chlorine atom, bromine atom, iodine atom, etc., can be given as examples of halogen atoms.

The transition metal compounds wherein the valence of the transition metal is 4 are indicated more specifically, for example, by the following general formula (II-2):

$$R^{31}R^{32}R^{33}R^{34}M^1 \ldots \qquad (II-2)$$

In the above formula, $M^1$ indicates a transition metal atom selected from among elements of Group 4 of the periodic table as mentioned above, and is preferably a zirconium atom.

$R^{31}$ indicates a group (ligand) with a cyclopentadienyl skeleton, and $R^{32}$, $R^{33}$, and $R^{34}$ may be the same as or different from each other and are each a group (ligand) having a cyclopentadienyl skeleton, (halogenated) hydrocarbon group of 1 to 20 carbon atoms, oxygen-containing group, sulfur-containing group, silicon-containing group, halogen atom, or hydrogen atom.

In the present invention, it is preferable to use as the transition metal compound indicated by the above general formula (II-2), a compound in which at least one among $R^{32}$, $R^{33}$, and $R^{34}$ is a group (ligand) having a cyclopentadienyl skeleton, for example, a compound in which $R^{31}$ and $R^{32}$ are groups (ligands) having a cyclopentadienyl skeleton. Also in the case where $R^{31}$ and $R^{32}$ are groups (ligands) having a cyclopentadienyl skeleton, it is preferable for each of $R^{33}$ and $R^{34}$ to be a group having a cyclopentadienyl skeleton, an alkyl group, a cycloalkyl group, an alkenyl group, an arylalkyl group, an aryl group, an alkoxy group, an aryloxy group, a trialkylsilyl group, a sulfonate group, a halogen atom, or a hydrogen atom.

Specific examples of transition metal compounds expressed by the above general formula (II-1) in which $M^1$ is zirconium include:

bis(indenyl)zirconium dichloride,
bis(indenyl)zirconium dibromide,
bis(indenyl)zirconium bis(p-toluenesulfonate),
bis(4,5,6,7-tetrahydroindenyl)zirconium dichloride,
bis(fluorenyl)zirconium dichloride,
bis(cyclopentadienyl)zirconium dichloride,
bis(cyclopentadienyl)zirconium dibromide,
bis(cyclopentadienyl)methylzirconium monochloride,
bis(cyclopentadienyl) ethylzirconium monochloride,
bis(cyclopentadienyl) cyclohexylzirconium monochloride,
bis(cyclopentadienyl)phenylzirconium monochloride,
bis(cyclopentadienyl)benzylzirconium monochloride,
bis(cyclopentadienyl) zirconium monochloride monohydride,
bis(cyclopentadienyl)methylzirconium monochloride monohydride,
bis(cyclopentadienyl)dimethylzirconium,
bis(cyclopentadienyl)diphenylzirconium,
bis(cyclopentadienyl)dibenzylzirconium,
bis(cyclopentadienyl)zirconium methoxychloride,
bis(cyclopentadienyl)zirconium ethoxychloride,
bis(cyclopentadienyl)zirconium bis(methanesulfonate),
bis(cyclopentadienyl)zirconium bis (p-toluenesulfonate),
bis(cyclopentadienyl)zirconium bis(trifluoromethanesulfonate),
bis(methylcyclopentadienyl)zirconium dichloride,
bis(dimethylcyclopentadienyl)zirconium dichloride,
bis(dimethylcyclopentadienyl)zirconium ethoxychloride,
bis(dimethylcyclopentadienyl)zirconium bis(trifluoromethanesulfonate),
bis(ethylcyclopentadienyl)zirconium dichloride,
bis(methylethylcyclopentadienyl)zirconium dichloride,
bis(propylcyclopentadienyl)zirconium dichloride,
bis(methylpropylcyclopentadienyl)zirconium dichloride,
bis(butylcyclopentadienyl)zirconium dichloride,
bis(methylbutylcyclopentadienyl)zirconium dichloride,
bis(methylbutylcyclopentadienyl)zirconium bis(methanesulfonate),
bis(trimethylcyclopentadienyl)zirconium dichloride,
bis(tetramethylcyclopentadienyl)zirconium dichloride,
bis(pentamethylcyclopentadienyl)zirconium dichloride,
bis(hexylcyclopentadienyl)zirconium dichloride,
bis(trimethylsilylcyclopentadienyl)zirconium dichloride, etc.

In the examples given above, the disubstituted forms of the cyclopentadienyl rings include 1,2- and 1,3-substituted forms and the trisubstituted forms include 1,2,3- and 1,2,4-substituted forms. Alkyl groups, such as propyl, butyl, etc., include n-, i-, sec-, tert-, and other isomers.

The zirconium compounds given above in which the zirconium is replaced by titanium or hafnium may also be given as other examples of transition metal compounds expressed by the above formula (II-1).

Compounds of the following formula (II-3) may be given for example as transition metal compounds in which two ligands having a cyclopentadienyl skeleton are bonded via a bivalent bonding group.

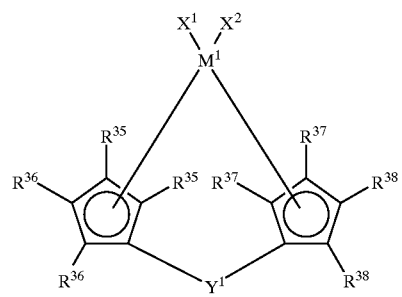

(II-3)

In the above formula, $M^1$ indicates a transition metal atom from Group 4 of the periodic table, and to be more specific, indicates zirconium, titanium, or hafnium, and is preferably zirconium.

$R^{35}$, $R^{36}$, and $R^{37}$ may be the same as or different from each other and are each a hydrocarbon group of 1 to 20 carbon atoms, halogenated hydrocarbon group of 1 to 20 carbon atoms, oxygen-containing group, sulfur-containing group, silicon-containing group, nitrogen-containing group, phosphorus-containing group, halogen atom, or hydrogen atom. Of the groups $R^{35}$, $R^{36}$, $R^{37}$, and $R^{38}$, the adjacent groups may be partially connected to form a ring together with the carbon atoms bonded to the groups. Although each of $R^{35}$, $R^{36}$, $R^{37}$, and $R^{38}$ is indicated at two positions, for example, $R^{35}$ and $R^{35}$ may be the same as or different from each other. Of the groups indicated by R, those provided with the same symbol indicate preferable combinations in cases where a ring is to be formed.

The alkyl groups, cycloalkyl groups, alkenyl groups, arylalkyl groups, aryl groups, etc., described for L can be given as examples of hydrocarbon groups of 1 to 20 carbon atoms.

Fused benzene ring, naphthalene ring, acenaphthene ring, indene ring, etc., and those in which one or more hydrogen atoms on the above-mentioned fused rings are substituted by alkyl groups, such as methyl, ethyl, propyl or butyl, can be given as examples of rings that are formed by partial connection of the adjacent groups among $R^{35}$, $R^{36}$, $R^{37}$, and $R^{38}$ together with the carbon atoms bonded to these groups.

The above-mentioned hydrocarbon groups of 1 to 20 carbon atoms which are substituted by a halogen or halogens may be given as examples of halogenated hydrocarbon groups of 1 to 20 carbon atoms.

The alkoxy groups, aryloxy groups, arylalkoxy groups, etc., described for L, and hydroxyl group can be given as examples of oxygen-containing groups.

The above-mentioned oxygen-containing groups in which the oxygen is replaced by sulfur can be given as examples of sulfur-containing groups.

The monohydrocarbon-substituted silyls, dihydrocarbon-substituted silyls, trihydrocarbon-substituted silyls, silyl ethers of hydrocarbon-substituted silyls, silicon-substituted alkyl groups, silicon-substituted aryl groups, etc., described for L can be given as examples of the silicon-containing group.

Amino group; alkylamino groups, such as methylamino, dimethylamino, diethylamino, dipropylamino, dibutylamino, dicyclohexylamino, etc.; arylamino or alkylarylamino groups, such as phenylamino, diphenylamino, ditolylamino, dinaphthylamino, methylphenylamino, etc.; can be given as examples of nitrogen-containing groups.

Phosphino groups, such as dimethylphosphino, diphenylphosphino, etc., can be given as examples of phosphorus-containing groups.

The same halogen atoms described for L can be given as examples of halogen atoms.

Among the above, hydrocarbon groups of 1 to 20 carbon atoms and hydrogen atom are preferable, and benzene rings formed by the partial connection of the adjacent groups among $R^{35}$, $R^{36}$, $R^{37}$, and $R^{38}$, and those in which one or more hydrogen atoms on the benzene ring are substituted by alkyl groups such as methyl, ethyl, n-propyl, iso-propyl, n-butyl, iso-butyl, or tert-butyl, etc., are particularly preferable.

$X^3$ and $X^4$ may be the same as or different from each other and are each a hydrocarbon group of 1 to 20 carbon atoms, halogenated hydrocarbon, group of 1 to 20 carbon atoms, oxygen-containing group, sulfur-containing group, silicon-containing group, hydrogen atom, or halogen atom.

The alkyl groups, cycloalkyl groups, alkenyl groups, arylalkyl groups, aryl groups, etc., described for L can be given as examples of hydrocarbon groups of 1 to 20 carbon atoms.

The above-mentioned hydrocarbon groups of 1 to 20 carbon atoms which are substituted by a halogen or halogens may be given as examples of halogenated hydrocarbon groups of 1 to 20 carbon atoms.

The alkoxy groups, aryloxy groups, arylalkoxy groups, etc., described for L, and hydroxyl group can be given as examples of oxygen-containing groups.

The sulfonate groups and sulfinate groups described for L and the above-mentioned oxygen-containing groups in which the oxygen is replaced by sulfur can be given as examples of sulfur-containing groups.

The silicon-substituted alkyl groups and silicon-substituted aryl groups described for L can be given as examples of silicon-containing groups.

The same halogen atoms described for L can be given as examples of halogen atoms.

Among the above, a halogen atom, a hydrocarbon group of 1 to 20 carbon atoms, or a sulfonate group is preferable.

$Y^1$ indicates a bivalent hydrocarbon group of 1 to 20 carbon atoms, bivalent halogenated hydrocarbon group of 1 to 20 carbon atoms, bivalent silicon-containing group, bivalent germanium-containing group, bivalent tin-containing group, —O—, —CO—, —S—, —SO—, —SO$_2$—, —Ge—, —Sn—, —NR$^{39}$—, —P(R$^{39}$)—, —P(O) (R$^{39}$)—, —BR$^{39}$—, or —AlR$^{39}$— (where the groups $R^{39}$ may be the same as or different from each other and are each a hydrocarbon group of 1 to 20 carbon atoms, halogenated hydrocarbon group of 1 to 20 carbon atoms, hydrogen atom, or halogen atom).

Alkylene groups, such as methylene, dimethylmethylene, 1,2-ethylene, dimethyl-1,2-ethylene, 1,3-trimethylene, 1,4-tetramethylene, 1,2-cyclohexylene, 1,4-cyclohexylene, etc.; and arylalkylene groups, such as diphenylmethylene, diphenyl-1,2-ethylene, etc., can be given as examples of bivalent hydrocarbon groups of 1 to 20 carbon atoms.

The above-mentioned bivalent hydrocarbon groups of 1 to 20 carbon atoms which are halogenated, such as chloromethylene, etc., can be given as specific examples of bivalent halogenated hydrocarbon groups of 1 to 20 carbon atoms.

Alkylsilylene, alkylarylsilylene, and arylsilylene groups, such as silylene, methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene, di(p-chlorophenyl) silylene, etc.; and alkyldisilylene, alkylaryldisilylene, and aryldisilylene groups, such as tetramethyl-1,2-disilylene, tetraphenyl-1,2-disilylene, etc., can be given as examples of bivalent silicon-containing groups.

The above-mentioned bivalent silicon-containing groups in which the silicon is replaced by germanium can be given as examples of bivalent germanium-containing groups.

The above-mentioned bivalent silicon-containing groups in which the silicon is replaced by tin can be given as examples of bivalent tin-containing groups.

$R^{39}$ is a hydrocarbon group of 1 to 20 carbon atoms, halogenated hydrocarbon group of 1 to 20 carbon atoms, or halogen atom, and examples thereof include those described for L.

Among the above, a substituted silylene group, such as dimethylsilylene, diphenylsilylene, methylphenylsilylene, etc., is particularly favorable.

Specific examples of transition metal compounds expressed by the above formula (II-3) include:

Ethylene-bis(indenyl)dimethylzirconium,
ethylene-bis(indenyl)zirconium dichloride,
ethylene-bis(indenyl)zirconium bis (trifluoromethanesulfonate), ethylene-bis(indenyl)zirconium bis(methanesulfonate),
ethylene-bis(indenyl)zirconium bis(p-toluenesulfonate),
ethylene-bis(indenyl)zirconium bis(p-chlorobenzensulfonate),
ethylene-bis(4,5,6,7-tetrahydroindenyl)zirconium dichloride,
isopropylidene-(cyclopentadienyl)(fluorenyl)zirconium dichloride,
isopropylidene-(cyclopentadienyl)(methylcyclopentadienyl)zirconium dichloride,
dimethylsilylene-bis(cyclopentadienyl)zirconium dichloride,
dimethylsilylene-bis(methylcyclopentadienyl)zirconium dichloride,
dimethylsilylene-bis(dimethylcyclopentadienyl)zirconium dichloride,
dimethylsilylene-bis(trimethylcyclopentadienyl)zirconium dichloride,
dimethylsilylene-bis(indenyl)zirconium dichloride,
dimethylsilylene-bis(indenyl)zirconium bis(trifluoromethanesulfonate),
dimethylsilylene-bis(4,5,6,7-tetrahydroindenyl)zirconium dichloride,
dimethylsilylene-bis(cyclopentadienyl)(fluorenyl)zirconium dichloride,
diphenylsilylene-bis(indenyl)zirconium dichloride,
methylphenylsilylene-bis(indenyl)zirconium dichloride,
rac-dimethylsilylene-bis(2,3,5-trimethylcyclopentadienyl)zirconium dichloride,
rac-dimethylsilylene-bis(2,4,7-trimethylcyclopentadienyl)zirconium dichloride,
rac-dimethylsilylene-bis(2-methyl-4-tert-butylcyclopentadienyl)zirconium dichloride,
isopropylidene-(cyclopentadienyl)(fluorenyl)zirconium dichloride,
dimethylsilylene-(3-tert-butylcyclopentadienyl)(indenyl)zirconium dichloride,
isopropylidene-(4-methylcyclopentadienyl)(3-methylindenyl)zirconium dichloride,
isopropylidene-(4-tert-butylcyclopentadienyl)(3-methylindenyl)zirconium dichloride,
isopropylidene-(4-tert-butylcyclopentadienyl)(3-tert-butylindenyl)zirconium dichloride,
dimethylsilylene-(4-methylcyclopentadienyl)(3-methylindenyl) zirconium dichloride,
dimethylsilylene-(4-tert-butylcyclopentadienyl)(3-methylindenyl)zirconium dichloride,
dimethylsilylene-(4-tert-butylcyclopentadienyl)(3-tert-butylindenyl)zirconium dichloride,
dimethylsilylene(3-tert-butylcyclopentadienyl)(fluorenyl)zirconium dichloride,
isopropylidene(3-tert-butylcyclopentadienyl)(fluorenyl)zirconium dichloride, etc.

The above-mentioned compounds in which the zirconium is replaced by titanium or hafnium can also be given as examples.

Transition metal compounds of the following general formula (II-4) or (II-5) can be given as further specific examples of the transition metal compounds of formula (II-3) given above.

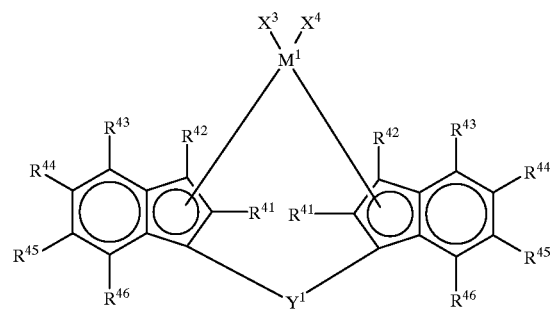

(II-4)

In formula (II-4), $M^1$ indicates a transition metal atom of Group 4 of the periodic table and is specifically titanium, zirconium, or hafnium and preferably zirconium.

The group $R^{41}$ may be the same as or different from each other and are each a hydrocarbon group of 1 to 6 carbon atoms, and alkyl groups, such as methyl, ethyl, n-propyl, isopropyl, n-butyl, isobutyl, sec-butyl, tert-butyl, n-pentyl, neopentyl, n-hexyl, cyclohexyl, etc.; and alkenyl groups, such as vinyl, propenyl, etc., can be given as specific examples.

Among the above, alkyl groups in which the carbon atom bonded to the indenyl group is a primary carbon atom are preferable, such alkyl groups of 1 to 4 carbon atoms are more preferable, and methyl group and ethyl group are particularly preferable.

$R^{42}$, $R^{44}$, $R^{45}$, and $R^{46}$ may be the same as or different from each other and are each a hydrogen atom, halogen atom, or a hydrocarbon group of 1 to 6 carbon atoms, such as those described for $R^{41}$.

The groups $R^{43}$ may be the same as or different from each other and are each a hydrogen atom or an aryl group of 6 to 16 carbon atoms, and phenyl, α-naphthyl, β-naphthyl, anthryl, phenanthryl, pyrenyl, acenaphthyl, phenalenyl, aceanthrylenyl, tetrahydronaphthyl, indanyl, biphenylyl, etc., can be given as specific examples. Among the above, phenyl, naphthyl, anthryl, and phenanthryl are preferable.

The above aryl groups may be substituted with a halogen atom, such as fluorine, chlorine, bromine, iodine, etc.;

a hydrocarbon group of 1 to 20 carbon atoms, for example, an alkyl group, such as methyl, ethyl, propyl, butyl, hexyl, cyclohexyl, octyl, nonyl, dodecyl, eicosyl, norbornyl, adamantyl, etc.; an alkenyl group, such as vinyl, propenyl, cyclohexenyl, etc.; an arylalkyl group, such as benzyl, phenylethyl, phenylpropyl, etc.; or an aryl group, such as phenyl, tolyl, dimethylphenyl, trimethylphenyl, ethylphenyl, propylphenyl, biphenyl, α- or β-naphthyl, methylnaphthyl, anthryl, phenanthryl, benzylphenyl, pyrenyl, acenaphthyl, phenalenyl, aceanthrenyl, tetrahydronaphthyl, indanyl, biphenylyl, etc.; or an organic silyl group, such as trimethylsilyl, triethylsilyl, triphenylsilyl, etc.

$X^3$ and $X^4$ may be the same as or different from each other and are the same groups as described for $X^3$ and $X^4$ in general formula (II-3) given above. Among such groups, each of $X^3$ and $X^4$ is preferably a halogen atom or a hydrocarbon group of 1 to 20 carbon atoms.

$Y^1$ is the same groups as described for $Y^1$ in general formula (II-3) given above. Among such groups, $Y^1$ is preferably a bivalent silicon-containing group or a bivalent germanium-containing group, more preferably a bivalent silicon-containing group, and particularly preferably an alkylsilylene, alkylarylsilylene, or arylsilylene.

Specific examples of transition metal compounds expressed by general formula (II-4) given above include:

rac-dimethylsilylene-bis{1-(2-methyl-4-phenylindenyl)}zirconium dichloride,
rac-dimethylsilylene-bis{1-(2-methyl-4-(α-naphthyl)indenyl)}zirconium dichloride,
rac-dimethylsilylene-bis{1-(2-methyl-4-(β-naphthyl)indenyl)}zirconium dichloride,
rac-dimethylsilylene-bis{1-(2-methyl-4-(1-anthryl)indenyl)}zirconium dichloride,
rac-dimethylsilylene-bis{1-(2-methyl-4-(2-anthryl)indenyl)}zirconium dichloride,
rac-dimethylsilylene-bis{1-(2-methyl-4-(9-anthryl)indenyl)}zirconium dichloride,
rac-dimethylsilylene-bis{1-(2-methyl-4-(9-phenanthryl)indenyl)}zirconium dichloride,
rac-dimethylsilylene-bis{1-(2-methyl-4-(p-fluorophenyl)indenyl)}zirconium dichloride,
rac-dimethylsilylene-bis{1-(2-methyl-4-(pentafluorophenyl)indenyl)}zirconium dichloride,
rac-dimethylsilylene-bis{1-(2-methyl-4-(p-chlorophenyl)indenyl)}zirconium dichloride,
rac-dimethylsilylene-bis{1-(2-methyl-4-(m-chlorophenyl)indenyl)}zirconium dichloride,
rac-dimethylsilylene-bis{1-(2-methyl-4-(o-chlorophenyl)indenyl)}zirconium dichloride,
rac-dimethylsilylene-bis{1-(2-methyl-4-(o,p-dichlorophenyl)indenyl)}zirconium dichloride,
rac-dimethylsilylene-bis{1-(2-methyl-4-(p-bromophenyl)indenyl)}zirconium dichloride,
rac-dimethylsilylene-bis{1-(2-methyl-4-(p-tolyl)indenyl)}zirconium dichloride,
rac-dimethylsilylene-bis{1-(2-methyl-4-(m-tolyl)indenyl)}zirconium dichloride,
rac-dimethylsilylene-bis{1-(2-methyl-4-(o-tolyl)indenyl)}zirconium dichloride,
rac-dimethylsilylene-bis{1-(2-methyl-4-(o,o'-dimethylphenyl)-1-indenyl)}zirconium dichloride,
rac-dimethylsilylene-bis{1-(2-methyl-4-(p-ethylphenyl)indenyl)}zirconium dichloride,
rac-dimethylsilylene-bis{1-(2-methyl-4-(p-i-propylphenyl)indenyl)}zirconium dichloride,
rac-dimethylsilylene-bis{1-(2-methyl-4-(p-benzylphenyl)indenyl)}zirconium dichloride,
rac-dirnethylsilylene-bis{1-(2-methyl-4-(p-biphenyl)indenyl)}zirconium dichloride,
rac-dimethylsilylene-bis{1-(2-methyl-4-(m-biphenyl)indenyl)}zirconium dichloride,
rac-dimethylsilylene-bis{1-(2-methyl-4-(p-trimethylsilylphenyl)indenyl)}zirconium dichloride,
rac-dimethylsilylene-bis{1-(2-methyl-4-(m-trimethylsilylphenyl)indenyl)}zirconium dichloride,
rac-dimethylsilylene-bis{1-(2-phenyl-4-phenylindenyl)}zirconium dichloride,
rac-diethylsilylene-bis{1-(2-methyl-4-phenylindenyl)}zirconium dichloride,
rac-di-(i-propyl)silylene-bis{1-(2-methyl-4-phenylindenyl)}zirconium dichloride,
rac-di-(n-butyl)silylene-bis{1-(2-methyl-4-phenylindenyl)}zirconium dichloride,
rac-dicyclohexylsilylene-bis{1-(2-methyl-4-phenylindenyl)}zirconium dichloride,
rac-methylphenylsilylene-bis{1-(2-methyl-4-phenylindenyl)}zirconium dichloride,
rac-diphenylsilylene-bis{1-(2-methyl-4-phenylindenyl)}zirconium dichloride,
rac-di(p-tolyl)silylene-bis{1-(2-methyl-4-phenylindenyl)}zirconium dichloride,
rac-(p-chlorophenyl)silylene-bis{1-(2-methyl-4-phenylindenyl)}zirconium dichloride,
rac-methylene-bis{1-(2-methyl-4-phenylindenyl)}zirconium dichloride,
rac-ethylene-bis{1-(2-methyl-4-phenylindenyl)}zirconium dichloride,
rac-dimethylgermylene-bis{1-(2-methyl-4-phenylindenyl)}zirconium dichloride,
rac-dimethylstannylene-bis{1-(2-methyl-4-phenylindenyl)}zirconium dichloride,
rac-dimethylsilylene-bis{1-(2-methyl-4-phenylindenyl)}zirconium dibromide,
rac-dimethylsilylene-bis{1-(2-methyl-4-phenylindenyl)}zirconium dimethyl,
rac-dimethylsilylene-bis{1-(2-methyl-4-phenylindenyl)}zirconium methylchloride,
rac-dimethylsilylene-bis{1-(2-methyl-4-phenylindenyl)}zirconium chloride $SO_2Me$,
rac-dimethylsilylene-bis{1-(2-methyl-4-phenylindenyl)}zirconium chloride $OSO_2Me$,
rac-dimethylsilylene-bis{1-(2-ethyl-4-phenylindenyl)}zirconium dichloride,
rac-dimethylsilylene-bis{1-(2-ethyl-4-(α-naphthyl)indenyl)}zirconium dichloride,
rac-dimethylsilylene-bis{1-(2-ethyl-4-(β-naphthyl)indenyl)}zirconium dichloride,
rac-dimethylsilylene-bis{1-(2-ethyl-4-(2-methyl-1-naphthyl)indenyl)}zirconium dichloride,
rac-dimethylsilylene-bis{1-(2-ethyl-4-(5-acenaphthyl)indenyl)}zirconium dichloride,
rac-dimethylsilylene-bis{1-(2-ethyl-4-(9-anthryl)indenyl)}zirconium dichloride,
rac-dimethylsilylene-bis{1-(2-ethyl-4-(9-phenanthryl)indenyl)}zirconium dichloride,
rac-dimethylsilylene-bis{1-(2-ethyl-4-(o-methylphenyl)indenyl)}zirconium dichloride,
rac-dimethylsilylene-bis{1-(2-ethyl-4-(m-methylphenyl)indenyl)}zirconium dichloride,
rac-dimethylsilylene-bis{1-(2-ethyl-4-(p-methylphenyl)indenyl)}zirconium dichloride,
rac-dimethylsilylene-bis{1-(2-ethyl-4-(2,3-dimethylphenyl)indenyl)}zirconium dichloride,
rac-dimethylsilylene-bis{1-(2-ethyl-4-(2,4-dimethylphenyl)indenyl)}zirconium dichloride,
rac-dimethylsilylene-bis{1-(2-ethyl-4-(2,5-dimethylphenyl)indenyl)}zirconium dichloride,
rac-dimethylsilylene-bis{1-(2-ethyl-4-(2,4,6-trimethylphenyl)indenyl)}zirconium dichloride,
rac-dimethylsilylene-bis{1-(2-ethyl-4-(o-chlorophenyl)indenyl)}zirconium dichloride,
rac-dimethylsilylene-bis{1-(2-ethyl-4-(m-chlorophenyl)indenyl)}zirconium dichloride, rac-dimethylsilylene-bis{1-(2-ethyl-4-(p-chlorophenyl)indenyl)}zirconium dichloride,
rac-dimethylsilylene-bis{1-(2-ethyl-4-(2,3-dichlorophenyl)indenyl)}zirconium dichloride,
rac-dimethylsilylene-bis{1-(2-ethyl-4-(2,6-dichlorophenyl)indenyl)}zirconium dichloride,
rac-dimethylsilylene-bis{1-(2-ethyl-4-(3,5-dichlorophenyl)indenyl)}zirconium dichloride,
rac-dimethylsilylene-bis{1-(2-ethyl-4-(2-bromophenyl)indenyl)}zirconium dichloride,
rac-dimethylsilylene-bis{1-(2-ethyl-4-(3-bromophenyl)indenyl)}zirconium dichloride,
rac-dimethylsilylene-bis{1-(2-methyl-4-(p-bromophenyl)indenyl)}zirconium dichloride,
rac-dimethylsilylene-bis{1-(2-ethyl-4-(4-biphenylyl)indenyl)}zirconium dichloride,
rac-dimethylsilylene-bis{1-(2-ethyl-4-(4-trimethylsilylphenyl)indenyl)}zirconium dichloride,
rac-dimethylsilylene-bis{1-(2-n-propyl-4-phenylindenyl)}zirconium dichloride,
rac-dimethylsilylene-bis{1-(2-n-propyl-4-(α-naphthyl)indenyl)}zirconium dichloride,
rac-dimethylsilylene-bis{1-(2-n-propyl-4-(β-naphthyl)indenyl)}zirconium dichloride,
rac-dimethylsilylene-bis{1-(2-n-propyl-4-(2-methyl-1-naphthyl)indenyl)}zirconium dichloride,
rac-dimethylsilylene-bis{1-(2-n-propyl-4-(5-acenaphthyl)indenyl)}zirconium dichloride,
rac-dimethylsilylene-bis{1-(2-n-propyl-4-(9-anthryl)indenyl)}zirconium dichloride,
rac-dimethylsilylene-bis{1-(2-n-propyl-4-(9-phenanthryl)indenyl)}zirconium dichloride,
rac-dimethylsilylene-bis{1-(2-i-propyl-4-phenylindenyl)}zirconium dichloride,
rac-dimethylsilylene-bis{1-(2-i-propyl-4-(α-naphthyl)indenyl)}zirconium dichloride,
rac-dimethylsilylene-bis{1-(2-i-propyl-4-(β-naphthyl)indenyl)}zirconium dichloride,
rac-dimethylsilylene-bis{1-(2-i-propyl-4-(8-methyl-9-naphthyl)indenyl)}zirconium dichloride,
rac-dimethylsilylene-bis{1-(2-i-propyl-4-(5-acenaphthyl)indenyl)}zirconium dichloride,
rac-dimethylsilylene-bis{1-(2-i-propyl-4-(9-anthryl)indenyl)}zirconium dichloride,
rac-dimethylsilylene-bis{1-(2-i-propyl-4-(9-phenanthryl)indenyl)}zirconium dichloride,
rac-dimethylsilylene-bis{1-(2-s-butyl-4-phenylindenyl)}zirconium dichloride,
rac-dimethylsilylene-bis{1-(2-s-butyl-4-(α-naphthyl)indenyl)}zirconium dichloride,
rac-dimethylsilylene-bis{1-(2-s-butyl-4-(β-naphthyl)indenyl)}zirconium dichloride,
rac-dimethylsilylene-bis{1-(2-s-butyl-4-(2-methyl-1-naphthyl)indenyl)}zirconium dichloride,
rac-dimethylsilylene-bis{1-(2-s-butyl-4-(5-acenaphthyl)indenyl)}zirconium dichloride,
rac-dimethylsilylene-bis{1-(2-s-butyl-4-(9-anthryl)indenyl)}zirconium dichloride,
rac-dimethylsilylene-bis{1-(2-s-butyl-4-(9-phenanthryl)indenyl)}zirconium dichloride,
rac-dimethylsilylene-bis{1-(2-n-pentyl-4-phenylindenyl)}zirconium dichloride,
rac-dimethylsilylene-bis{1-(2-n-pentyl-4-(α-naphthylindenyl)}zirconium dichloride,
rac-dimethylsilylene-bis{1-(2-n-butyl-4-phenylindenyl)}zirconium dichloride,
rac-dimethylsilylene-bis{1-(2-n-butyl-4-(α-naphthyl)indenyl)}zirconium dichloride,
rac-dimethylsilylene-bis{1-(2-n-butyl-4-(β-naphthyl)indenyl)}zirconium dichloride,
rac-dimethylsilylene-bis{1-(2-n-butyl-4-(2-methyl-1-naphthyl)indenyl)}zirconium dichloride,
rac-dimethylsilylene-bis{1-(2-n-butyl-4-(5-acenaphthyl)indenyl)}zirconium dichloride,
rac-dimethylsilylene-bis{1-(2-n-butyl-4-(9-anthryl)indenyl)}zirconium dichloride,
rac-dimethylsilylene-bis{1-(2-n-butyl-4-(9-phenanthryl)indenyl)}zirconium dichloride,
rac-dimethylsilylene-bis{1-(2-i-butyl-4-phenylindenyl)}zirconium dichloride,
rac-dimethylsilylene-bis{1-(2-i-butyl-4-(α-naphthyl)indenyl)}zirconium dichloride,
rac-dimethylsilylene-bis{1-(2-i-butyl-4-(β-naphthyl)indenyl)}zirconium dichloride,
rac-dimethylsilylene-bis{1-(2-i-butyl-4-(2-methyl-1-naphthyl)indenyl)}zirconium dichloride,
rac-dimethylsilylene-bis{1-(2-i-butyl-4-(5-acenaphthyl)indenyl)}zirconium dichloride,
rac-dimethylsilylene-bis{1-(2-i-butyl-4-(9-anthryl)indenyl)}zirconium dichloride,
rac-dimethylsilylene-bis{1-(2-i-butyl-4-(9-phenanthryl)indenyl)}zirconium dichloride,
rac-dimethylsilylene-bis{1-(2-neopentyl-4-phenylindenyl)}zirconium dichloride,
rac-dimethylsilylene-bis{1-(2-neopentyl-4-(α-naphthyl)indenyl)}zirconium dichloride,
rac-dimethylsilylene-bis{1-(2-n-hexyl-4-phenylindenyl)}zirconium dichloride,
rac-dimethylsilylene-bis{1-(2-n-hexyl-4-(α-naphthyl)indenyl)}zirconium dichloride,
rac-methylphenylsilylene-bis{1-(2-ethyl-4-phenylindenyl)}zirconium dichloride,
rac-methylphenylsilylene-bis{1-(2-ethyl-4-(α-naphthyl)indenyl)}zirconium dichloride,
rac-methylpheynylsilylene-bis{1-(2-ethyl-4-(9-anthryl)indenyl)}zirconium dichloride,
rac-methylphenylsilylene-bis{1-(2-ethyl-4-(9-phenanthryl)indenyl)}zirconium dichloride,
rac-diphenylsilylene-bis{1-(2-ethyl-4-phenylindenyl)}zirconium dichloride,
rac-diphenylsilylene-bis{1-(2-ethyl-4-(α-naphthyl)indenyl)}zirconium dichloride,
rac-diphenylsilylene-bis{1-(2-ethyl-4-(9-anthryl)indenyl)}zirconium dichloride,
rac-diphenylsilylene-bis{1-(2-ethyl-4-(9-phenanthryl)indenyl)}zirconium dichloride,
rac-diphenylsilylene-bis{1-(2-ethyl-4-(4-biphenylyl)indenyl)}zirconium dichloride,
rac-methylene-bis{1-(2-ethyl-4-phenylindenyl)}zirconium dichloride,
rac-methylene-bis{1-(2-ethyl-4-(α-naphthyl)indenyl)}zirconium dichloride,
rac-ethylene-bis{1-(2-ethyl-4-phenylindenyl)}zirconium dichloride, rac-ethylene-bis{1-(2-ethyl-4-(α-naphthyl)indenyl)}zirconium dichloride, rac-ethylene-bis{1-(2-n-propyl-4-(α-naphthyl)indenyl)}zirconium dichloride, rac-dimethylgermylene-bis{1-(2-ethyl-4-phenylindenyl)}zirconium dichloride, rac-dimethylgermylene-bis{1-(2-ethyl-4-(α-naphthyl)indenyl)}zirconium dichloride, rac-dimethylgermylene-bis{1-(2-n-propyl-4-phenylindenyl)}zirconium dichloride, etc.

The above-mentioned compounds in which the zirconium is replaced by titanium or hafnium may also be given as examples. Meso-forms of such compounds may also be used.

Though the racemic body of a transition metal compound expressed by the above general formula (II-4) is usually used in the present invention, the R-form or the S-form may also be used.

Such transition metal compounds expressed by general formula (II-4) can be produced in accordance with the descriptions in the Journal of organometallic Chem. 288 (1985), pp. 63–67 and the specification and Examples in European patent published application No. 0,320,762.

The transition metal compound expressed by the general formula (II-5) shall now be described.

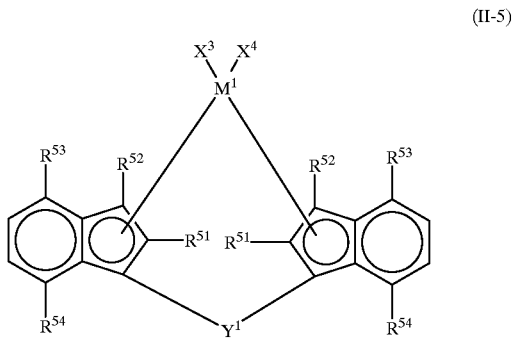

(II-5)

In the above formula, $M^1$ indicates a transition metal atom from Group 4 of the periodic table and is specifically titanium, zirconium, or hafnium and preferably zirconium.

$R^{51}$ and $R^{52}$ may be the same as or different from each other and are each a hydrocarbon group of 1 to 20 carbon atoms, halogenated hydrocarbon group of 1 to 20 carbon atoms, oxygen-containing group, sulfur-containing group, silicon-containing group, nitrogen-containing group, phosphorus-containing group, halogen atom, or hydrogen atom, and the same atoms and groups as described for $R^{35}$ to $R^{38}$ can be given as specific examples.

Among the above, $R^{51}$ is preferably a hydrocarbon group of 1 to 20 carbon atoms and more preferably a hydrocarbon group of 1 to 3 carbon atoms, that is, methyl, ethyl, or propyl.

$R^{52}$ is preferably a hydrogen atom or hydrocarbon group of 1 to 20 carbon atoms and particularly preferably a hydrogen atom or a hydrocarbon group of 1 to 3 carbon atoms, that is, methyl, ethyl, or propyl.

$R^{53}$ and $R^{54}$ may be the same as or different from each other and are each an alkyl group or cycloalkyl group of 1 to 20 carbon atoms. Specific examples include alkyl groups, such as methyl, ethyl, n-propyl, isopropyl, n-butyl, isobutyl, sec-butyl, tert-butyl, n-pentyl, neopentyl, n-hexyl, cyclohexyl, octyl, nonyl, dodecyl, icosyl, etc.; and cycloalkyl groups, such as norbornyl, adamantyl, etc.

Among the above, $R^{53}$ is preferably a secondary or tertiary alkyl group.

$X^3$ and $X^4$ may be the same as or different from each other and indicate the same groups as described for $X^3$ and $X^4$ in general formula (II-3) given above.

$Y^1$ indicates the same groups as described for $Y^1$ in general formula (II-3) given above.

Specific examples of transition metal compounds of the general formula (II-5) given above include:

rac-dimethylsilylene-bis{1-(2,7-dimethyl-4-ethylindenyl)}zirconium dichloride, rac-dimethylsilylene-bis{1-(2,7-dimethyl-4-n-propylindenyl)}zirconium dichloride, rac-dimethylsilylene-bis{1-(2,7-dimethyl-4-i-propylindenyl)}zirconium dichloride, rac-dimethylsilylene-bis{1-(2,7-dimethyl-4-n-butylindenyl)}zirconium dichloride, rac-dimethylsilylene-bis{1-(2,7-dimethyl-4-sec-butylindenyl)}zirconium dichloride, rac-dimethylsilylene-bis{1-(2,7-dimethyl-4-t-butylindenyl)}zirconium dichloride, rac-dimethylsilylene-bis{1-(2,7-dimethyl-4-n-pentylindenyl)}zirconium dichloride, rac-dimethylsilylene-bis{1-(2,7-dimethyl-4-n-hexylindenyl)}zirconium dichloride, rac-dimethylsilylene-bis{1-(2,7-dimethyl-4-cyclohexylindenyl)}zirconium dichloride, rac-dimethylsilylene-bis{1-(2,7-dimethyl-4-methylcyclohexylindenyl)}zirconium dichloride, rac-dimethylsilylene-bis{1-(2,7-dimethyl-4-phenylethylindenyl)}zirconium dichloride, rac-dimethylsilylene-bis{1-(2,7-dimethyl-4-phenyldichloromethylindenyl)}zirconium dichloride, rac-dimethylsilylene-bis{1-(2,7-dimethyl-4-chloromethylindenyl)}zirconium dichloride, rac-dimethylsilylene-bis{1-(2,7-dimethyl-4-trimethylsilylmethylindenyl)}zirconium dichloride, rac-dimethylsilylene-bis{1-(2,7-dimethyl-4-trimethylsiloxymethylindenyl)}zirconium dichloride, rac-diethylsilylene-bis{1-(2,7-dimethyl-4-i-propylindenyl)}zirconium dichloride, rac-di(i-propyl)silylene-bis{1-(2,7-dimethyl-4-i-propylindenyl)}zirconium dichloride, rac-di(n-butyl)silylene-bis{1-(2,7-dimethyl-4-i-propylindenyl)}zirconium dichloride, rac-di(cyclohexyl)silylene-bis{1-(2,7-dimethyl-4-i-propylindenyl)}zirconium dichloride, rac-methylphenylsilylene-bis{1-(2,7-dimethyl-4-i-propylindenyl)}zirconium dichloride, rac-methylphenylsilylene-bis{1-(2,7-dimethyl-4-t-butylindenyl)}zirconium dichloride, rac-diphenylsilylene-bis{1-(2, 7-dimethyl-4-t-butylindenyl)}zirconium dichloride, rac-diphenylsilylene-bis{1-(2, 7-dimethyl-4-i-propylindenyl)}zirconium dichloride, rac-diphenylsilylene-bis{1-(2,7-dimethyl-4-ethylindenyl)}zirconium dichloride, rac-di(p-tolyl)silylene-bis{1-(2,7-dimethyl-4-i-propylindenyl)}zirconium dichloride, rac-di(p-chlorophenyl)silylene-bis{1-(2,7-dimethyl -4-i-propylindenyl)}zirconium dichloride, rac-dimethylsilylene-bis{1-(2-methyl-4-i-propyl-7-ethylindenyl)}zirconium dibromide, rac-dimethylsilylene-bis{1-(2,3,7-trimethyl-4-ethylindenyl)}zirconium dichloride,
rac-dimethylsilylene-bis{1-(2,3,7-trimethyl-4-n-propylindenyl)}zirconium dichloride,
rac-dimethylsilylene-bis{1-(2,3,7-trimethyl-4-i-propylindenyl)}zirconium dichloride,
rac-dimethylsilylene-bis{1-(2,3,7-trimethyl-4-n-butylindenyl)}zirconium dichloride,
rac-dimethylsilylene-bis{1-(2,3,7-trimethyl-4-sec-butylindenyl)}zirconium dichloride,
rac-dimethylsilylene-bis{1-(2,3,7-trimethyl-4-t-butylindenyl)}zirconium dichloride,
rac-dimethylsilylene-bis{1-(2,3,7-trimethyl-4-n-pentylindenyl)}zirconium dichloride,
rac-dimethylsilylene-bis{1-(2,3,7-trimethyl-4-n-hexylindenyl)}zirconium dichloride,
rac-dimethylsilylene-bis{1-(2,3,7-trimethyl-4-cyclohexylindenyl)}zirconium dichloride,
rac-dimethylsilylene-bis{1-(2,3,7-trimethyl-4-methylcyclohexylindenyl)}zirconium dichloride,
rac-dimethylsilylene-bis{1-(2,3,7-trimethyl-4-trimethylsilylmethylindenyl)}zirconium dichloride,
rac-dimethylsilylene-bis{1-(2,3,7-trimethyl-4-trimethylsiloxymethylindenyl)}zirconium dichloride,
rac-dimethylsilylene-bis{1-(2,3,7-trimethyl-4-phenylethylindenyl)}zirconium dichloride,
rac-dimethylsilylene-bis{1-(2,3,7-trimethyl-4-phenyldichloromethylindenyl)}zirconium dichloride,
rac-dimethylsilylene-bis{1-(2,3,7-trimethyl-4-chloromethylindenyl)}zirconium dichloride,
rac-diethylsilylene-bis{1-(2,3,7-trimethyl-4-i-propylindenyl)}zirconium dichloride,
rac-di(i-propyl)silylene-bis{1-(2,3,7-trimethyl-4-i-propylindenyl)}zirconium dichloride,
rac-di(n-butyl)silylene-bis{1-(2,3,7-trimethyl-4-i-propylindenyl)}zirconium dichloride,
rac-di(cyclohexyl)silylene-bis{1-(2,3,7-trimethyl-4-i-propylindenyl)}zirconium dichloride,
rac-methylphenylsilylene-bis{1-(2,3,7-trimethyl-4-i-propylindenyl)}zirconium dichloride,
rac-methylphenylsilylene-bis{1-(2,3,7-trimethyl-4-t-butylindenyl)}zirconium dichloride,
rac-diphenylsilylene-bis{1-(2,3,7-trimethyl-4-t-butylindenyl)}zirconium dichloride,
rac-diphenylsilylene-bis{1-(2,3,7-trimethyl-4-i-propylindenyl)}zirconium dichloride,
rac-diphenylsilylene-bis{1-(2,3,7-trimethyl-4-ethylindenyl)}zirconium dichloride,
rac-di(p-tolyl)silylene-bis{1-(2,3,7-trimethyl-4-i-propylindenyl)}zirconium dichloride,
rac-di(p-chlorophenyl)silylene-bis{1-(2,3,7-trimethyl-4-i-propylindenyl)}zirconium dichloride,
rac-dimethylsilylene-bis{1-(2-methyl-4-i-propyl-7-methylindenyl)}zirconium dimethyl,
rac-dimethylsilylene-bis{1-(2-methyl-4-i-propyl-7-methylindenyl)}zirconium methylchloride,
rac-dimethylsilylene-bis{1-(2-methyl-4-i-propyl-7-methylindenyl)}zirconium-bis(methanesulfonate),
rac-dimethylsilylene-bis{1-(2-methyl-4-i-propyl-7-methylindenyl)}zirconium-bis(p-phenylsulfinate),
rac-dimethylsilylene-bis{1-(2-methyl-3-methyl-4-i-propyl-7-methylindenyl)}zirconium dichloride,
rac-dimethylsilylene-bis{1-(2-methyl-4,6-di-i-propylindenyl)}zirconium dichloride,
rac-dimethylsilylene-bis{1-(2-ethyl-4-i-propyl-7-methylindenyl)}zirconium dichloride,
rac-dimethylsilylene-bis{1-(2-phenyl-4-i-propyl-7-methylindenyl)}zirconium dichloride,
rac-dimethylsilylene-bis{1-(2-methylindenyl)}zirconium dichloride,
rac-ethylene-bis{-(2,4,7-trimethylindenyl)}zirconium dichloride,
rac-isopropylidene-bis{1-(2,4,7-trimethylindenyl)}zirconium dichloride, etc.

The above-mentioned compounds in which the zirconium is replaced by titanium or hafnium may also be given as examples. Meso-forms of such compounds may also be used.

Among such compounds, those having a branched alkyl group, such as i-propyl, sec-butyl, tert-butyl, etc., at position 4 are especially favorable.

Though the racemic body of a transition metal compound expressed by the above general formula (II-5) is usually used in the present invention, the R-form or the S-form may also be used.

Such transition metal compounds of general formula (II-5) can be synthesized from an indenyl derivative using a known method, such as disclosed in Japanese laid-open patent publication No. 4-268307.

In the present invention, compounds expressed by the following general formula (III-1) may also be used as the compound (a-1) of a transition metal from Group 4 of the periodic table.

$$L^2 M^1 X^5{}_{22} \ldots \qquad (III-1)$$

In the above formula, $M^1$ is a transition metal atom from Group 4 of the periodic table.

$L^2$ is a derivative of a non-localized π-bond group, which provides the metal $M^1$ active site with a constrained geometrical shape.

The groups $X^5$ may be the same as or different from each other and are each a hydrogen atom, halogen atom, or a hydrocarbon group, silyl group, or germyl group having 20 or less carbon atoms, silicon atoms, or germanium atoms.

Among such compounds of general formula (III-1), those expressed by the following general formula (III-2) are preferable.

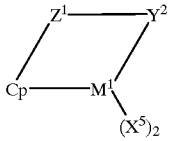

(III-2)

In the above formula, $M^1$ indicates a transition metal atom from Group 4 of the periodic table, and to be more specific, indicates zirconium, titanium, or hafnium, and is preferably zirconium.

Cp indicates a substituted cyclopentadienyl group that is π-bonded to $M^1$ and has a substituent Z, or a derivative thereof.

$Z^1$ indicates a group that contains an oxygen atom, sulfur atom, boron atom, or an atom from Group 14 of the periodic table, and examples thereof include —Si($R^{55}{}_2$)—, —C($R^{55}{}_2$)—, —Si($R^{55}{}_2$)Si($R^{55}{}_2$)—, —C($R^{55}{}_2$)C($R^{55}{}_2$)—, —C($R^{55}{}_2$)C($R^{55}{}_2$)C($R^{55}{}_2$)—, —C($R^{55}$)=C($R^{55}$)—, —C($R^{55}{}_2$)Si($R^{55}{}_2$)—, —Ge($R^{55}{}_2$)—, etc.

$Y^2$ indicates a ligand that contains a nitrogen atom, phosphorus atom, oxygen atom, or sulfur atom, and examples thereof include $-N(R^{52})-$, $-O-$, $-S-$, $-P(R^{52})-$, etc.

$Z^1$ and $Y^2$ together may form a fused ring.

$R^{55}$ is a hydrogen atom or a group selected from among alkyl, aryl, silyl, halogenated alkyl, and halogenated aryl groups having up to 20 non-hydrogen atoms and combinations of such groups. $R^{52}$ is an alkyl group of 1 to 10 carbon atoms, an aryl group of 6 to 10 carbon atoms, or an aralkyl group of 7 to 10 carbon atoms, and $R^{52}$ together with one or more $R^{55}$ may form a fused ring system having up to 30 non-hydrogen atoms.

The following are specific examples of transition metal compounds expressed by the general formula (III-2) given above:

(tert-butylamide)(tetramethyl-$\eta^5$-cyclopentadienyl)-1,2-ethanediylzirconium dichloride,
(tert-butylamide)(tetramethyl-$\eta^5$-cyclopentadienyl)-1,2-ethanediyltitanium dichloride,
(methylamide)(tetramethyl-$\eta^5$-cyclopentadienyl)-1,2-ethanediylzirconium dichloride,
(methylamide)(tetramethyl-$\eta^5$-cyclopentadienyl)-1,2-ethanediyltitanium dichloride,
(ethylamide)(tetramethyl-$\eta^5$-cyclopentadienyl)-methylenetitanium dichloride,
(tert-butylamide)dimethyl(tetramethyl-$\eta^5$-cyclopentadienyl)silylenetitanium dichloride,
(tert-butylamide)dimethyl(tetramethyl-$\eta^5$-cyclopentadienyl)silylenezirconium dichloride,
(benzylamide)dimethyl(tetramethyl-$\eta^5$-cyclopentadienyl)silylenetitanium dichloride,
(phenylphosphide)dimethyl(tetramethyl-$\eta^5$-cyclopentadienyl)silylenetitanium dibenzyl, etc.

(a-2) Titanium Catalyst Component Containing Magnesium, Titanium, and Halogen:

The titanium catalyst component (a-2) containing magnesium, titanium, and halogen (referred to hereinafter as "titanium catalyst component"), that is used in the present invention, contains magnesium, titanium, and halogen as the essential components thereof and furthermore contains an electron donor if necessary.

Such a titanium catalyst component (a-2) may be prepared by contacting the following magnesium and titanium compounds, and if necessary, an electron donor with each other.

A quadrivalent titanium compound expressed by the following formula can be given as a specific example of a titanium compound to be used to prepare the titanium catalyst component (a-2):

$$Ti(OR)_z X_{4-n}$$ 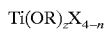

wherein R indicates a hydrocarbon group, X indicates a halogen atom, and n satisfies $0 \leq n \leq 4$.

Specific examples of such a titanium compound include tetrahalogenated titaniums, such as $TiCl_4$, $TiBr_4$, $TiI_4$, etc.;

trihalogenated alkoxytitaniums, such as $Ti(OCH_3)Cl_3$, $Ti(OC_2H_5)Cl_3$, $Ti(O-n-C_4H_9)Cl_3$, $Ti(OC_2H_5)Br_3$, $Ti(O-iso-C_4H_9)Br_3$, etc.;

dihalogenated dialkoxytitaniums, such as $Ti(OCH_3)_2Cl_2$, $Ti(OC_2H_5)_2Cl_2$, $Ti(O-n-C_4H_9)_2Cl_2$, $Ti(OC_2H_5)_2Br_2$, etc.;

monohalogenated trialkoxytitaniums, such as $Ti(OCH_3)_3Cl$, $Ti(OC_2H_5)_3Cl$, $Ti(O-n-C_4H_9)_3Cl$, $Ti(OC_2H_5)_3Br$, etc.; and tetraalkoxytitaniums, such as $Ti(OCH_3)_4$, $Ti(OC_2H_5)_4$, $Ti(O-n-C_4H_9)_4$, $Ti(O-iso-C_4H_9)_4$, $Ti(O-2-ethylhexyl)_4$, etc.

Among the above, halogen-containing titanium compounds are preferable, tetrahalogenated titaniums are more preferable, and titanium tetrachloride is particularly preferable. These titanium compound may be used singly or in combination of two or more. Furthermore, these titanium compounds may be diluted in a hydrocarbon compound or a halogenated hydrocarbon compound.

Magnesium compounds that have reducing properties and magnesium compounds that do not have reducing properties can be used as the magnesium compound to be used in the preparation of titanium catalyst component (a-2).

Here, magnesium compounds with a magnesium-carbon bond or a magnesium-hydrogen bond may be given as examples of magnesium compounds that have reducing properties. Specific examples of such magnesium compounds that have reducing properties include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, ethylbutylmagnesium, butylmagnesium hydride, etc. These magnesium compounds can be used singly or in the form of a complex compound with an organometallic compound such as those mentioned below. Also, these magnesium compounds may be in the form of liquid or solid and may be derived by reacting metallic magnesium with a corresponding compound. The compounds may furthermore be derived using the above-mentioned method in the catalyst preparation process.

Specific examples of magnesium compounds that do not have reducing properties include magnesium halides, such as magnesium chloride, magnesium bromide, magnesium iodide, magnesium fluoride, etc.; alkoxymagnesium halides, such as methoxymagnesium chloride, ethoxymagnesium chloride, isopropoxymagnesium chloride, butoxymagnesium chloride, octoxymagnesium chloride, etc.; aryloxymagnesium halides, such as phenoxymagnesium chloride, methylphenoxymagnesium chloride, etc.; alkoxymagnesiums, such as ethoxymagnesium, isopropoxymagnesium, butoxymagnesium, n-octoxymagnesium, 2-ethylhexoxymagnesium, etc.; aryloxymagnesiums, such as phenoxymagnesium, dimethylphenoxymagnesium, etc.; and magnesium carboxylates, such as magnesium laurate, magnesium stearate, etc.

These magnesium compounds without reducing properties may be compounds derived from the above-mentioned magnesium compounds with reducing properties or may be compounds derived in the process of preparing the catalyst component.

To derive a magnesium compound without reducing properties from a magnesium compound with reducing properties, the magnesium compound with reducing properties may for example be contacted with a halogen, a halogen compound, such as a halogen-containing organo-silicon compound, halogen-containing organoaluminum compound, etc., a compound with an active carbon-oxygen bond, such as an alcohol, ester, ketone, aldehyde, etc., or a polysiloxane compound.

Besides the above-mentioned magnesium compounds with reducing properties and magnesium compounds without reducing properties, the magnesium compound may be a complex compound or double compound of an above-mentioned magnesium compound with another metal or a mixture with another metal compound. Furthermore, two or more of the above-mentioned compounds may be used in combination.

Though various magnesium compounds besides those mentioned above can be used as the magnesium compound to be used in the preparation of the titanium catalyst component (a-2), it is preferable that the magnesium compound takes the form of a halogen-containing magnesium compound in the titanium catalyst component (a-2) that is obtained in the end, and thus in the case where a magnesium compound that does not contain a halogen is used, it is preferable to subject the magnesium compound to contact reaction with a halogen-containing compound in the process of preparation.

Among the above-mentioned magnesium compounds, magnesium compounds without reducing properties are preferable, halogen-containing magnesium compounds are more preferable, and magnesium chloride, alkoxymagnesium chlorides, and aryloxymagnesium chlorides are particularly preferable.

In the process of preparing the titanium catalyst component (a-2), it is preferable to use an electron donor. Examples of electron donors include alcohols, phenols, ketones, aldehydes, carboxylic acids, acid halides, esters of organic or inorganic acids, ethers, acid amides, acid anhydrides, ammonia, amines, nitrites, isocyanates, nitrogen-containing ring compounds, oxygen-containing ring compounds, etc. More specific examples of electron donors include:

alcohols of 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol, isopropylbenzyl alcohol, etc.;

halogen-containing alcohols of 1 to 18 carbon atoms, such as trichloromethanol, trichloroethanol, trichlorohexanol, etc.;

phenols of 6 to 20 carbon atoms which may have a lower alkyl group, such as phenol, cresol, xylelol, ethylphenol, propylphenol, nonylphenol, cumylphenol, naphthol, etc.;

ketones of 3 to 15 carbon atoms, such as acetone, methyl ethyl ketone, methyl isobutyl ketone, acetophenone, benzophenone, benzoquinone, etc.;

aldehydes of 2 to 15 carbon atoms, such as acetaldehyde, propionaldehyde, octylaldehyde, benzaldehyde, tolualdehyde, naphthaldehyde, etc.;

organic acid esters of 2 to 30 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, cumarin, phthalide, ethyl carbonate, etc.;

acid halides of 2 to 15 carbon atoms, such as acetyl chloride, benzoyl chloride, toluyl chloride, anisyl chloride, etc.;

ethers of 2 to 20 carbon atoms, such as methyl ether, ethyl ether, isopropyl ether, butyl ether, amyl ether, tetrahydrofuran, anisole, diphenyl ether, etc.;

acid amides, such as N,N-dimethylacetamide, N,N-diethylbenzamide, N,N-dimethyltoluamide, etc.;

amines, such as methylamine, ethylamine, dimethylamine, diethylamine, trimethylamine, triethylamine, tributylamine, tribenzylamine, tetramethylenediamine, hexamethylenediamine, etc.;

nitriles, such as acetonitrile, benzonitrile, trinitrile, etc.;

acid anhydrides, such as acetic anhydride, phthalic anhydride, benzoic anhydride, etc.;

nitrogen-containing ring compounds including pyrroles, such as pyrrole, methylpyrrole, dimethylpyrrole, etc.;

pyrroline; pyrrolidine; indole; pyridines, such as pyridine, methylpyridine, ethylpyridine, propylpyridine, dimethylpyridine, ethylmethylpyridine, trimethylpyridine, phenylpyridine, benzylpyridine, pyridine chloride, etc.; piperidines, quinolines, isoquinolines, etc.; and oxygen-containing ring compounds, such as tetrahydrofuran, 1,4-cineole, 1,8-cineole, pinolfuran, methylfuran, dimethylfuran, diphenylfuran, benzofuran, cumaran, phthalan, tetrahydropyran, pyran, dihydropyran, etc.

Multivalent carboxylates having skeletons expressed by the general formulae below can be given as particularly preferable examples of organic acid esters.

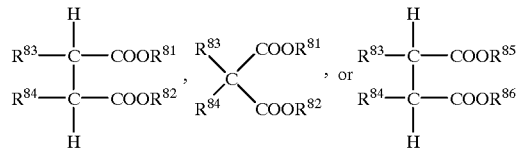

In the above formulae, $R^{81}$ indicates a substituted or non-substituted hydrocarbon group. $R^{82}$, $R^{85}$, and $R^{86}$ may be the same as or different from each other and are each a hydrogen atom or a substituted or non-substituted hydrocarbon group. $R^{83}$ and $R^{84}$ may be the same as or different from each other and each a hydrogen atom or a substituted or non-substituted hydrocarbon group and preferably one of either being a substituted or non-substituted hydrocarbon group. $R^{83}$ and $R^{84}$ may be joined together to form a cyclic structure. In the case where a hydrocarbon group among $R^{81}$ to $R^{86}$ is substituted, the substituent contains a heteroatom, such as N, O, S, and has a group such as C—O—C, COOR, COOH, OH, $SO_3H$, —C—N—C—, $NH_2$, etc.

Specific examples of such a multivalent carboxylate include aliphatic polycarboxylates, such as diethyl succinate, dibutyl succinate, diethyl methylsuccinate, diisobutyl α-methylglutarate, diethyl methylmalonate, diethyl ethylmalonate, diethyl isopropylmalonate, diethyl butylmalonate, diethyl phenylmalonate, diethyl diethylmalonate, diethyl dibutylmalonate, monooctyl maleate, dioctyl maleate, dibutyl maleate, dibutyl butylmaleate, diethyl butylmaleate, diisopropyl β-methylglutarate, diallyl ethylsuccinate, di-2-ethylhexyl fumarate, diethyl itaconate, dioctyl citraconate, etc.;

alicyclic polycarboxylates, such as diethyl 1,2-cyclohexanecarboxylate, diisobutyl 1,2-cyclohexanecarboxylate, diethyl tetrahydrophthalate, diethyl nadiate, etc.;

aromatic polycarboxylates, such as monoethyl phthalate, dimethyl phthalate, methylethyl phthalate, monoisobutyl phthalate, diethyl phthalate, ethylisobutyl phthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthalenedicarboxylate, triethyl trimellitate, dibutyl trimellitate, etc.; and esters of heterocyclic polycarboxylic acids, such as 3,4-furandicarboxylic acid.

Other examples of multivalent carboxylates include esters of long-chain dicarboxylic acids, such as diethyl adipate, diisobutyl adipate, diisopropyl sebacate, di-n-butyl sebacate, di-n-octyl sebacate, di-2-ethylhexyl sebacate, etc.

Furthermore in the present invention, organosilicon compounds expressed by the general formula (IV-1) below and polyether compounds expressed by the general formula (IV-2) below can be used as the electron donor:

$$R^p_n\text{—Si—}(OR^q)_{4-n} \ldots \quad \text{(IV-1)}$$

wherein n is a value of 1, 2, or 3, and when n is 1, $R^p$ indicates a secondary or tertiary hydrocarbon group and when n is 2 or 3, at least one of $R^p$ indicates a secondary or tertiary hydrocarbon group and the other $R^p$ indicates a hydrocarbon group, and a plurality of $R^p$ may be the same as or different from each other. $R^q$ is a hydrocarbon group of 1 to 4 carbon atoms and when 4−n is 2 or 3, $R^q$ may be the same as or different from each other.

In the silicon compound expressed by the above general formula (IV-1), cyclopentyl group, cyclopentenyl group, cyclopentadienyl group, these groups having substituents, and hydrocarbon groups in which the carbon adjacent to the Si is a secondary or tertiary carbon may be given as examples of the secondary or tertiary hydrocarbon group.

Among the above, dimethoxysilanes, particularly dimethoxysilanes of the following general formula (IV-3), are preferable:

wherein $R^r$ and $R^s$ may be the same as or different from each other and are each a cyclopentyl group, substituted cyclopentyl group, cyclopentenyl group, substituted cyclopentenyl group, cyclopentadienyl group, substituted cyclopentadienyl group, or a hydrocarbon group in which the carbon adjacent to the Si is a secondary or tertiary carbon.

Specific examples of the organic silicon compound expressed by the above general formula (IV-3) include dicyclopentyldimethoxysilane, di-t-butyldimethoxysilane, di(2-methylcyclopentyl)dimethoxysilane, di(3-methylcyclopentyl)dimethoxysilane, di-t-amyldimethoxysilane, etc.

Compounds of the following general formula (IV-2) may be given as examples of the polyether compound.

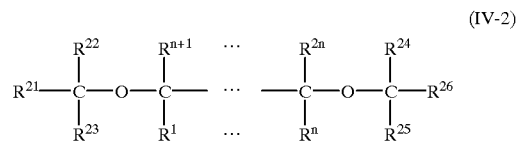

In the above formula n is an integer that satisfies $2 \leq n \leq 10$ and $R^1$ to $R^{26}$ indicate substituents having at least one element selected from among carbon, hydrogen, oxygen, halogen, nitrogen, sulfur, phosphorus, boron, and silicon; any of $R^1$ to $R^{26}$, preferably $R^1$ to $R^{2n}$ in combination may form a ring other than a benzene ring; and the backbone chain of the compound may contain atoms other than carbon atom.

Preferably, a 1,3-diether is used as the above-mentioned polyether compound, and 2,2-diisobutyl-1,3-dimethoxypropane, 2-isopropyl-2-isobutyl-1,3-dimethoxypropane, 2-isopropyl-2-isopentyl-1,3-dimethoxypropane, 2,2-dicyclohexyl-1,3-dimethoxypropane, 2,2-bis(cyclohexylmethyl)-1,3-dimethoxypropane, and 9,9-dimethoxymethylfluorene are particularly preferable.

Besides the above, water and anionic, cationic, and nonionic surfactants may also be used.

These electron donors may be used singly or in combination of two or more.

A titanium catalysis component (a-2) supported on a carrier may be prepared by using a particulate carrier (e), such as those described later, in the process of contacting the above-mentioned titanium compound, magnesium compound, and electron donor with each other.

The titanium catalyst component (a-2) may be produced by contacting the above-mentioned titanium compound, magnesium compound, and if necessary, an electron donor with each other through various methods including known methods. The above-mentioned components may be contacted under the presence of other reaction reagents such as silicon, phosphorus, or aluminum.

Specific methods of producing the titanium catalyst component (a-2) shall be explained below briefly with several examples where an electron donor is used, but the electron donor does not have to be used necessarily.

(1) A method in which a solution containing a magnesium compound, an electron donor, and a hydrocarbon solvent is subject to a contact reaction with an organometallic compound to precipitate a solid, and is further subject to a contact reaction with a titanium compound, after or during the precipitation of the solid.

(2) A method in which a complex comprised of a magnesium compound and an electron donor is subjected to a contact reaction with an organometallic compound and then subject to a contact reaction with a titanium compound.

(3) A method in which a contact product of an inorganic carrier and an organic magnesium compound is subjected to a contact reaction with a titanium compound preferably together with an electron donor. In this method, the contact product may previously be contacted and reacted with a halogen-containing compound and/or an organometallic compound.

(4) A method in which an inorganic or organic carrier is mixed with a solution containing a magnesium compound, an electron donor, and optionally a hydrocarbon solvent to obtain a product in which the magnesium compound is supported on the inorganic or organic carrier, and the product is then contacted with a titanium compound.

(5) A method in which a solution containing a magnesium compound, a titanium compound, an electron donor, and optionally a hydrocarbon solvent is contacted with an inorganic or organic carrier to obtain a solid titanium catalyst component in which magnesium and titanium are supported on the carrier.

(6) A method in which a liquid-form organic magnesium compound is contacted and reacted with a halogen-containing titanium compound. In this case, an electron donor is used at least once.

(7) A method in which a liquid-form organic magnesium compound is contacted and reacted with a halogen-containing titanium compound, and then the product is contacted with a titanium compound. In this case, an electron donor is used at least once.

(8) A method in which an alkoxy group containing magnesium compound is contacted and reacted with a halogen-containing titanium compound. In this case, an electron donor is used at least once.

(9) A method in which a complex comprising an alkoxy group containing magnesium compound and an electron donor is contacted and reacted with a titanium compound.

(10) A method in which a complex comprising an alkoxy group containing magnesium compound and an electron donor is contacted with an organometallic compound and then contacted and reacted with a titanium compound.

(11) A method in which a magnesium compound, an electron donor, and a titanium compound are contacted and reacted in an arbitrary order. For this reaction, the respective components may be pretreated with an electron donor and/or a reaction assistant such as an organometallic compound or a halogen-containing silicon compound. In this method, it is preferable to use the electron donor at least once.

(12) A method in which a liquid-form magnesium compound without reducing ability is reacted, preferably in the presence of an electron donor, with a liquid-form titanium compound to precipitate a solid magnesium-titanium complex.

(13) A method in which the reaction product obtained by (12) is further reacted with a titanium compound.

(14) A method in which the reaction product obtained by (11) or (12) is further reacted with an electron donor and a titanium compound.

(15) A method in which a magnesium compound and a titanium compound, preferably together with an electron donor, are pulverized to obtain a solid which is then treated with a halogen, a halogen compound, or an aromatic hydrocarbon. This method may include a step of pulverizing a magnesium compound alone; a complex comprised of a magnesium compound and an electron donor; or a magnesium compound and a titanium compound. Further, after the pulverization, the solid may be pretreated with a reaction assistant followed by treatment with a halogen, etc. Organometallic compounds and halogen-containing silicon compounds may be given as examples of the reaction assistant.

(16) A method in which a magnesium compound is pulverized and then contacted and reacted with a titanium compound. In this method, it is preferable to use an electron donor and a reaction assistant during the pulverization and/or during the contact reaction.

(17) A method in which the compound obtained by any of (11) to (16) above is treated with a halogen, a halogen compound, or an aromatic hydrocarbon.

(18) A method in which a contact reaction product of a metal oxide, an organic magnesium compound, and a halogen-containing compound is further contacted with a titanium compound preferably together with an electron donor.

(19) A method in which a magnesium compound such as a magnesium salt of an organic acid, alkoxymagnesium, aryloxymagnesium, etc. is reacted with a titanium compound and/or a halogen-containing hydrocarbon preferably together with an electron donor.

(20) A method in which a hydrocarbon solution containing at least a magnesium compound and an alkoxytitanium compound is contacted with a titanium compound and/or an electron donor. In this method, it is preferable that a halogen-containing compound such as a halogen-containing silicon compound is allowed to coexists.

(21) A method in which a liquid-form magnesium compound without reducing ability is reacted with an organometallic compound to precipitate a solid magnesium-metal (aluminum) complex and then the complex is reacted with an electron donor and a titanium compound.

The amounts of the respective components used to prepare the titanium catalyst component (a-2) vary depending on the preparation method and cannot be specified in particular. However, for example, 0.01 to 20 moles, preferably 0.1 to 10 moles of the electron donor and 0.01 to 1000 moles, preferably 0.1 to 200 moles of the titanium compound are used per mole of the magnesium compound.

The titanium catalyst component (a-2) obtained by such methods contain magnesium, titanium, and halogen and may contain an electron donor if necessary.

In this titanium catalyst component (a-2), the halogen/titanium ratio (atomic ratio) is approximately 2 to 200, preferably approximately 4 to 100; the electron donor/titanium ratio (molar ratio) is 0.01 to 100, preferably approximately 0.2 to 10; and the magnesium/titanium ratio (atomic ratio) is approximately 1 to 100, preferably approximately 2 to 50.

In the case where this titanium catalyst component (a-2) is solid in form, it contains magnesium halide of a crystal size smaller than that of a commercially available magnesium halide, and usually has a specific surface area of approximately 10 m$^2$/g or more, preferably approximately 30 to 1000 m$^2$/g, and more preferably approximately 50 to 800 m$^2$/g. Since this titanium catalyst component (a-2) is formed by integration of the above components with each other, it does not substantially change in its composition by hexane washing.

The titanium catalyst component (a-2) used in the present invention preferably exhibits, in combination with an organic aluminum compound, an ethylene polymerization activity of at least 200 g-polymer/millimole-Ti X hour X atm, preferably at least 500 g-polymer/millimole-Ti X hour X atm.

(b) Compound of a Transition Metal from Any of Groups 8 to 10 of the Periodic Table The compound (b) of a transition metal from any of Groups 8 to 10 of the periodic table used in the present invention is a transition metal compound of the following general formula (I).

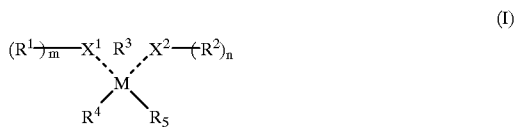

(I)

In the above formula, M indicates a transition metal atom from any of Groups 8 to 10 of the periodic table and is preferably nickel, palladium, or platinum.

$X^1$ and $X^2$ may be the same as or different from each other and are each a nitrogen atom or a phosphorus atom.

$R^1$ and $R^2$ may be the same as or different from each other and are each a hydrogen atom or hydrocarbon group. Specific examples of the hydrocarbon groups include linear or branched alkyl groups of 1 to 20 carbon atoms, such as methyl group, ethyl group, n-propyl group, isopropyl group, n-butyl group, isobutyl group, sec-butyl group, tert-butyl group, pentyl group, hexyl group, etc.; aryl groups of 6 to 20 carbon atoms, such as phenyl group, naphthyl group, etc.; and substituted aryl groups, for example, the above-mentioned aryl groups which has 1 to 5 substituents, such as an alkyl group of 1 to 20 carbon atoms mentioned above, etc.

m and n may be the same as or different from each other and are each a value of 1 or 2 that satisfies the valence of $X^1$ and $X^2$, respectively.

$R^3$ is a group that binds $X^1$ and $X^2$ and indicates

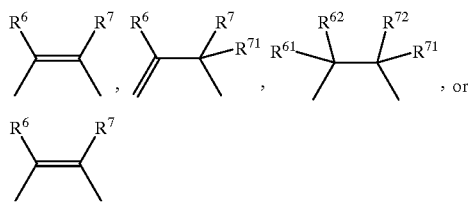

where $R^6$, $R^7$, $R^{61}$, $R^{62}$, $R^{71}$, and $R^{72}$ may be the same as or different from each other and are each a hydrogen atom or hydrocarbon group, such as those described for $R^1$ and $R^2$ mentioned above.

Two or more groups, preferably two adjacent groups among $R^1$, $R^2$, $R^6$(or $R^{61}$ $R^{62}$), and $R^7$(or $R^{71}$, $R^{72}$) may be bonded to each other to form a ring together with the carbon atoms to which the groups are bonded.

$R^4$ and $R^5$ may be the same as or different from each other and are each a hydrogen atom, halogen atom, or hydrocarbon group.

Fluorine, chlorine, bromine, and iodine can be given as examples of the halogen atom.

Specific examples of the hydrocarbon groups include alkyl groups of 1 to 20 carbon atoms and aryl groups of 6 to 20 carbon atoms as described for $R^1$ and $R^2$ and aralkyl groups of 7 to 20 carbon atoms, such as benzyl group. The aryl groups and aralkyl groups may have one or more substituents, such as an alkyl group of 1 to 20 carbon atoms as mentioned above $R^4$ and $R^5$ may also indicate groups expressed as $-OR^8$, $-SR^9$, $-N(R^{10})_2$, or $-P(R^{11})_2$.

Each of $R^8$ to $R^{11}$ indicates an alkyl group of 1 to 20 carbon atoms or an aryl group of 6 to 20 carbon atoms, such as those described for $R^1$ and $R^2$ mentioned above; a cycloalkyl alkyl group of 6 to 20 carbon atoms, such as cyclohexyl group; an aralkyl group of 7 to 20 carbon atoms, such as benzyl group; or an organic silyl group, such as the methylsilyl group, dimethylsilyl group, trimethylsilyl group, ethylsilyl group, diethylsilyl group, triethylsilyl group, etc. The above-mentioned aryl and aralkyl groups may have one or more substituents, such as an alkyl group of 1 to 20 carbon atoms as mentioned above. The groups $R^{10}$ may be bonded to each other to form a ring and the groups $R^{11}$ may be bonded to each other to form a ring.

The above-mentioned $R^4$ and $R^5$ may also be bonded to each other to form a ring.

A compound indicated by the following general formula (I') is preferable as the transition metal compound of the general formula (I) given above:

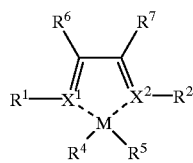

wherein M, $X^1$, $X^2$, $R^1$, $R^2$, $R^4$, $R^5$, $R^6$, and $R^7$ are the same as those in general formula (I) given above.

The following compounds may be given as specific examples of the transition metal compound expressed by the general formula (I'). In the formulae below, iPr indicates an isopropyl group.

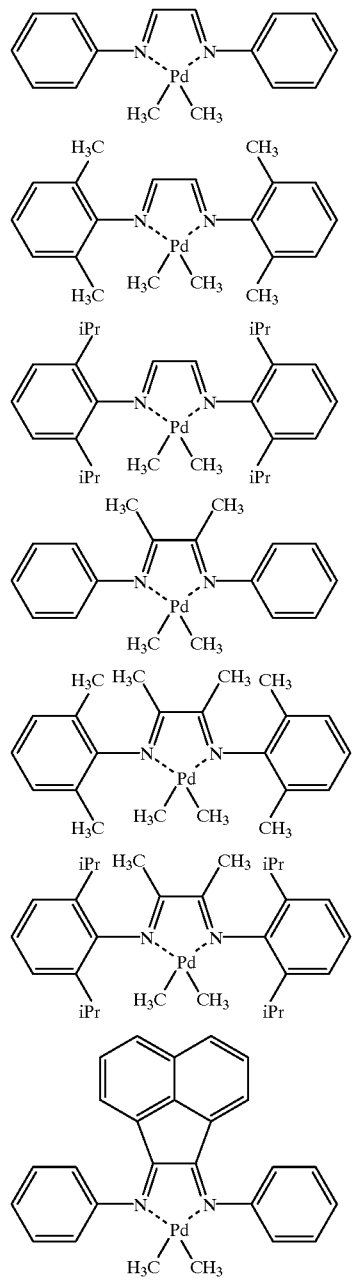

-continued
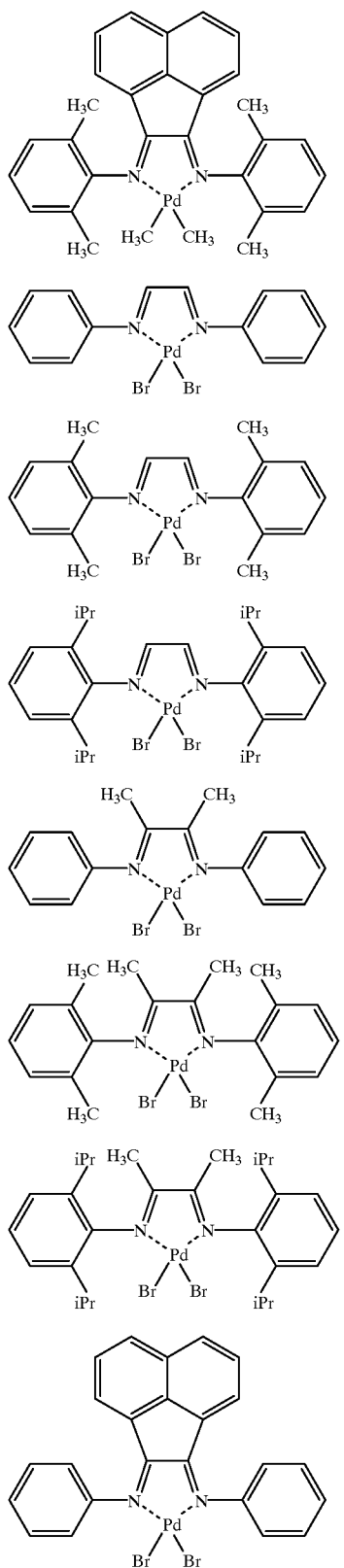
-continued
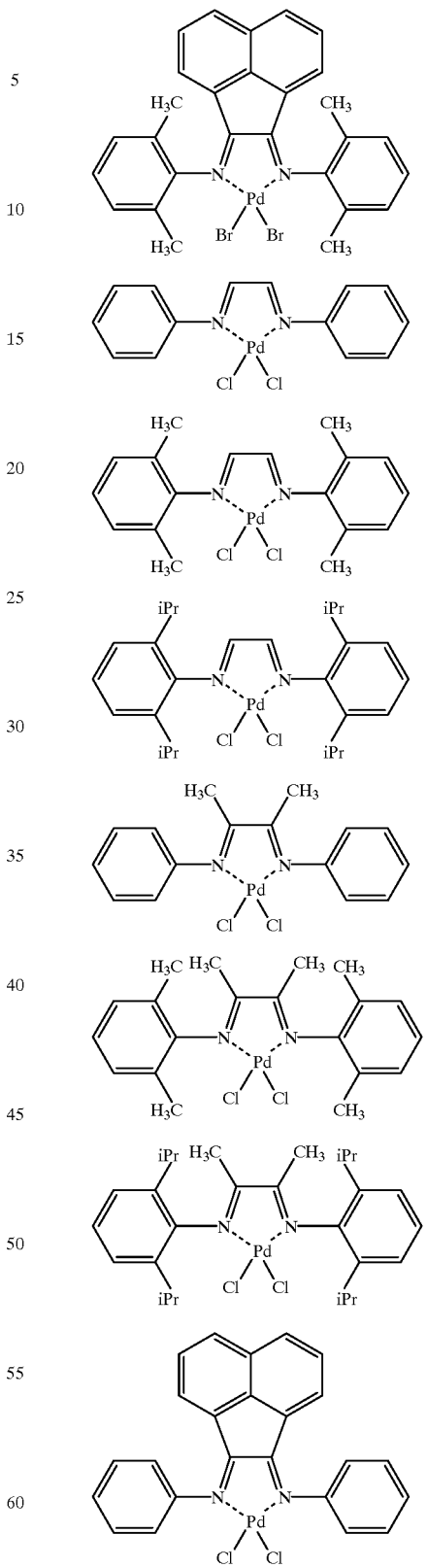

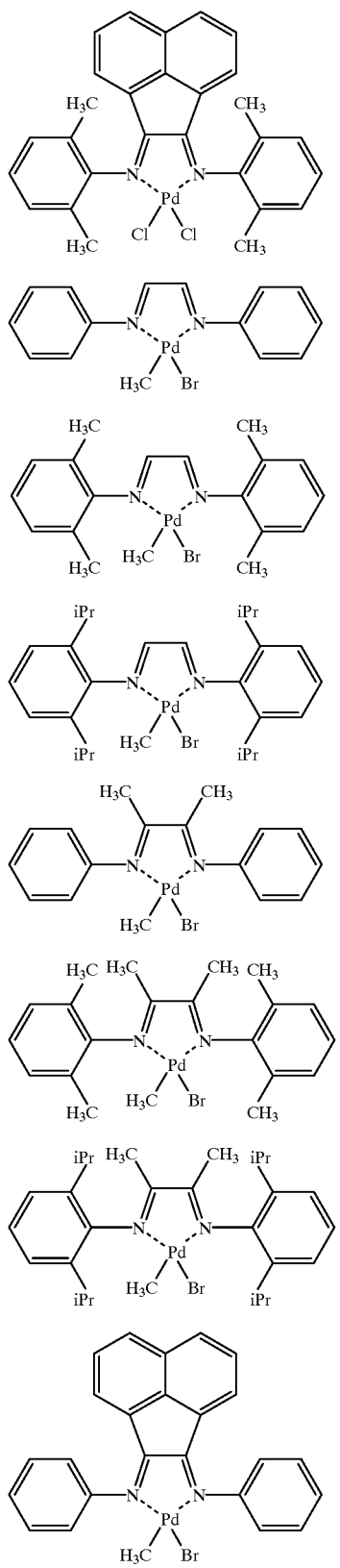
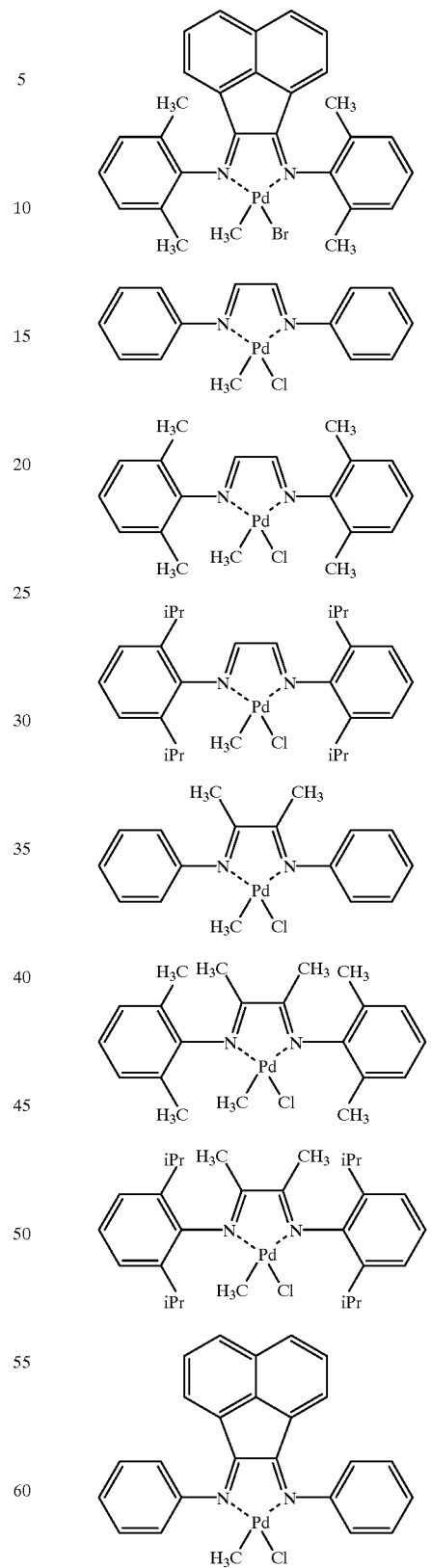

-continued
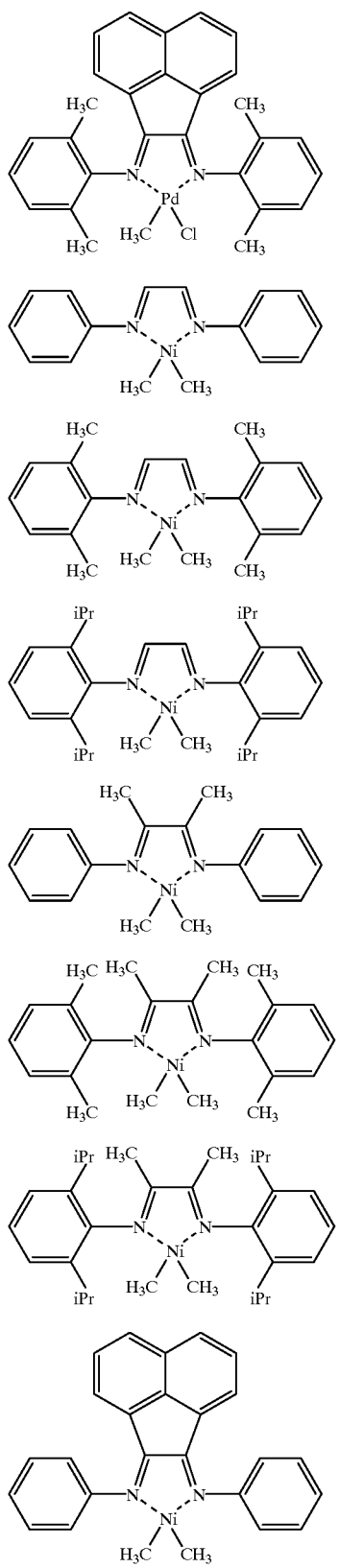
-continued
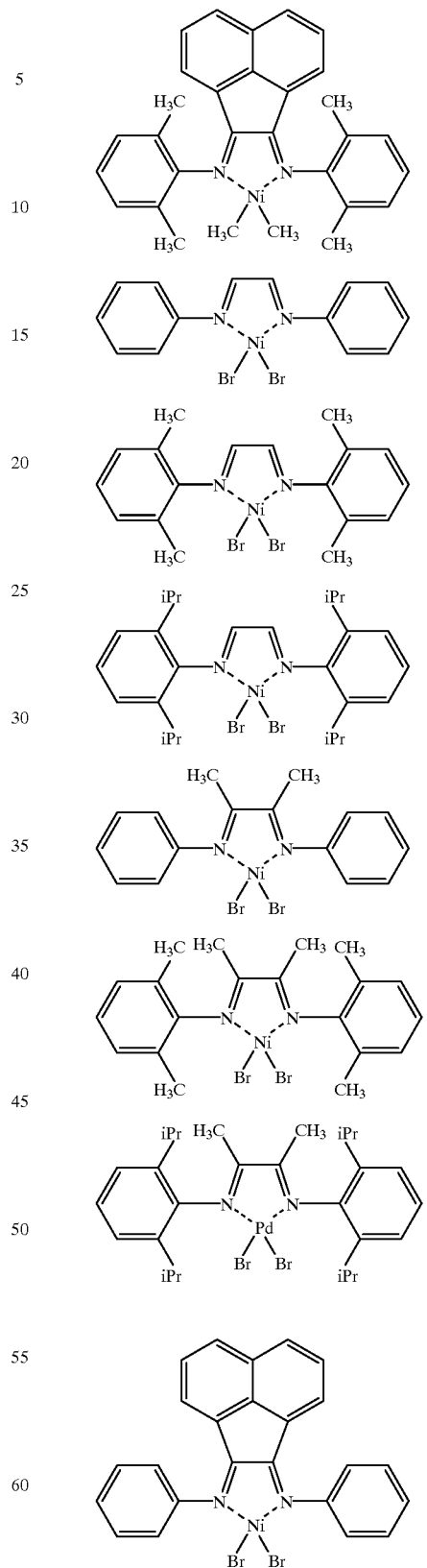

-continued
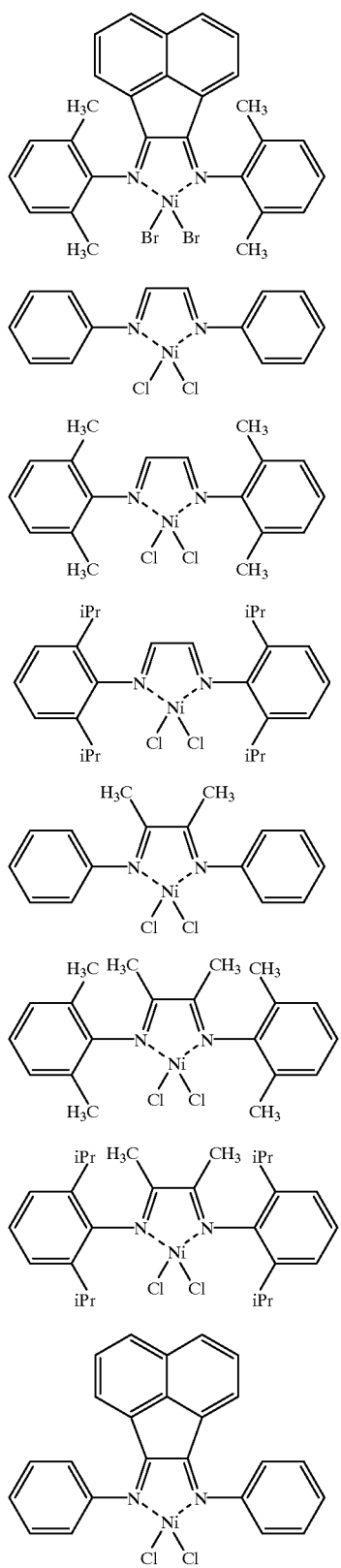
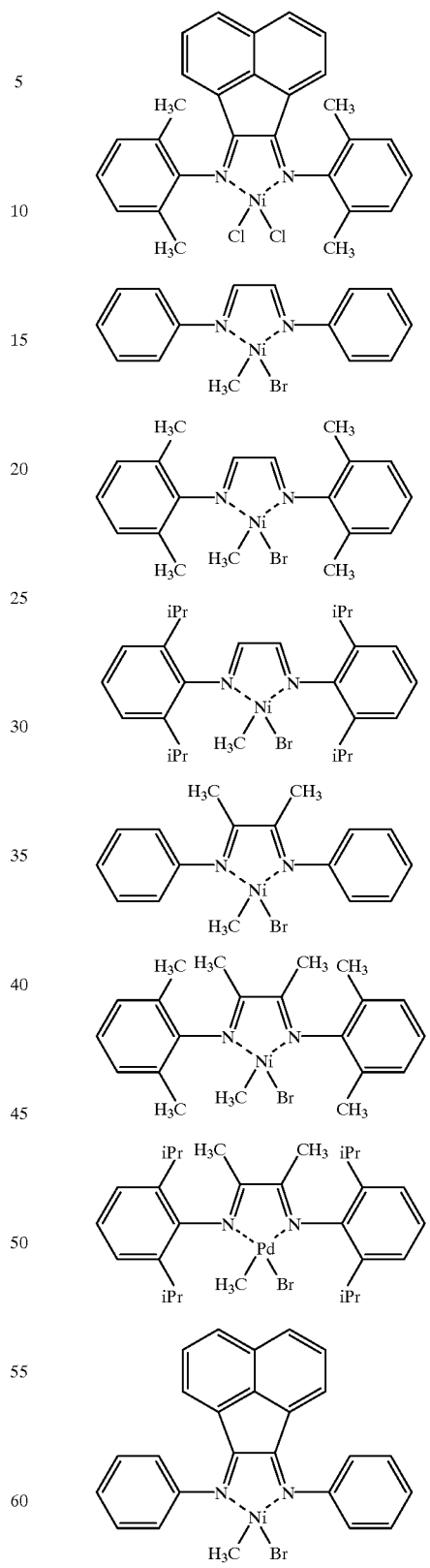

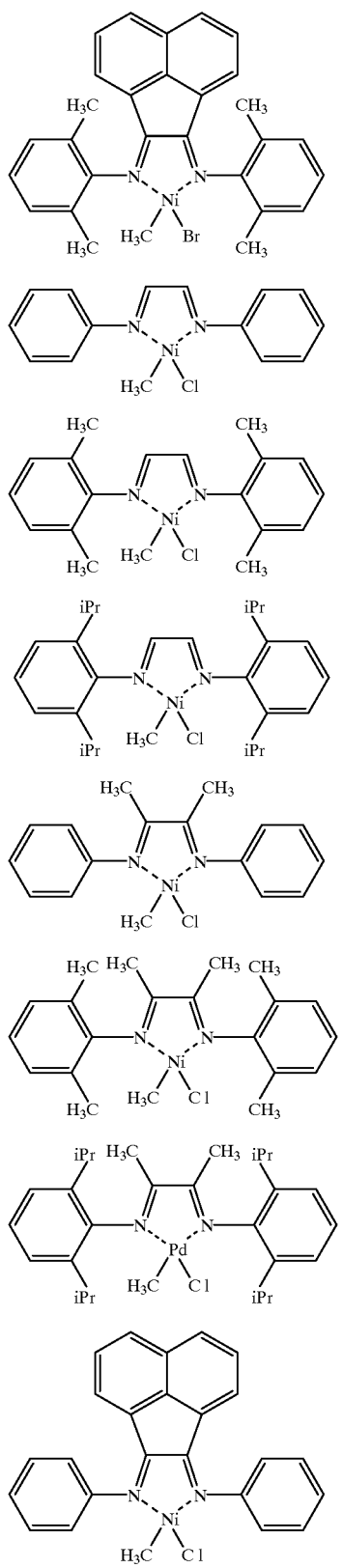

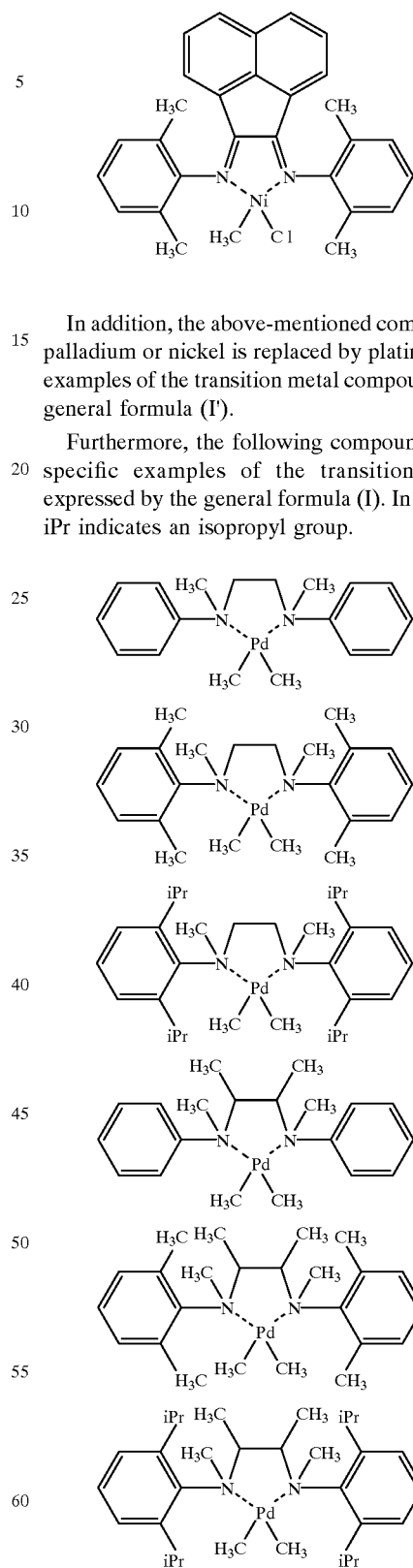

In addition, the above-mentioned compounds in which the palladium or nickel is replaced by platinum can be given as examples of the transition metal compound expressed by the general formula (I').

Furthermore, the following compounds may be given as specific examples of the transition metal compound expressed by the general formula (I). In the formulae below, iPr indicates an isopropyl group.

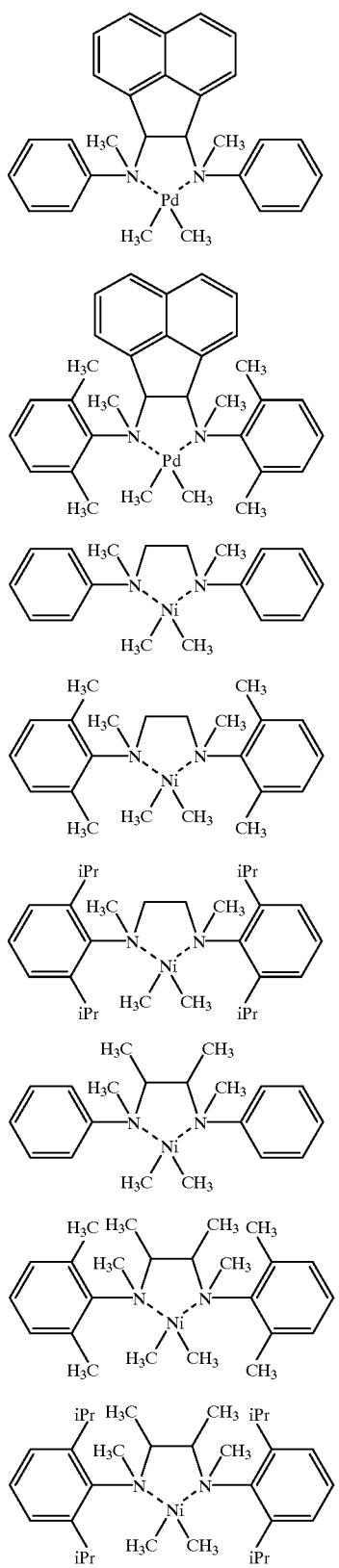

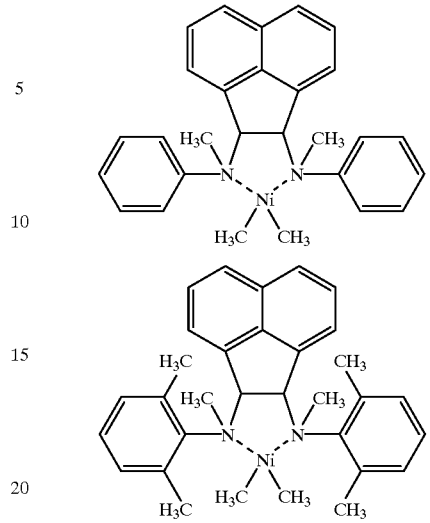

In addition, the above-mentioned compounds in which the palladium or nickel is replaced by platinum can be given as examples of the transition metal compound expressed by the general formula (I).

The transition metal compounds described above may be used singly or in combination of two or more.

(c-1) Organic Aluminum Oxycompound

The organic aluminum oxycompound (c-1) used in the present invention may be either aluminoxane conventionally known or an organic aluminum oxycompound insoluble in benzene as disclosed in Japanese laid-open patent publication No. 2-78687.

The conventionally known aluminoxane may be produced for example by the following methods and is usually obtained as a solution in a hydrocarbon solvent.

(1) A method in which an organic aluminum compound, such as a trialkylaluminum, etc., is added to a hydrocarbon medium suspension of a compound containing adsorbed water or a salt containing water of crystallization, such as magnesium chloride hydrate, copper sulfate hydrate, aluminum sulfate hydrate, nickel sulfate hydrate, cerous chloride hydrate, etc., to cause the organic aluminum compound to react with the adsorbed water or the water of crystallization.

(2) A method in which water, ice, or water vapor is made to act directly on an organic aluminum compound, such as a trialkylaluminum, etc., in a medium such as benzene, toluene, ethyl ether, tetrahydrofuran, etc.

(3) A method in which an organic aluminum compound, such as a trialkylaluminum, etc., is made to react with an organic tin oxide, such as dimethyltin oxide, dibutyltin oxide, etc., in a medium such as decane, benzene, toluene, etc.

The above-mentioned alminoxane may contain a small amount of organometallic component. Also, the solvent or unreacted organic aluminum compound may be removed by distillation from the recovered aluminoxane solution and then the aluminoxane may be redissolved in a solvent or suspended in a poor solvent for aluminoxane.

Specific examples of the organic aluminum compound used to prepare the aluminoxane include the organic aluminum compounds of (d-1) under (d) organometallic compound described later. Among these, trialkylaluminums and tricycloalkylaluminums are preferable and trimethylaluminum is particularly preferable.

The organic aluminum compound may be used singly or in combination of two or more.

Hydrocarbon solvents, including aromatic hydrocarbons, such as benzene, toluene, xylene, cumene, cymene, etc.; aliphatic hydrocarbons, such as pentane, hexane, heptane, octane, decane, dodecane, hexadecane, octadecane, etc.; alicyclic hydrocarbons, such as cyclopentane, cyclohexane, cyclooctane, methylcyclopentane, etc.; petroleum distillates, such as gasoline, kerosene, gas oil, etc.; and halogenated compounds, especially, chlorinated or brominated compounds of the above-mentioned aromatic hydrocarbons, aliphatic hydrocarbons, and alicyclic carbons, can be given as examples of the solvent used in preparing the aluminoxane. Ethers, such as ethyl ether, tetrahydrofuran, etc., may also be used. Among the above solvents, aromatic hydrocarbons and aliphatic hydrocarbons are particularly preferable.

Also, the above-mentioned benzene-insoluble organic aluminum oxycompound contains an Al component, soluble in benzene at 60° C., in an amount of usually 10% or less, preferably of 5% or less, and particularly preferably of 2% or less, in terms of Al atom, and is thus insoluble or poorly soluble in benzene.

The organic aluminum oxycompounds (c-1) may be used singly or in combination of two or more.

(c-2)Alkylboronic Acid Derivatives

Compounds expressed by the following general formula (V) can be given as examples of the alkylboronic acid derivative (c-2) used in the present invention.

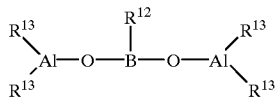

(V)

In the above formula, $R^{12}$ indicates a hydrocarbon group of 1 to 10 carbon atoms.

$R^{13}$ may be the same as or different from each other and are each a hydrogen atom, halogen atom, siloxy group, lower alkyl substituted siloxy group, or hydrocarbon group of 1 to 10 carbon atoms.

The alkyloboronic acid derivative of the general formula (V) can be produced by reacting an alkylboronic acid of the following general formula (VI)

(VI)

where $R^{12}$ indicates the same group as $R^{12}$ in general formula (V), with an organic aluminum compound in an inert solvent under an inert gas atmosphere at a temperature of –80° C. to room temperature for 1 minute to 24 hours.

Specific examples of the alkylboronic acid of general formula (VI) include methylboronic acid, ethylboronic acid, isopropylboronic acid, n-propylboronic acid, n-butylboronic acid, isobutylboronic acid, n-hexylboronic acid, cyclohexylboronic acid, phenylboronic acid, 3,5-difluorophenylboronic acid, pentafluorophenylboronic acid, 3,5-bis(trifluoromethyl)phenylboronic acid, etc. Among the above, methylboronic acid, n-butylboronic acid, isobutylboronic acid, 3,5-difluorophenylboronic acid, and pentafluorophenylboronic acid are preferable. One such alkylboronic acid is used singly or in combination of two or more.

Organic aluminum compounds of the following general formulae (VII-1), (VII-2), and (VII-3) may be given as examples of the organic aluminum compound to be reacted with an above-mentioned alkylboronic acid.

 (VII-1)

 (VII-2)

 (VII-3)

In the above formulae, Y indicates a hydrogen atom or a halogen atom, $R^{14}$ indicates a hydrogen atom, a halogen atom, or a hydrocarbon group of 1 to 10 carbon atoms, p is a value satisfying $0 \leq p \leq 3$, and $R^{13}$ indicates the same group as $R^{13}$ in general formula (V).

Specific examples of the organic aluminum compound of the above formulae (VII-1), (VII-2), and (VII-3) include the organic aluminum compounds of (d-1) under (d) organometallic compound described later. Among these, trialkylaluminums and tricycloalkylaluminums are preferable, and trimethylaluminum, triethylaluminum, and triisobutylaluminum are particularly preferable. The organic aluminum compounds may be used singly or in combination of two or more.

The above-described alkylboronic acid derivatives may be used singly or in combination of two or more.

(c-3)Compound Reacting with the Transition Metal Compound to Form an Ion Pair

The compound reacting with the transition metal compound to form an ion pair (c-3) (referred to hereinafter as "ionizing ionic compound") used in the present invention is a compound that reacts with the above-described transition metal compound (a-1) and/or transition metal compound (b) to form an ion pair. Examples of such a compound include Lewis acids, ionic compounds, borane compounds, carborane compounds, etc., as described in Japanese laid-open patent publications No. 1-501950, No. 1-502036, No. 3-179005, No. 3-179006, No. 3-207703 and No. 3-207704, USP No. 5321106, etc.

To be more specific, compounds expressed by $BR_3$ (where R is a phenyl group that may have a substituent such as fluorine, methyl group, trifluoromethyl group, etc., or fluorine) may be used as the Lewis acid. Examples thereof include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron, tris(3,5-dimethylphenyl)boron, etc.

Examples of the ionic compound include compounds of the following general formula (VIII).

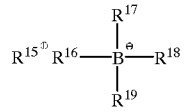

(VIII)

In the above formula, $R^{15}$ is for example $H^+$, carbonium cation, oxonium cation, ammonium cation, phosphonium cation, cycloheptyltolyenyl cation, transition metal containing cations, such as ferrocenium cation, etc.

$R^{16}$ to $R^{19}$ may be the same as or different from each other and are each an organic group, preferably an aryl group or a substituted aryl group.

Specific examples of the above-mentioned carbonium cation include trisubstituted carbonium cations, such as triphenylcarbonium cation, tri(methylphenyl)carbonium cation, tri(dimethylphenyl)carbonium cation, etc.

Specific examples of the above-mentioned ammonium cation include trialkylammonium cations, such as trimethylammonium cation, triethylammonium cation, tripropylammonium cation, tributylammonium cation, tri(n-butyl) ammonium cation, etc.; N,N-dialkylanilinium cations, such as N,N-diethylanilinium cation, N,N,2,4,6-pentamethylanilinium cation, etc.; and dialkylammonium cations, such as di(isopropyl)ammonium cation, dicyclohexylammonium cation, etc.

Specific examples of the above-mentioned phosphonium cation include triarylphosphonium cations, such as triphenylphosphonium cation, tri(methylphenyl)phosphonium cation, tri(dimethylphenyl) phosphonium cation, etc.

Preferable $R^{15}$ includes for example a carbonium cation or an ammonium cation and triphenylcarbonium cation or N,N-diethylanilinium cation is particularly preferable.

A boron compound of the following formula (IX) is preferable as the ionic compound.

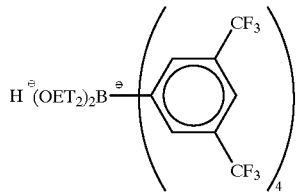

(IX)

In the above formula, Et indicates an ethyl group.

Trialkyl-substituted ammonium salts, N,N-dialkylanilinium salts, dialkylammonium salts, triarylphosphonium salts, etc., can also be given as examples of the ionic compound.

Specific examples of trialkyl-substituted ammonium salts include triethylaimonium tetra(phenyl)boron, tripropylammonium tetra(phenyl)boron, tri(n-butyl)ammonium tetra (phenyl)boron, trimethylammonium tetra(p-tolyl)boron, trimethylammonium tetra(o-tolyl)boron, tri(n-butyl) ammonium tetra(pentafluorophenyl)boron, tripropylammonium tetra(o,p-dimethylphenyl)boron, tri(n-butyl)ammonium tetra(m,m-dimethylphenyl)boron, tri(n-butyl)ammonium tetra(p-trifluoromethylphenyl)boron, tri(n-butyl)ammonium tetra(3,5-di-trifluoromethylphenyl)boron, tri(n-butyl)ammonium tetra(o-tolyl)boron, etc.

Specific examples of N,N-dialkylanilinium salts include N,N-dimethylanilinium tetra(phenyl)boron, N,N-diethylanilinium tetra(phenyl)boron, N,N,2,4,6-pentamethylanilinium tetra(phenyl)boron, etc.

Specific examples of dialkyl ammonium salts include di(1-propyl)ammonium tetra(pentafluorophenyl)boron, dicyclohexylammonium tetra(phenyl)boron, etc.

Other examples of ionic compounds include triphenylcarbenium tetrakis(pentafluorophenyl)borate, N,N-dimethylanilinium tetrakis(pentafluorophenyl)borate, ferrocenium tetra(pentafluorophenyl)borate, triphenylcarbenium pentaphenylcyclopentadienyl complex, N,N-diethylanilinium pentaphenylcyclopentadienyl complex, and boron compounds of the following formula (X).

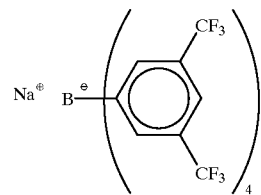

(X)

Specific examples of borane compounds include decaborane(14); salts of anions, such as bis[tri(n-butyl)ammonium] nonaborate, bis[tri(n-butyl)ammonium] decaborate, bis[tri(n-butyl)ammonium] undecaborate, bis[tri(n-butyl)ammonium] dodecaborate, bis[tri(n-butyl)ammonium] decachlorodecaborate, bis[tri(n-butyl)ammonium] dodecachlorododecaborate, etc.; and salts of metal borane anions, such as tri(n-butyl)ammonium bis (dodecahydridedodecaborate)cobaltate (III), bis[tri(n-butyl)ammonium] bis(dodecahydridedodecaborate)nickelate(III), etc.

Specific examples of carborane compounds include salts of anions, such as 4-carbanonaborane(14), 1,3-dicarbanonaborane(13), 6,9-dicarbadecaborane(14), dodecahydride-1-phenyl-1,3-dicarbanonaborane, dodecahydride-:-methyl-1,3-dicarbanonaborane, undecahydride-1,3-dimethyl-1,3-dicarbanonaborane, 7,8-dicarbaundecaborane(13), 2,7-dicarbaundecaborane(13), undecahydride-7,8-dimethyl-7,8-dicarbaundecaborane, dodecahydride-11-methyl-2,7-dicarbaundecaborane, tri(n-butyl)ammonium 1-carbadecaborate, tri(n-butyl)ammonium 1-carbaundecaborate, tri(n-butyl)ammonium 1-carbadodecaborate, tri(n-butyl)ammonium 1-trimethylsilyl-1-carbadecaborate, tri(n-butyl)ammonium bromo-1-carbadodecaborate, tri(n-butyl)ammonium 6-carbadecaborate(14), tri(n-butyl)ammonium 6-carbadecaborate(12), tri(n-butyl)ammonium 7-carbaundecaborate(13), tri(n-butyl)ammonium 7,8-dicarbaundecaborate (12), tri(n-butyl)ammonium 2,9-dicarbaundecaborate(12), tri(n-butyl)ammonium dodecahydride-8-methyl-7,9-dicarbaundecaborate, tri(n-butyl)ammonium undecahydride-8-ethyl-7,9-dicarbaundecaborate, tri(n-butyl)ammonium undecahydride-8-butyl-7,9-dicarbaundecaborate, tri(n-butyl)ammonium undecahydride-8-aryl-7,9-dicarbaundecaborate, tri(n-butyl)ammonium undecahydride-9-trimethylsilyl-7,8-dicarbaundecaborate, tri(n-butyl)ammonium decahydride-4,6-dibromo-7-carbaundecaborate, etc.; and salts of metal carborane anions, such as tri(n-butyl)ammonium bis(nonahydride-1,3-dicarbanonaborate)cobaltate(III), tri(n-butyl)ammonium bis(undecahydride-7,8-dicarbaundecaborate)ferrate(III), tri(n-butyl)ammonium bis(undecahydride-7,8,-dicarbaundecaborate)cobaltate(III),
tri(n-butyl)ammonium bis(undecahydride-7,8,-dicarbaundecaborate)nickelate(III),
tri(n-butyl)ammonium bis(undecahydride-7,8,-dicarbaundecaborate)cuprate(III),
tri(n-butyl)ammonium bis(undecahydride-7,8,-dicarbaundecaborate)aurate(III),
tri(n-butyl)axmmonium bis(nonahydride-7,8,-dimethyl-7,8-dicarbaundecaborate)ferrate(III),
tri(n-butyl)ammonium bis(nonahydride-7,8-dimethyl-7,8-dicarbaundecaborate)chromate(III),
tri(n-butyl)ammonium bis(tribromooctahydride-7,8-dicarbaundecaborate)cobaltate(III),
tris[tri(n-butyl)ammonium] bis(undecahydride-7-carbaundecaborate)chromate(III),
bis[tri(n-butyl)ammonium] bis(undecahydride-7-carbaundecaborate)manganate(IV),
bis[tri(n-butyl)ammonium] bis(undecahydride-7-carbaundecaborate)cobaltate(III),
bis[tri(n-butyl)ammonium] bis(undecahydride-7-carbaundecaborate)nickelate(IV), etc.

The above-mentioned ionizing ionic compounds (c-3) may be used singly or in combination of two or more.

The olefin polymerization catalyst according to the present invention is formed from the above-mentioned (a-1) compound of a transition metal from Group 4 of the periodic table or (a-2) titanium catalyst component containing magnesium, titanium, and halogen; (b) compound of a transition metal from any of Groups 8 to 10 of the periodic table; and (c) at least one compound selected from among (c-1) organic aluminum oxycompounds, (c-2) alkylboronic acid derivatives, and (c-3) compounds reacting with the transition metal compound to form an ion pair, and in addition to the above, an organometallic compound (d) and a fine particulate carrier (e) such as those described below may also be used if necessary.

(d) Orcanometallic Compound

Specific examples of the organometallic compound (d) used if necessary in the present invention include the following organometallic compounds of metals from Groups 1 and 2 and Groups 12 and 13 of the periodic table.

(d-1) Organic aluminum compounds of the general formula: $R^a_m Al(OR^b)_n H_p X_q$
where $R^a$ and $R^b$ may be the same as or different from each other and are each a hydrocarbon group of 1 to 15, preferably 1 to 4 carbon atoms, X is a halogen atom, m is a value satisfying $0<m \leq 3$, n is a value satisfying $0 \leq n \leq 3$, p is a value satisfying $0 \leq p<3$, q is a value satisfying $0 \leq q<3$, and $m+n+p+q=3$.

(d-2) Complex alkylates of a Group 1 metal and aluminum of the general formula: $M^2 AlR^a_4$
where $M^2$ indicates Li, Na, or K and $R^a$ indicates a hydrocarbon group of 1 to 15, preferably 1 to 4 carbon atoms.

(d-3) Dialkyl compounds of a group 2 or group 12 metal of the general formula: $R^a R^b M^3$
where $R^a$ and $R^b$ may be the same as or different from each other and are each a hydrocarbon group of 1 to 15, preferably 1 to 4 carbon atoms and $M^3$ indicates Mg, Zn, or Cd.

The following compounds may be given as examples of organic aluminum compounds of (d-1) mentioned above.

1) Organic aluminum compounds of the general formula, $R^a_m Al(OR^b)_{3-m}$
where $R^a$ and $R^b$ may be the same as or different from each other and are each indicating a hydrocarbon group of 1 to 15, preferably 1 to 4 carbon atoms and m is a number preferably satisfying $1.5 \leq m \leq 3$.

2) Organic aluminum compounds of the general formula, $R^a_m AlX_{3-m}$
where $R^a$ indicates a hydrocarbon group of 1 to 15, preferably 1 to 4 carbon atoms, X indicates a halogen atom, and m is a number preferably satisfying $0 \leq m \leq 3$.

3) Organic aluminum compounds of the general formula, $R^a_m AlH_{3-m}$
where $R^a$ is a hydrocarbon group of 1 to 15, preferably 1 to 4 carbon atoms and m is a number preferably satisfying $2 \leq m<3$.

4) Organic aluminum compounds of the general formula, $R^a_m Al(OR^b)_n X_q$
where $R^a$ and $R^b$ may be the same as or different from each other and are each a hydrocarbon group of 1 to 15, preferably 1 to 4 carbon atoms, X indicates a halogen atom, m is a number satisfying $0<m \leq 3$, n is a number satisfying $0 \leq n<3$, q is a number satisfying $0 \leq q<3$, and $m+n+q=3$.

To be more specific, examples of the organic aluminum compounds of (d-1) mentioned above include tri-n-alkylaluminums, such as trimethylaluminum, triethylaluminum, tripropylaluminum, tri-n-butylaluminum, tripentylaluminum, trihexylaluminum, trioctylaluminum, tridecylaluminum, etc.;

tri-branched-alkylaluminums, such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum, tri-2-ethylhexylaluminum, etc.;

isprenylaluminums of the formula $(i-C_4H_9)_x Al_y (C_5H_{10})_z$ (wherein x, y, and z are positive numbers and $z \geq 2x$);

tricycloalkylaluminums, such as tricyclohexylaluminum, tricyclooctylaluminum, etc.;

triarylaluminums, such as triphenylaluminum, tritolylaluminum, etc.;

dialkylaluminum hydrides, such as diethylaluminum hydride, diisobutylaluminum hydride, etc.;

trialkenylaluminums, such as triisoprenylaluminum, etc.;

alkylaluminum alkoxides, such as isobutylaluminum methoxide, isobutylaluminum ethoxide, isobutylaluminum isopropoxide, etc.;

dialkylaluminum alkoxides, such as dimethylaluminum methoxide, dimethylaluminum ethoxide, diethylaluminum ethoxide, dibutylaluminum butoxide, etc.;

alkylaluminum sesquialkoxides, such as ethylaluminum sesquiethoxide, butylaluminum sesquibutoxide, etc.;

partially alkoxylated alkylaluminums having an average composition expressed by $R^a_{2.5} Al(OR^b)_{0.5}$, etc.;

dialkylaluminum aryloxides, such as diethylaluminum phenoxide, etc.;

dialkylaluminum halides, such as dimethylaluminum chloride, diethylaluminum chloride, dibutylaluminum chloride, diisobutylaluminum chloride, diethylaluminum bromide, etc.;

alkylaluminum sesquihalides, such as ethylaluminum sesquichloride, butylaluminum sesquichloride, ethylaluminum sesquibromide, etc.;

partially halogenated alkylaluminums including alkylaluminum dihalides, such as ethylaluminum dichloride, propylaluminum dichloride, butylaluminum dibromide, etc.;

dialkylaluminum hydrides, such as diethylaluminum hydride, dibutylaluminum hydride, etc.;

partially hydrogenated alkylaluminums including alkylaluminum dihydrides, such as ethylaluminum dihydride, propylaluminum dihydride, etc.; and partially alkoxylated and halogenated alkylaluminums, such as ethylaluminum ethoxychloride, butylaluminum butoxychloride, ethylaluminum ethoxybromide, etc.

Compounds similar to those of (d-1) described above, for example, organic aluminum compounds in which two or more aluminum compounds are bonded via a nitrogen atom, may also be used.

$$(C_2H_5)_2AlN(C_2H_5)Al(C_2H_5)_2$$

can be given as a specific example of such compounds.

$LiAl(C_2H_5)_4$, $LiAl(C_7H_{15})_4$, etc., can be given as examples of compounds of (d-2) described above.

Dimethylmagnesium, diethylmagnesium, dibutylmagnesium, butylethylmagnesium, etc., may be given as examples of compounds of (d-3) described above.

Besides the above, methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, etc., may also be used as organometallic compound (d).

Compounds which are capable of forming the above-mentioned organic aluminum compound in the polymerization system, for example, a combination of a halogenated aluminum and alkyllithium or a combination of a halogenated aluminum and alkylmagnesium, may also be used.

As the organometallic compound (d) used in the present invention, an organometallic compound having a branched chain alkyl group is preferred, an organometallic compound having isobutyl group is particularly preferred and a triisobutyl organometallic compound is especially preferred. As the metal, aluminum is preferred and triisobutylaluminum is most preferable.

Such organometallic compounds (d) act as an alkylating agent, and in the case where $R^4$ and/or $R^5$ bonded to the transition metal (M) in the transition metal compound (b) of the above-given general formula (I) is an atom or group other than an alkyl group, for example, a halogen atom such as chlorine, bromine, etc., or an alkoxy group such as a methoxy group, ethoxy group, butoxy group, etc., the atom or the group other than alkyl is substituted by an alkyl group. Such an alkyl group substituted transition metal compound (b) reacts with component (c), particularly with an ionizing ionic compound (c-3), to form an ionic complex of high catalytic activity.

Organometallic compounds (d) also act as scavengers and keep the reaction system clean by eliminating water and other impurities from the system to thereby achieve the effect of enabling the catalyst to exhibit the high and stable activity. This action is exhibited even in the case where $R^4$ and/or $R^5$ bonded to the transition metal (M) in transition metal compound (b) is an alkyl group. The above-mentioned scavenger effects can thus be obtained when organometallic compound (d) is used in combination with transition metal compound (b) having an alkyl group as $R^4$ and/or $R^5$ bonded to the transition metal (M) in general formula (I).

The above-mentioned organometallic compounds (d) may be used singly or in combination of two or more.

(e) Fine Particulate Carrier

The fine particulate carrier (e) used in the present invention if necessary is an inorganic or organic compound in the form of a granular or fine particulate solid having a particle size of preferably 10 to 300 μm, more preferably 20 to 200 μm. Among the above, porous oxides are preferable as inorganic compounds. Specific examples include $SiO_2$, $Al_2O_3$, MgO, ZrO, $TiO_2$, $B_2O_3$, CaO, ZnO, BaO, $ThO_2$, etc., and mixtures thereof, for example, $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO, etc. Among these, it is preferable to use a carrier containing at least one component selected from among the group consisting of $SiO_2$ and $Al_2O_3$ as the main components.

The above-mentioned inorganic oxides may contain small amounts of carbonate, sulfate, nitrate, and oxide components such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, $Li_2O$, etc.

Though the properties of such fine particle carriers (e) will differ according to type and producing method, it is desirable that the fine particulate carrier used in the present invention has a specific surface area in the range of 50 to 1000 $\mu m^2/g$, preferably 100 to 700 $m^2/g$ and a pore volume in the range of 0.3 to 2.5 $cm^3/g$. The fine particulate carrier may be calcined at 100 to 1000° C., preferably at 150 to 700° C., if necessary, before use.

Granular or fine particulate solids of organic compounds having a particle size in the range of 10 to 300 μm can also be given as examples of the fine particulate carrier (e) that can be used in the present invention. Examples of such organic compounds include (co)polymers produced using an α-olefin of 2 to 14 carbon atoms, such as ethylene, propylene, 1-butene, 4-methyl-1-pentene, etc., as the main component and (co)polymers produced using vinylcyclohexane or styrene as the main component.

Polymerization Method

The olefin polymerization catalyst according to the present invention is formed from the above-described compound (a-1) of a transition metal from Group 4 of the periodic table or titanium catalyst component (a-2) containing magnesium, titanium, and halogen, compound (b) of a transition metal from any of Groups 8 to 10 of the periodic table, at least one compound (c) selected from among (c-1) organic aluminum oxycompounds, (c-2) alkylboronic acid derivatives, and (c-3) compounds reacting with a transition metal compound to form an ion pair, and if necessary, the above-described organometallic compound (d) and fine particulate carrier (e).

Though the methods of use and order of addition of the respective components in the process of polymerization can be selected arbitrarily, the following methods can be given as examples.

(1) A method in which component (a-1) (or component (a-2)); component (b); and component (c) are added to a polymerizer in an arbitrary order.

(2) A method in which a catalyst component comprising component (a-1) supported on carrier (e); component (b); and component (c) are added to a polymerizer in an arbitrary order.

(3) A method in which a catalyst component comprising component (b) supported on carrier (e); component (a-1) (or component (a-2)); and component (c) are added to a polymerizer in an arbitrary order.

(4) A method in which a catalyst component comprising component (c) supported on carrier (e); component (a-1) (or component (a-2)); and component (b) are added to a polymerizer in an arbitrary order.

(5) A method in which a catalyst component comprising component (a-1) (or component (a-2)) and component (b) supported on carrier (e); and component (c) are added to a polymerizer in an arbitrary order.

(6) A method in which a catalyst component comprising component (a-1) supported on carrier (e); a catalyst component comprising component (b) supported on carrier (e); and component (c) added to a polymerizer in an arbitrary order.

(7) A method in which a catalyst component comprising component (a-1) and component (c) supported on carrier (e); and component (b) are added to a polymerizer in an arbitrary order.

(8) A method in which a catalyst component comprising component (b) and component (c) supported on carrier (e); and component (a-1) (or component (a-2)) are added to a polymerizer in an arbitrary order.

(9) A method in which a catalyst component comprising component (a-1), component (b) and component (c) supported on carrier (e) is added to a polymerizer.

(10) A method in which a catalyst component comprising component (b) supported on solid-form component (a-2); and component (c) are added to a polymerizer in an arbitrary order.

(11) A method in which a catalyst component comprising component (c) supported on solid-form component (a-2); and component (b) are added to a polymerizer in an arbitrary order.

(12) A method in which a catalyst component comprising component (b) and component (c) supported on solid-form component (a-2) is added to a polymerizer.

(13) A method in which a catalyst component comprising a solid on which component (a-2) and then component are supported (b); and component (c) are added to a polymerizer in an arbitrary order.

Component (d) may be used if necessary in each of the above methods (1) to (13).

Also, the solid catalyst component comprising component (a-1) and component (c) supported on carrier (e); the solid catalyst component comprising component (b) and component (c) supported on carrier (e); the solid catalyst component comprising component (a-1), component (b) and component (c) supported on carrier (e); the catalyst component comprising component (c) supported on component (a-2); and the catalyst component comprising component (b) and component (c) supported on component (a-2); described above, may be subjected to prepolymerization of an olefin.

Furthermore in the present invention, component (b), component (c), and if necessary component (d) may be brought into contact with each other in advance and the contact product and component (a-1) (or component (a-2)) may be added to the polymerizer.

It is presumed that when component (b), component (c), and if necessary, component (d) are brought into contact with each other, an ionic coordination compound of the following general formula (XI-l) is formed.

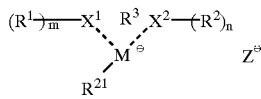

(XI-1)

In the above formula, M, $X^1$, $X^2$, $R^1$, $R^2$, m, and n are the same as those of general formula (I) given above, $R^{21}$ indicates a hydrocarbon group, and $Z\ominus$ indicates an anion derived from at least one compound (c) selected from among (c-1) organic aluminum oxycompounds, (c-2) alkylboric acid derivatives, and (c-3) ionizing ionic compounds.

In the above formula (XI-1), $R^{21}$ is the hydrocarbon group (for example, alkyl group) as $R^4$ or $R^5$ of general formula (I) given above or is the alkyl group introduced by the above-mentioned organometallic compound (d).

In the above formula (XI-1), $Z\ominus$ is an anion that is derived from component (c) in the process of contact of component (b), component (c), and, if necessary, component (d), and, for example, is the anion that forms the above-mentioned ionizing ionic compound (c-3). A boron compound anion of the following formula (XII) can be given as a specific example of such an anion.

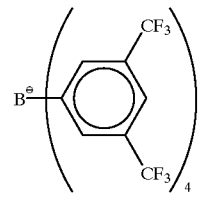

(XII)

The boron compound anion of formula (XII) is an anion that is derived from the boron compound of the formula (IX) given above.

Besides the above, anions derived from tetrakis(pentafluorophenyl)borate, tetra(phenyl)boron, etc., can be given as specific examples of $Z\ominus$.

For example, when transition metal compound (b) is contacted with compound (c), an ether compound (ether molecule) may be formed from component (c), and the ether may coordinate with the transition metal M in the ionic coordination compound of general formula (XI-1) given above. Such an ionic coordination compound is expressed by the following general formula (XI-2).

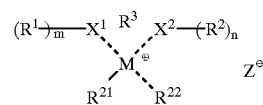

(XI-2)

In the above formula, M, $X^1$, $X^2$, $R^1$, $R^2$, m, and n are the same as those of general formula (I) given above, $R^{21}$ and $Z\ominus$ are the same as those of general formula (XI-1) given above, and $R^{22}$ indicates an ether compound (ether molecule) formed from component (c) when transition metal compound (b) is contacted with compound (c).

Specific examples of the ether compound (ether molecule) indicated by $R^{22}$ in the above general formula (XI-2) include dimethyl ether, diethyl ether, dipropyl ether, dibutyl ether, etc.

Specific examples of the ionic coordination compound of general formula (XI-2) given above include an ionic coordination compound of the following formula.

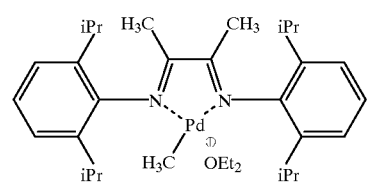

-continued

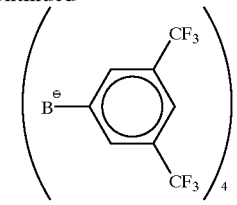

In the above formula, iPr indicates an isopropyl group and Et indicates an ethyl group.

To form the ionic coordination compound of general formula (XI-1) or (XI-2) given above by bringing component (b), component (c), and if necessary, component (d) into contact with each other in advance, component (b), component (c), and if necessary, component (d) can be reacted in a reaction medium at a temperature of −120 to +20° C., preferably at −80 to −20° C., for 5 minutes to 100 hours, preferably for 30 minutes to 5 hours.

An inert hydrocarbon, such as hexane, heptane, octane, cyclohexane, mineral oil, benzene, toluene, xylene, etc., or a halogenated hydrocarbon, such as chloroform, methylene chloride, dichloroethane, chlorobenzene, etc., can be used as the above-mentioned reaction medium.

An alkyl ester of (meth)acrylic acid may be made to coexist in the process of bringing component (b), component (c), and if necessary, component (d) in contact with each other in advance. In this case it is preferable to use the ionizing ionic compound (c-3) as component (c).

Examples of the (meth)acrylic acid alkyl ester include methyl acrylate, ethyl acrylate, n-propyl acrylate, isopropyl acrylate, n-butyl acrylate, isobutyl acrylate, t-butyl acrylate, 2-ethylhexyl acrylate, methyl methacrylate, ethyl methacrylate, n-propyl methacrylate, isopropyl methacrylate, n-butyl methacrylate, isobutyl methacrylate, etc.

It is presumed that when component (b), component (c), and if necessary, component (d) are brought into contact with each other under the presence of a (meth)acrylic acid alkyl ester, an ionic coordination compound of the following general formula (XI-3) is formed.

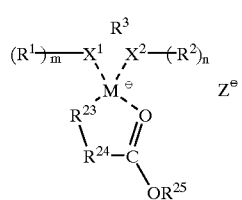

(XI-3)

In the above formula, M, $X^1$, $X^2$, $R^1$, $R^2$, m, and n are the same as those of general formula (I) given above, Z⊖ is the same as in general formula (XI-1) given above, $R^{23}$ indicates a hydrocarbon residue, and $R^{24}$ and $R^{25}$ indicate each a portion of a residual group of the (meth)acrylic acid alkyl ester.

In the general formula (XI-3) given above, $R^{23}$ is a hydrocarbon group (for example, an alkyl residue) of $R^4$ or $R^5$ in general formula (I) given above or is a residue of the alkyl group introduced by the above-mentioned organometallic compound (d).

The following may be given as specific examples of the group indicated by $R^{23}$:

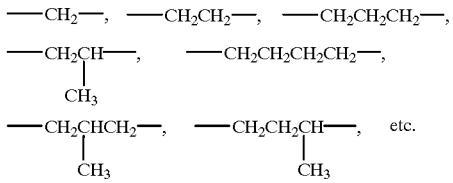

In the general formula (XI-3) given above, each of $R^{24}$ and $R^{25}$ is a portion of a residual group formed from the (meth)acrylic acid alkyl ester when contacting transition metal compound (b) with the (meth)acrylic acid alkyl ester.

The following may be given as specific examples of the group indicated by $R^{24}$:

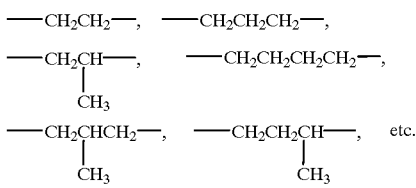

Specific examples of the group indicated by $R^{25}$ include alkyl groups of 1 to 20 carbon atoms, such as methyl group, ethyl group, n-propyl group, isopropyl group, n-butyl group, isobutyl group, tert-butyl group, 2-ethylhexyl group, etc.

Specific examples of the ionic coordination compound of the general formula (XI-3) given above include an ionic coordination compound of the following formula.

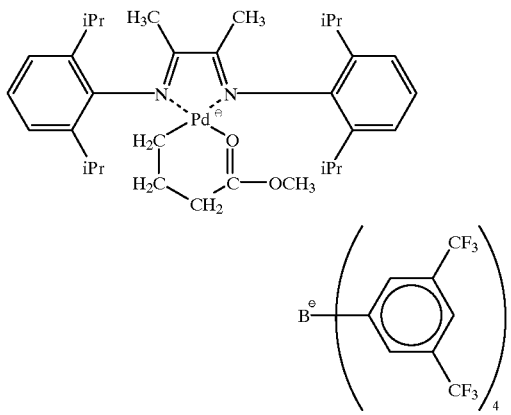

In the above formulae, iPr indicates a isopropyl group.

To form the ionic coordination compound of general formula (XI-3) given above by bringing component (b), component (c), and if necessary, component (d) in contact with each other in advance in the presence of a (meth)acrylic acid alkyl ester, component (b), component (c), and if necessary, component (d) reacted under the presence of the (meth)acrylic acid alkyl ester in a reaction medium at a temperature of −120 to +40° C., preferably −80 to 0° C., for 5 minutes to 100 hours, preferably 30 minutes to 5 hours.

The amount of the (meth)acrylic acid alkyl ester used, as the molar ratio of (meth)acrylic acid alkyl ester to component (b), is usually 0.3 to 3, preferably 0.8 to 1.1.

In the olefin polymerization method according to the present invention, an olefin polymer is obtained by polymerizing or copolymerizing an olefin or olefins in the presence of the olefin polymerization catalyst described above.

In the present invention, the polymerization can be carried out by liquid phase polymerization methods, such as solution polymerization methods or suspension polymerization methods, or gas phase polymerization methods.

Specific examples of the inert hydrocarbon medium used in liquid phase polymerization include aliphatic hydrocarbons, such as propane, butane, pentane, hexane, heptane, octane, decane, dodecane, kerosene, etc.; alicyclic hydrocarbons, such as cyclopentane, cyclohexane, methylcyclopentane, etc.; aromatic hydrocarbons, such as benzene, toluene, xylene, etc.; halogenated hydrocarbons, such as ethylene chloride, chlorobenzene, dichloromethane, etc., and mixtures of the above hydrocarbons. The olefin itself may be used as the solvent.

In the olefin polymerization process using the olefin polymerization catalyst described above, component (a-1) may usually be used in an amount of $10^{-8}$ to $10^{-3}$ moles, preferably $10^{-7}$ to $10^{-4}$ moles, per liter of reaction volume and component (a-2) may usually be used in an amount of $10^{-8}$ to $10^{-3}$ moles, preferably $10^{-7}$ to $10^{-4}$ moles, in terms of titanium atom, per liter of reaction volume. Component (b) may usually be used in an amount of $10^{-8}$ to $10^{-3}$ moles, preferably $10^{-7}$ to $10^{-3}$ moles, per liter of reaction volume. Also, component (b) may usually be used at a molar ratio of component (b) to component (a-1) (or component (a-2)) [(b)/(a-1) (or (a-2) (in terms of titanium atom))] of 0.02 to 100, preferably 0.05 to 50.

Component (c-1) or component (c-2) may usually be used at a molar ratio of aluminum atoms in component (c-1) or aluminum atoms in component (c-2) to the total of transition metal atoms (M) in component (a-1) (or component (a-2)) [(c-1)/M or (c-2)/M] of 10 to 5000, preferably 20 to 2000. Component (c-3) may usually be used at a molar ratio of component (c-3) to the total of transition metal atoms (M) in component (a-1) (or component (a-2)) and component (b) [(c-3)/M] of 1 to 10, preferably 1 to 5.

Component (d), if necessary, is usually used at a molar ratio of component (d) to the total of transition metal atoms (M) in component (a-1) (or component (a-2)) and component (b) [(d)/M] of 0.01 to 5000, preferably 0.05 to 2000.

The temperature at which the olefin polymerization using the olefin polymerization catalyst described above is carried out is usually in the range of −50 to 200° C., preferably in the range of 0 to 170° C. The polymerization is usually carried out under a pressure in the range of atmospheric pressure to 100 kg/cm², preferably in the range of atmospheric pressure to 50 kg/cm². The polymerization reaction can be carried out by any of batchwise, continuous and semi-continuous methods. The polymerization may also be carried out in two or more stages that differ in reaction conditions.

The molecular weight of the olefin polymer that is obtained can be adjusted by hydrogen present in the polymerization system or by varying the polymerization temperature.

Examples of olefins that can be polymerized by the olefin polymerization catalyst described above include α-olefins of 2 to 20 carbon atoms, such as ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, etc.; and cyclic olefins of 3 to 20 carbon atoms, such as cyclopentene, cycloheptene, norbornene, 5-methyl-2-norbornene, tetracyclodecene, 2-methyl- 1,4,5,8-dimethano-1,2,3,4, 4a, 5,8, 8a-octahydronaphthalene, etc. Styrene, vinylcyclohexane, diene, etc., may also be used.

The olefin polymerization catalyst according to the present invention has a high polymerization activity and can yield olefin polymers of wide molecular weight distribution.

The olefin polymer composition (olefin polymer) obtained using the olefin polymerization catalyst according to the present invention has wide molecular weight distribution and exhibits excellent molding properties (moldability). Also, an olefin polymer of narrow composition distribution can be produced by polymerizing two or more olefins using the olefin polymerization catalyst of the present invention.

Next, olefin polymer compositions and heat molded products according to the prevent invention shall now be described.

olefin polymer compositions according to the present invention include those that are formed from a non-crystalline olefin polymer (A-1) which is produced using a specific catalyst and exhibits specific physical properties, and another known olefin polymer (B) and those that are formed from a crystalline olefin polymer (A-2) which is produced using a specific catalyst and exhibits specific physical properties, and another known olefin polymer (B).

(A-1) Non-crystalline Olefin Polymer

The non-crystalline olefin polymer (A-1) is produced using a specific catalyst and exhibits the following properties ($A_1$-1) to ($A_1$-3).

($A_1$-1) The intrinsic viscosity [η] as measured in decalin at 135° C. is in the range of 0.5 to 20 dl/g, preferably 0.6 to 15 dl/g, and more preferably 0.7 to 10 dl/g.

($A_1$-2) The glass transition temperature (Tg) as measured by a differential scanning calorimeter (DSC) is −40° C. or less, preferably −45° C. or less, more preferably −50° C. or less.

($A_1$-3) The density is 0.88 g/cm³ or less, preferably 0.875 g/cm³ or less, more preferably 0.870 g/cm³ or less.

The non-crystalline olefin polymer (A-1) may be an olefin homopolymer, an olefin copolymer, or copolymer of an olefin with another monomer as long as it is a non-crystalline olefin polymer that satisfies the characteristics given above. The copolymer may be a random copolymer or a block copolymer.

Specific examples of the olefins include the same α-olefins of 2 to 20 carbon atoms and cyclic olefins of 3 to 20 carbon atoms given as examples of olefins that can be polymerized using the olefin polymerization catalyst of the present invention.

Vinyl compounds, unsaturated silane compounds, polyene compounds, etc., can be used as the monomer to be copolymerized with the olefin, and for example, aromatic vinyl compounds, such as styrene, substituted styrenes, allylbenzenes, substituted allylbenzenes, vinylnaphthalenes, substituted vinylnaphthalenes, allylnaphthalenes, substituted allylnaphthalenes, etc.;

alicyclic vinyl compounds, such as vinylcyclopentane, substituted vinylcyclopentanes, vinylcyclohexane, substituted vinylcyclohexanes, vinylcycloheptanes, substituted vinylcyclohexanes, allylnorbornanes, etc.; and unsaturated silane compounds, such as allyltrimethylsilanes, allyltriethylsilanes, 4-trimethylsilyl-1-butene, 6-trimethylsilyl-1-hexene, 8-trimethylsilyl-1-octene, 10-trimethylsilyl-1-decene, etc., can be used.

Among such olefin polymers, ethylene homopolymers and copolymers of ethylene and another α-olefin are preferable.

The non-crystalline olefin polymer (A-1) can be produced using a catalyst comprising the transition metal compound (b) of the general formula (I) given above and it is preferable for this catalyst to be formed from transition metal compound (b) and a cocatalyst component, for example, at least one compound selected from among (c-1) organic aluminum oxycompounds, (c-2) alkylboronic acid derivatives, and (c-3) compounds reacting with the transition metal compound to form an ion pair, as described above.

In producing non-crystalline olefin polymer (A-1) using the above catalyst components, transition metal compound (b) may be used in an amount of approximately $10^{-5}$ to 1 millimole, preferably $10^{-4}$ to 1 millimole, per liter of reaction volume.

It desired that when organic aluminum oxycompound (c-1) or alkylboronic acid derivative (c-2) is used as the cocatalyst component, component (c-1) or component (c-2) is usually used at a molar ratio of aluminum atoms in the component to transition metal compound (b) [(c-1) or (c-2)/(b)] of 10 to 1000, preferably 20 to 500, and when an ionizing ionic compound (C-3) is used as the cocatalyst component, component (c-3) is usually used at a molar ratio of aluminum atoms in the component to transition metal compound (b) [(c-3)/(b)] of 1 to 10, preferably 1 to 5.

Organometallic compound (d) is used if necessary at a molar ratio of organometallic compound (d) to transition metal compound component (b) [(d)/(b)] of 0.01 to 100, preferably 0.05 to 50.

The order of contact in the process of forming a catalyst from the respective components mentioned above is not limited in particular. The components may be brought into contact with each other in advance and then used in polymerization, and in this case, the components are brought into contact with each other at a temperature of approximately −100 to 150° C., preferably approximately −80 to 120° C. An inert hydrocarbon solvent may be used for the contacting process.

The catalyst may also be used after prepolymerizing an olefin.

Non-crystalline olefin polymer (A-1) can be obtained by polymerizing (or copolymerizing) olefins, such as those mentioned above, in the presence of the above-mentioned catalyst so as to satisfy the above-mentioned characteristics $(A_1-1)$ to $(A_1-3)$.

The polymerization can be carried out by a gas phase polymerization method or a liquid phase polymerization method, such as a slurry polymerization method and solution polymerization method. An inert hydrocarbon can be used as a polymerization medium. For example, aliphatic hydrocarbons, such as propane, butane, isobutane, pentane, hexane, octane, decane, dodecane, hexadecane, octadecane; alicyclic hydrocarbons, such as cyclopentane, methylcyclopentane, cyclohexane, cyclooctane, etc.; aromatic hydrocarbons, such as benzene, toluene, xylene, etc.; and petroleum distillates, such as gasoline, kerosene, gas oil, etc., can be used. Among the above, aliphatic hydrocarbons, alicyclic hydrocarbons, and petroleum distillates are preferable. Also, in the liquid phase polymerization, the liquid-form olefin itself may be used as the solvent.

The polymerization can be carried out at a temperature usually in the range of −50 to 100° C., preferably 0 to 90° C., in the case of slurry polymerization; usually in the range of 0 to 200° C., preferably 10 to 180° C., in the case of solution polymerization; and usually in the range of 0 to 120° C., preferably 20 to 100° C., in the case of gas phase polymerization.

The polymerization pressure may be atmospheric pressure to 100 kg/cm², preferably atmospheric pressure to 50 kg/cm².

The polymerization can be carried out by any of batchwise, continuous, and semi-continuous methods. The polymerization may also be carried out in two or more stages that differ in reaction conditions.

The molecular weight of the non-crystalline olefin polymer (A-1) that is obtained can be adjusted by using hydrogen in the polymerization process.

(A-2) Crystalline Olefin Polymer

The crystalline olefin polymer (A-2) can be produced using a specific catalyst and exhibits the following properties $(A_2-1)$ to $(A_2-3)$.

$(A_2-1)$ The intrinsic viscosity $[\eta]$ as measured in decalin at 135° C. is in the range of 0.5 to 20 dl/g, preferably 0.6 to 15 dl/g, more preferably 0.7 to 10 dl/g.

$(A_2-2)$ The melting point (Tm) as measured by a differential scanning calorimeter (DSC) is 60° C. or more, preferably 70 to 140° C., more preferably 80 to 135° C.

$(A_2-3)$ The density is 0.88 g/cm³ or more, preferably 0.885 to 0.980 g/cm³, more preferably 0.890 to 0.970 g/cm³.

The crystalline olefin polymer (A-2) may be an olefin homopolymer, an olefin copolymer, or copolymer of an olefin with another monomer as long as it is a crystalline olefin polymer that satisfies the characteristics given above. The copolymer may be a random copolymer or a block copolymer.

Specific examples of the olefins include the same α-olefins of 2 to 20 carbon atoms and cyclic olefins of 3 to 20 carbon atoms given as examples of olefins that can be polymerized using the olefin polymerization catalyst of the present invention.

The same vinyl compounds, unsaturated silane compounds, polyene compounds, etc. as those used for producing the non-crystalline olefin polymer (A-1) described above can be used as the monomer to be copolymerized with the olefin.

Among such olefin polymers, ethylene homopolymers and copolymers of ethylene and another α-olefin are particularly preferable.

The crystalline olefin polymer (A-2) can be produced using a catalyst containing the transition metal compound of the general formula (I) given above, and it is preferable for this catalyst to be formed from transition metal compound (b) and a cocatalyst component, for example, at least one compound selected from among (c-1) organic aluminum oxycompounds, (c-2) alkylboronic acid derivatives, and (c-3) compounds reacting with the transition metal compound to form an ion pair, as described above.

In producing crystalline olefin polymer (A-2) using the above catalyst components, transition metal compound (b) may be used in an amount of approximately $10^{-5}$ to 1 millimole, preferably $10^{-4}$ to 1 millimole, per liter of reaction volume.

It is desired that when organic aluminum oxycompound (c-1) or alkylboronic acid derivative (c-2) is used as the cocatalyst component, component (c-1) or component (c-2) is usually used at a molar ratio of aluminum atoms in the component to transition metal compound (b) [(c-1) or (c-2)/(b)] of 10 to 1000, preferably 20 to 500, and when ionizing ionic compound (C-3) is used as the cocatalyst component, component (c-3) is usually used at a molar ratio of aluminum atoms in the component to transition metal compound (b) [(c-3)/(b)] of 1 to 10, preferably 1 to 5.

organometallic compound (d) is used if necessary at a molar ratio of organometallic compound (d) to transition metal compound component (b) [(d)/(b)] of 0.01 to 100, preferably 0.05 to 50.

The order of contact in the process of forming a catalyst from the respective components mentioned above is not limited in particular. The components may be brought into contact with each other in advance and then used in polymerization, and in this case, the components are brought into contact with each other at a temperature of approximately −100 to 150° C., preferably approximately −80 to 120° C. An inert hydrocarbon solvent may be used for the contacting process.

The catalyst may also be used after prepolymerizing an olefin.

Crystalline olefin polymer (A-2) can be obtained by polymerizing (or copolymerizing) olefins, such as those mentioned above, in the presence of the above-mentioned catalyst so as to satisfy the above-mentioned characteristics ($A_2$-1) to ($A_2$-3).

The polymerization can be carried out by a gas phase polymerization method or a liquid phase polymerization method, such as a slurry polymerization method, solution polymerization method, etc. The same inert hydrocarbons as those used in the manufacture of non-crystalline olefin polymer (A-1) can be used as a polymerization medium. Among such hydrocarbons, aliphatic hydrocarbons, alicyclic hydrocarbons, and petroleum distillates are preferable. Also, in the liquid phase polymerization, the liquid-form olefin itself may be used as the solvent.

The polymerization can be carried out at a temperature usually in the range of −50 to 100° C., preferably 0 to 90° C., in the case of slurry polymerization; usually in the range of 0 to 200° C., preferably 10 to 180° C., in the case of solution polymerization; and usually in the range of 0 to 120° C., preferably 20 to 100° C., in the case of gas phase polymerization.

The polymerization pressure may be atmospheric pressure to 100 kg/cm$^2$, preferably atmospheric pressure to 50 kg/cm$^2$.

The polymerization can be carried out by any of batchwise, continuous, and semi-continuous methods. The polymerization may also be carried out in two or more stages that differ in reaction conditions.

The molecular weight of the crystalline olefin polymer (A-2) that is obtained can be adjusted by using hydrogen in the polymerization process.

(B) Olefin Polymer

There is no particular limitation on olefin polymer (B) except that it is produced using a catalyst different from the catalyst used in the manufacture of non-crystalline olefin polymer (A-1) and crystalline olefin polymer (A-2) described above. Thus, olefin polymer (B) may be produced by a known method using for example a metallocene compound catalyst component, such as a compound (a-1) of a transition metal from Group 4 of the periodic table described above, a known solid titanium catalyst component, such as the titanium catalyst component (a-2) described above, etc.

In the present invention it is preferable for olefin polymer (B) to be produced using a catalyst comprising:
 (a) (a-1) a transition metal compound or (a-2) a titanium catalyst component,
 (c) at least one type of compound selected from among (c-1) organic aluminum oxycompounds, (c-2) alkylboronic acid derivatives, and (c-3) compounds reacting with the transition metal compound to form an ion pair, and if necessary,
 (d) an organometallic compound.

Olefin polymer (B) may be an olefin homopolymer, an olefin copolymer, or copolymer of an olefin with another monomer. The copolymer may be a random copolymer or a block copolymer.

Specific examples of the olefins include the same α-olefins of 2 to 20 carbon atoms and cyclic olefins of 3 to 20 carbon atoms given as examples of olefins that can be polymerized using the olefin polymerization catalyst described above. Such an olefin may also be copolymerized with styrene, etc.

It is preferable that olefin polymer (B) is a polymer containing units derived from an olefin of 2 to 6 carbon atoms as the main constituting units and it is particularly preferable that olefin polymer (B) is an ethylene polymer or propylene polymer containing units derived from ethylene or propylene as the main constituting unit. To be more specific, olefin polymer (B) is an ethylene polymer or propylene polymer in which units derived from ethylene or propylene amount to 80 to 100 mole %, preferably 90 to 100 mole %, more preferably 92 to 100 mole %.

For example, the propylene polymer contains, as other olefin units, units derived from ethylene in an amount of 0 to 10 mole %, preferably 0 to 8 mole %, more preferably 0 to 6 mole %, and units derived from olefins of 4 to 12 carbon atoms in an amount of 0 to 15 mole %, preferably 0 to 10 mole %, more preferably 0 to 5 mole %.

Along with such olefin-derived units, olefin polymer (B) used in the present invention may contain units derived in particular from olefins having a branched structure or polyenes of 4 to 20 carbon atoms in an amount of 5 mole % or less.

Specific examples of olefins having a branched structure include 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, allylnaphthalene, allylnorbornane, styrene, dimethylstyrenes, vinylnaphthalenes, allyltoluenes, allylbenzene, vinylcyclohexane, vinylcyclopentane, vinylcycloheptane, etc.

Specific examples of polyenes include 1,3-butadiene, 1,3-pentadiene, 1,4-pentadiene, 1,3-hexadiene, 1,4-hexadiene, 1,5-hexadiene, 4-methyl-1,4-hexadiene, 5-methyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, 1,7-octadiene, 1,9-decadiene, isoprene, butadiene, ethylidene norbornene, vinylnorbornene, dicyclopentadiene, etc.

In the case where olefin polymer (B) is used together with non-crystalline olefin polymer (A-1) to form a composition, it is desirable for olefin polymer (B) to have an intrinsic viscosity [η] as measured in decalin at 135° C. in the range of 0.5 to 20 dl/g, preferably 0.7 to 10 dl/g; a melting point (Tm) as measured by a differential scanning calorimeter (DSC) in the range of 100° C. or more, preferably 110 to 167° C.; and a density in the range of 0.85 to 1.0 g/cm$^3$, preferably 0.870 to 0.975 g/cm$^3$.

In the case where olefin polymer (B) is used together with crystalline olefin polymer (A-2) to from a composition, it is preferable for olefin polymer (B) to have an intrinsic viscosity [η] as measured in decalin at 135° C. in the range of 0.5 to 20 dl/g, preferably 0.7 to 10 dl/g; and a density in the range of 0.85 to 0.98 g/cm$^3$, preferably 0.855 to 0.970 g/cm$^3$.

The melting point (Tm) is determined as the temperature of the maximum peak position in the endothermic curve measured by a differential scanning calorimeter (DSC). The endothermic curve is obtained when a sample, which has been molten and then solidified by lowered the temperature at a rate of 10° C./minute, is heated up at a rate of 10° C./minute.

Olefin Polymer Composition

The olefin polymer composition according to the present invention includes an embodiment containing non-crystalline olefin polymer (A-1) in an amount of 99 to 1 weight parts, preferably 70 to 5 weight parts, more preferably 50 to 10 weight parts and olefin polymer (B) in an amount of 1 to 99 weight parts, preferably 30 to 95 weight parts, more preferably 50 to 90 weight parts (wherein the total amount of (A-1) and (B) is 100 weight parts) and an embodiment containing crystalline olefin polymer (A-2) in an amount of 99 to 1 weight parts, preferably 95 to 5 weight parts, more preferably 90 to 10 weight parts and olefin polymer (B) in an amount of 1 to 99 weight parts, preferably 5 to 95 weight parts, more preferably 10 to 90 weight parts (wherein the total amount of (A-2) and (B) is 100 weight parts).

The olefin polymer composition according to the present invention can be prepared by generally known methods of preparing resin compositions, and for example can be prepared by melting and kneading non-crystalline olefin polymer (A-1) (or crystalline olefin polymer (A-2)) and olefin polymer (B).

The olefin polymer composition can also be produced by polymerizing olefins using the above-described olefin polymerization catalyst comprising (a) (a-1) a compound of a transition metal from Group 4 of the periodic table or (a-2) a titanium catalyst component containing magnesium, titanium, and halogen, (b) a compound of a transition metal from any of Groups 8 to 10 of the periodic table having the general formula (I) indicated above, and (c) at least one compound selected from among (c-1) organic aluminum oxycompounds, (c-2) alkylboronic acid derivatives, and (c-3) compounds reacting with the transition metal compound to form an ion pair, and if necessary, (d) an organometallic compound.

The olefin polymer composition comprised of non-crystalline olefin polymer (A-1) and olefin polymer (B) preferably has a melt flow rate (MFR; measured at 230° C. under a load of 2.16kg in compliance with ASTM D1238-65T) in the range of 0.01 to 1000 g/10 minutes, preferably 0.1 to 100 g/10 minutes.

The olefin polymer composition comprised of crystalline olefin polymer (A-2) and olefin polymer (B) preferably has a melt index (MI; measured at 190° C. under a load of 2.16 kg in compliance with ASTM D1238-65T) in the range of 0.01 to 1000 g/10 minutes, more preferably 0.1 to 100 g/10 minutes.

The above-mentioned olefin polymer composition comprised of non-crystalline olefin polymer (A-1) and olefin polymer (B) has excellent rigidity characteristics such as tensile modulus as well as excellent impact resistance. The molding properties (moldability) can be further improved by using a selection of non-crystalline olefin polymer (A-1) and olefin polymer (B) that differ in melt flow rate.

Also, the above-mentioned olefin polymer composition comprised of crystalline olefin polymer (A-2) and olefin polymer (B) has high melt tension and excellent molding properties (moldability), and thus can produce molded articles having excellent mechanical strength and heat resistance.

In addition to the above-mentioned non-crystalline olefin polymer (A-1) (or crystalline olefin polymer (A-2)) and olefin polymer (B), the olefin polymer composition according to the present invention may contain additives, other polymers, etc., if necessary as long as these are not detrimental to the purpose of the present invention, and for example, a suitable amount of a rubber component for improving impact resistance may be contained. Examples of additives include nucleating agents, antioxidants, hydrochloric acid absorbents, heat stabilizers, weathering stabilizers, light stabilizers, ultraviolet absorbers, slip agents, anti-blocking agents, anti-fogging agents, lubricants, antistatic agents, flame retardants, pigments, dyes, dispersing agents, copper inhibitors, neutralizers, foaming agents, plasticizing agents, anti-foaming agents, crosslinking agents, flow property improving agents, such as peroxides, etc., weld strength improving agents, natural oils, synthetic oils, waxes, etc.

For example when the olefin polymer composition contains a nucleating agent, not only the crystallized particles can be made finer but also the crystallization speed is improved to hereby enable rapid molding.

Various nucleating agents generally known can be used as the nucleating agent without any particular restrictions, and from among the following nucleating agents can be used favorably.

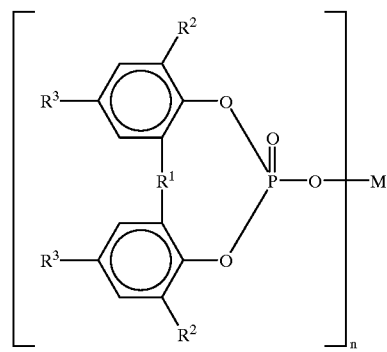

In the above formula, $R^1$ indicates oxygen, sulfur, or a hydrocarbon group of 1 to 10 carbon atoms, and $R^2$ and $R^3$ may be the same as or different from each other and are each hydrogen or a hydrocarbon group of 1 to 10 carbon atoms. Both $R^2$, both $R^3$, or $R^2$ and $R^3$ may be bonded to each other to form a ring. M indicates a metal atom having a valence of 1 to 3 and n is an integer of 1 to 3.

Specific examples include sodium-2,2'-methylene-bis(4,6-di-t-butylphenyl)phosphate, sodium-2,2'-ethylidene-bis(4,6-di-t-butylphenyl)phosphate, lithium-2,2'-methylene-bis-(4,6-di-t-butylphenyl)phosphate, lithium-2,2'-ethylidene-bis(4,6-di-t-butylphenyl)phosphate, sodium-2,2'-ethylidene-bis(4-i-propyl-6-t-butylphenyl)phosphate, lithium-2,2'-methylene-bis(4-methyl-6-t-butylphenyl)phosphate, lithium-2,2'-methylene-bis(4-ethyl-6-t-butylphenyl) phosphate, calcium-bis[2,2'-thiobis(4-methyl-6-t-butylphenyl)phosphate], calcium-bis[2,2'-thiobis(4-ethyl-6-t-butylphenyl)phosphate], calcium-bis[2,2'-thiobis(4,6-di-t-butylphenyl)phosphatel, magnesium-bis[2,2'-thiobis(4,6-di-t-butylphenyl)phosphate], magnesium-bis [2,2'-thiobis(4-t-octylphenyl )phosphate], sodium-2,2'-butylidene-bis(4,6-di-methylphenyl) phosphate, sodium-2,2'-butylidene-bis(4,6-di-t-butylphenyl)phosphate, sodium-2,2'-t-octylmethylene-bis(4,6-di-methylphenyl) phosphate, sodium-2,2'-t-octylmethylene-bis(4,6-di-t-butylphenyl )phosphate, calcium-bis(2,2'-methylene-bis(4,6-di-t-butylphenyl) phosphate), magnesium-bis [2,2'-methylene-bis(4,6-di-t-butylphenyl)phosphate], barium-bis[2,2'-methylene-bis(4,6- di-t-butylphenyl)phosphate], sodium-2,2'-methylene-bis(4-methyl-6-t-butylphenyl)phosphate, sodium-2,2'-methylene-bis(4-ethyl-6-t-butylphenyl)phosphate, sodium (4,4'-dimethyl-5,6'-di-t-butyl-2,2'-biphenyl)phosphate, calcium-bis[(4,4'-dimethyl-6,6'-di-t-butyl-2,2'-biphenyl)phosphate], sodium-2,2'-ethylidene-bis(4-n-butyl-6-t-butylphenyl) phosphate, sodium-2,2'-methylene-bis(4,6-di-methylphenyl)phosphate, sodium-2,2'-methylene-bis(4,6-di-ethylphenyl)phosphate, potassium-2,2'-ethylidene-bis(4,6-di-t-butylphenyl)phosphate, calcium-bis[2,2'-ethylidene-bis-4,6-di-t-butylphenyl]phosphate], magnesium-bis[2,2'-ethylidene-bis[4,6-di-t-butylphenyl)phosphate], barium-bis[2,2'-ethylidene-bis(4,6-di-t-butylphenyl)phosphate], aluminum-tris[2,2'-methylene-bis(4,6-di-t-butylphenyl) phosphate], aluminum-tris[2,2'-ethylidene-bis(4,6-di-t-butylphenyl)phosphate, and mixtures of two or more of the above.

Among the above, sodium-2,2'-methylene-bis(4,6-di-t-butylphenyl)phosphate is particularly preferable.

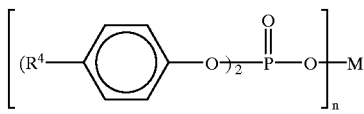

In the above formula, $R^4$ indicates hydrogen or a hydrocarbon group of 1 to 10 carbon atoms, M indicates a metal atom having a valence of 1 to 3, and n indicates an integer of 1 to 3.

Specific examples include sodium-bis(4-t-butylphenyl) phosphate, sodium-bis(4-methylphenyl)phosphate, sodium-bis(4-ethylphenyl)phosphate, sodium-bis(4-i-propylphenyl) phosphate, sodium-bis(4-t-octylphenyl)phosphate, potassium-bis(4-t-butylphenyl)phosphate, calcium-bis(4-t-butylphenyl)phosphate, magnesium-bis(4-t-butylphenyl) phosphate, lithium-bis(4-t-butylphenyl)phosphate, aluminum-bis(4-t-butylphenyl)phosphate, and mixtures of two or more of the above.

Among the above, sodium-bis(4-t-butylphenyl)phosphate is favorable.

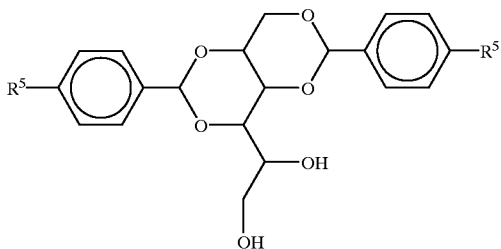

In the above formula, $R^5$ indicates hydrogen or a hydrocarbon group of 1 to 10 carbon atoms.

Specific examples include 1,3,2,4-dibenzylidenesorbitol, 1,3-benzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-methylbenzylidene)sorbitol, 1,3,2,4-di(p-ethylbenzylidene)sorbitol, 1,3,2,4-di(p-n-propylbenzylidene)sorbitol, 1,3,2,4-di(p-i-propylbenzylidene) sorbitol, 1,3,2,4-di(p-n-butylbenzylidene)sorbitol, 1,3,2,4-di(p-s-butylbenzylidene) sorbitol, 1, 3,2,4-di(p-t-butylbenzylidene)sorbitol, 1,3,2,4-di (2',4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorobenzylidenesorbitol, 1,3-p-chlorobenzylidene-2,4-benzylidenesorbitol, 1,3-p-chlorobenzylidene-2,4-p-methylbenzylidenesorbitol, 1,3-p-chlorobenzylidene-2,4-p-ethylbenzylidenesorbitol, 1,3-p-methylbenzylidene-2,4-p-chlorobenzylidenesorbitol, 1,3-p-ethylbenzylidene-2,4-p-chlorobenzylidenesorbitol, 1,3,2,4-di(p-chlorobenzylidene) sorbitol, and mixtures of two or more of the above.

Among the above, 1,3,2,4-dibenzylidenesorbitol, 1,3,2,4-di(p-methylbenzylidene)sorbitol, 1,3,2,4-di(p-ethylbenzylidene)sorbitol, 1,3-p-chlorobenzylidene-2,4-p-methylbenzylidenesorbitol, and 1,3,2,4-di(p-chlorobenzylidene)sorbitol, and mixtures of two or more of these are favorable.

Metal salts of aromatic carboxylic acids and fatty carboxylic acids, such as aluminum benzoate, aluminium p-t-butylbenzonate, sodium adipate, sodium thiophenecarboxylate, sodium pyrolecarboxylate, etc., can be given as examples of nucleating agents. Talc and other inorganic compounds mentioned below may also be used as nucleating agents.

It is desirable for the olefin polymer composition according to the present invention to contain the above-mentioned nucleating agent in an amount of approximately 0.001 to 10 weight parts, preferably 0.01 to 5 weight parts, more preferably 0.1 to 3 weight parts, per total of 100 weight parts of the above-mentioned non-crystalline olefin polymer (A-1) (or crystalline olefin polymer (A-2)) and olefin polymer (B).

Phenol antioxidants, sulfur antioxidants, and phosphorus antioxidants can be used as the antioxidants.

Examples of phenol antioxidants include phenols, such as 2,6-di-tert-butyl-p-cresol, stearyl (3,3-dimethyl-4-hydroxybenzyl) thioglycolate, stearyl-β-(4-hydroxy-3,5-di-tert-butylphenol) propionate, distearyl-3,5-di-tert-butyl-4-hydroxybenzyl phosphonate, 2,4,6-tris(3',5'-di-tert-butyl-4'-hydroxybenzylthio)-1,3,5-triazine, distearyl (4-hydroxy-3-methyl-5-tert-butylbenzyl) malonate, 2,2'-methylene-bis(4-methyl-6-tert-butylphenol), 4,4'-methylene-bis(2,6-di-tert-butylphenol), 2,2'-methylene-bis[6-(1-methylcyclohexyl)p-cresol], bis[3,5-bis(4-hydroxy-3-tert-butylphenyl) butyric acid] glycol ester, 4,4'-butylidene-bis(6-tert-butyl-m-cresol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butyl)benzyl isocyanurate, 1,3,5-tris(3,5-di-tert-butyl-4-hydroxybenzyl)-2,4,6-trimethylbenzene, tetrakis[methylene-3-(3,5-di-tert-butyl-4-hydroxyphenyl)propionate]methane, 1,3,5-tris(3,5-di-tert-butyl-4-hydroxybenzyl) isocyanurate, 1,3,5-tris[(3,5-di-tert-butyl-4-hydroxyphenyl)propionyloxyethyl] isocyanurate, 2-octylthio-4,6-di(4-hydroxy-3,5-di-tert-butyl) phenoxy-1,3,5-triazine, 4,4'-thiobis(6-tert-butyl-m-cresol),etc., and polyphenol oligocarbonates, such as oligocarbonates (having a degree of polymerization of 2 to 10) of 4,4'-butylidene-bis(2-tert-butyl-5-methylphenyl).

Examples of sulfur antioxidants include dilauryl-, dimyristyl-, distearyl-, and other dialkylthiodipropionates and polyhydricalcohol (for example, glycerine, trimethylolethane, trimethylolpropane, pentaerythritol, trishydroxyethyl isocyanurate) esters of butyl-, octyl-, lauryl-, stearyl-, and other alkylthiopropionic acid (for example, pentaerythritol tetralaurylthiopropionate).

Examples of phosphorus antioxidants include trioctyl phosphite, trilauryl phosphite, tridecyl phosphite, octyl-diphenyl phosphite, tris(2,4-di-tert-butylphenyl) phosphite, triphenyl phosphite, tris(butoxyethyl) phosphite, tris (nonylphenyl) phosphite, distearyl pentaerythritol diphosphite, tetra(tridecyl)-1,1,3-tris(2-methyl-5-tert-butyl-4-hydroxyphenyl)butane diphosphite, tetra($C_{12}$–$C_{15}$ mixed alkyl)-4,4'-isopropylidene diphenyl diphosphite, tetra (tridecyl)-4,4'-butylidene bis(3-methyl-6-tert-butylphenol) diphosphite, tris(3,5-di-tert-butyl-4-hydroxyphenyl) phosphite, tris(mono/di mixed nonylphenyl) phosphite, hydrogenated-4,4'-isopropylidene phenol polyphosphite, bis (octylphenyl)/bis[4,4'-butylidene-bis(3-methyl-6-tert-butylphenol)]/1,6-hexanediol diphosphite, phenyl/4,4'-isopropylidene diphenol/pentaerythritol diphosphite, bis(2,4-di-tert-butylphenyl) pentaerythritol diphosphite, bis(2,6-di-tert-butyl-4-methylphenyl) pentaerythritol diphosphite, tris[4,4'-isopropylidene-bis(2-tert-butylphenol)] phosphite, phenyl/disodecyl phosphite, di(nonylphenyl) pentaerythritol diphosphite), tris(1,3-di-stearoyloxyisopropyl) phosphite, 4,4'-isopropylidene-bis(2-tert-butylphenol)/di(nonylphenyl) phosphite, 9,10-di-hydro-9-oxa-10-phosphaphenanthrene-10-oxide, tetrakis(2,4-di-tert-butylphenyl)-4,4'-biphenylene diphosphonite, etc.

Other antioxidants that can be used include 6-hydroxychroman derivatives, such as α, β, γ, and δ tocopherols and their mixtures, 2,5-dimethyl-substituted, 2,5,8-trimethyl-substituted, and 2,5,7,8-tetramethyl-substituted compounds of 2-(4-methyl-penta-3-enyl)-6-hydroxychroman, 2,2,7-trimethyl-5-tert-butyl-6-hydroxychroman, 2,2,5-trimethyl-7-tert-butyl-6-hydroxychroman, 2,2,5-trimethyl-6-tert-butyl-6-hydroxychroman, 2,2-dimethyl-5-tert-butyl-6-hydroxychroman, etc.

Also, double compounds of the general formula, $M_xAl_y(OH)_{2x+3y-2z}(A)z.aH_2O$ (where M indicates Mg, Ca, or Zn, A indicates an anion other than the hydroxyl group, x, y, and z may be the same as or different from each other and are each a positive number, and a is 0 or a positive number), for example, $Mg_6Al_2(OH)_{16}CO_3 \cdot 4H_2O$, $Mg_6Al_2(OH)_{20}CO_3 \cdot 5H_2O$, $Mg_5Al_2(OH)_{14}CO_3 \cdot 4H_2O$, $Mg_{10}Al_2(OH)_{22}(CO_3)_2 \cdot 4H_2O$, $Mg_6Al_2(OH)_{16}HPO_4 \cdot 4H_2O$, $Ca_6Al_2(OH)_{16}CO_3 \cdot 4H_2O$, $Zn_6Al_2(OH)_{16}CO_3 \cdot 4H_2O$, $Zn_6Al_2(OH)_{16}SO_4 \cdot 4H_2O$, $Mg_6Al_2(OH)_{16}SO_3 \cdot 4H_2O$, $Mg_6Al_2(OH)_{12}CO_3 \cdot 3H_2O$, etc., can be used as the hydrochloric acid absorbent.

Examples of light stabilizers include hydroxybenzophenones, such as 2-hydroxy-4-methoxybenzophenone, 2-hydroxy-4-n-octoxybenzophenone-2,2'-di-hydroxy-4-methoxybenzophenone, 2,4-dihydroxybenzophene, etc.; benzotriazoles, such as 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-5'-methylphenyl)benzotriazole, 2-(2'-hydroxy-3',5'-di-tert-amylphenyl)benzotriazole, etc.; benzoates, such as phenylsalicylate, p-tert-butylphenyl salicylate, 2,4-di-tert-butylphenyl-3,5-di-tert-butyl-4-hydroxybenzoate, hexadecyl-3,5-di-tert-butyl-4-hydroxybenzoate, etc.; nickel compounds, such as Ni salt of 2,2'-thiobis(4-tert-octylphenol), [2,2'-thiobis(4-tert-octylphenolate)]-n-butylamine Ni, Ni salt of (3,5-di-tert-butyl-4-hydroxybenzyl) phosphonic acid monoethyl ester, etc.; substituted acrylonitriles, such as methyl α-cyano-β-methyl-β-(p-methoxyphenyl) acrylate, etc.; oxalyldianilides, such as N'-2-ethylphenyl-N-ethoxy-5-tert-butylphenyloxalyldiamide, N-2-ethylphenyl-N'-2-ethoxyphenyloxalyldiamide, etc.; and hindered amine compounds, such as bis(2,2,6,6-tetramethyl-4-piperidine) sebaceate, poly[{(6-(1,1,3,3-tetramethylbutyl) imino)-1,3,5-triazine-2,4-diyl{4-(2,2,6,6-tetramethylpiperidyl) imino}hexamethylene], condensate of 2-(4-hydroxy-2,2,6,6-tetramethyl-1-piperidyl)ethanol and dimethyl succinate, etc.

Examples of lubricants include aliphatic hydrocarbons, such as paraffin wax, polyethylene wax, polypropylene wax, etc.; higher fatty acids, such as capric acid, lauric acid, myristic acid, palmitic acid, margaric acid, stearic acid, arachidic acid, behenic acid, etc., and metal salts thereof (for example, lithium salts, calcium salts, sodium salts, magnesium salts, potassium salts, etc.); fatty alcohols, such as palmityl alcohol, cetyl alcohol, stearyl alcohol, etc.; fatty amides, such as capronamide, caprylamide, caprinamide, laurylamide, myristamide, palmitamide, stearamide, etc.; alcohol esters of fatty acids; and fluorine compounds, such as fluoroalkylcarboxylic acids and metal salts thereof, metal salts of fluoroalkylsulfonic acid, etc.

The olefin polymer composition may contain the above additives in an amount of 0.0001 to 10% by weight.

The olefin resin composition according to the present invention may contain fillers, such as silica, diatomaceous earth, alumina, titanium oxide, magnesium oxide, pumice powder, pumice balloons, aluminum hydroxide, magnesium hydroxide, basic magnesium carbonate, dolomite, calcium sulfate, potassium titanate, barium sulfate, calcium sulfite, talc, clay, mica, asbestos, glass fiber, glass flakes, glass beads, calcium silicate, montmorillonite, bentonite, graphite, aluminum powder, molybdenum sulfide, boron fiber, silicon carbide fiber, polyethylene fiber, polypropylene fiber, polyester fiber, polyamide fiber, etc.

By incorporating such additives as mentioned above, the olefin polymer composition according to the present invention can provide a molded product that is further improved in the balance of physical properties, durability, coating properties, printing properties, scratch resistance, molding and processing properties, etc.

Heat Molded Product

The above-described olefin polymer compositions of the present invention can be used widely in conventionally known polyolefin applications, in particular, for heat molding to prepare, for example, sheets, unstretched or stretched films, filaments, and molded products of various other shapes. In the present invention, it is particularly preferable that the olefin polymer compositions containing a heat stabilizer as an additive are used for heat molded products.

Specific examples of heat molded products include molded products obtained by known heat molding methods such as extrusion molding, injection molding, inflation molding, blow molding, extrusion blow molding, injection blow molding, press molding, calendering, foam molding, etc. A few examples shall be given below to describe such heat molded products.

When for example the heat, molded product according to the present invention is an extrusion molded product, the shape and type of product is not limited in particular, and sheets or films (unstretched), pipes, hoses, electric cable jackets, filaments, etc., can be given as examples, and sheets, films, and filaments are especially favorable.

Conventionally known extrusion machines and molding conditions can be employed in extrusion molding the olefin polymer composition and, for example, the olefin polymer composition can be molten using a single screw extruder, kneading extruder, ram extruder, gear extruder, etc., and are extruded through a T die to form into a sheet or film (unstretched).

Stretched films can be obtained by stretching the above-mentioned extruded sheet or extruded film (unstretched) by known stretching methods, such as a tentering method (longitudinal-transverse stretching, transverse-longitudinal stretching), simultaneous biaxial stretching method or uniaxial stretching method.

The draw ratio in the stretching of an unstretched sheet or film may be usually about 20 to 70 times in the case of biaxial stretching and usually about 2 to 10 times in the case of uniaxial stretching. It is desirable to obtain a stretched film having a thickness of about 5 to 200 μm by stretching.

As another molded product in the form of a film, blown films may also be produced. The olefin polymer compositions comprising crystalline olefin polymer (A-2) and olefin polymer (B) are favorable as blow-extrusion material since these are high in melt tension and will not readily undergo drawdown in the blow-extrusion molding process.

Molded products in the form of sheets and films, which are obtained from the olefin polymer compositions of the present invention comprising non-crystalline olefin polymer (A-1) and olefin polymer (B), do not become charged easily, are excellent in rigidity characteristics such as tensile modulus, heat resistance, impact resistance, aging resistance, transparency, see-through properties, luster, rigidity, humidity resistance, and gas barrier properties, and can be used widely as, for example, packaging films. Also, the molded products in the form of sheets and films, which are obtained from the olefin polymer compositions comprising crystalline olefin polymer (A-2) and olefin polymer (B), are excellent in mechanical properties, such as tear strength, heat resistance, impact resistance, aging resistance, transparency, see-through properties, luster, rigidity, humidity resistance, and gas barrier properties.

Since sheets and films obtained by heat molding the olefin polymer compositions of the present invention are particularly excellent in humidity resistance, they can be used favorably, for example, as materials for press-through packages of drug tablets, capsules, etc.

Filaments can be produced for example by extruding the molten olefin polymer composition through a spinning nozzle. The resulting filaments can be stretched further. It is sufficient that this stretching be performed so that the molecules become oriented in at least one axial direction of the filament and it is usually desirable to perform stretching to attain a draw ratio of about 5 to 10 times.

Filaments, obtained from the olefin polymer compositions of the present invention comprising non-crystalline olefin polymer (A-1) and olefin polymer (B), are excellent in rigidity, heat resistance, and impact resistance. Filaments, obtained from the olefin polymer compositions comprising crystalline olefin polymer (A-2) and olefin polymer (B), do not become charged readily and are excellent in mechanical characteristics.

Injection molded products can be produced by injection molding the olefin polymer composition into various shapes using conventionally known injection molding machines and conditions.

Injection molded products, obtained from the olefin polymer compositions of the present invention comprising non-crystalline olefin polymer (A-1) and olefin polymer (B), are excellent in rigidity, heat resistance, impact resistance, surface luster, chemical resistance, wear resistance, etc. Injection molded products, obtained from the olefin polymer compositions comprising crystalline olefin polymer (A-2) and olefin polymer (B), are excellent in mechanical characteristics, such as tear strength, heat resistance, impact resistance, surface luster, chemical resistance, wear resistance, etc.

Injection molded products formed from the olefin polymer compositions according to the present invention can be used widely as interior automotive trim materials, exterior automotive trim materials, housings for household electric products, various types of containers, etc.

Blow molded products can be produced by blow molding the olefin polymer composition using conventionally known blow molding machines and conditions.

For example, in extrusion blow molding, the above-mentioned olefin polymer composition can be extruded from a die in the molten state at a resin temperature of 100° C. to 300° C. to form a tubular parison, which is then introduced in a mold of a desired shape where air is blown into the parison at a resin temperature of 130° C. to 300° C. to form a hollow molded product. It is desirable that the draw (blow) ratio is 1.5 to 5 times in the transverse direction.

In injection blow molding, the above-mentioned olefin polymer composition can be injected into a parison mold in the molten state at a resin temperature of 100° C. to 300° C. to form a parison. After the parison is placed in another mold of a desired shape, air is blown into the parison at a resin temperature of 120° C. to 300° C. to form a hollow molded product. It is desirable that the draw (blow) ratio is 1.1 to 1.8 times in the longitudinal direction and 1.3 to 2.5 times in the transverse direction.

Blow molded products, obtained from the olefin polymer compositions of the present invention comprising non-crystalline olefin polymer (A-1) and olefin polymer (B), are excellent in rigidity, heat resistance and impact resistance, as well as in humidity resistance. Blow molded products, obtained from the olefin polymer compositions comprising crystalline olefin polymer (A-2) and olefin polymer (B), are excellent in mechanical characteristics such as tear strength, heat resistance and impact resistance, as well as in humidity resistance.

Mold stamping molded products can be given as examples of press molded products. The olefin polymer compositions according to the present invention can be used for example as a substrate material in a composite integral molding (mold stamping molding) process wherein the substrate material and a skin material are press molded simultaneously.

Specific examples of such mold stamping molded products include interior automotive trim materials, such as door trims, rear package trims, seat back garnishes, instrument panels.

Press molded products, obtained from the olefin polymer compositions of the present invention comprising non-crystalline olefin polymer (A-1) and olefin polymer (B), are excellent in rigidity, heat resistance, impact resistance, aging resistance, surface luster, chemical resistance, wear resistance, etc. Injection molded products, obtained from the olefin polymer compositions comprised of crystalline olefin polymer (A-2) and olefin polymer (B), are excellent in mechanical characteristics, such as tear strength, heat resistance, impact resistance, aging resistance, surface luster, chemical resistance, wear resistance, etc.

EFFECTS OF THE INVENTION

The olefin polymerization catalysts according to the present invention exhibit a high polymerization activity and yield olefin polymers of wide molecular weight distribution. The olefin polymers obtained using the olefin polymerization catalysts according to the present invention are wide in molecular weight distribution and excellent in molding properties (moldability).

The present invention enables the obtaining of olefin polymer compositions, that are excellent in rigidity characteristics, such as tensile modulus, etc., and in mechanical characteristics, such as impact strength, etc., as well as in molding properties (moldability), and heat molded products, that are formed from the olefin polymer composition and have excellent rigidity and mechanical properties. The present invention furthermore enables the obtaining of olefin polymer compositions, that are excellent in mechanical characteristics and heat resistance as well as in molding properties (moldability), and heat molded products, that are formed from said olefin polymer compositions and have excellent mechanical properties and heat resistance.

EXAMPLES

The present invention shall now be described in more detail with reference to the following examples, but it should be construed that the present invention is in no way limited to these examples.

In the examples, the molecular weight distribution (Mw/Mn) of a polymer was measured by gel permeation chromatography (GPC) at a temperature of 140° C. using o-dichlorobenzene as a solvent. The intrinsic viscosity [η] was measured in decalin at 135° C. The glass transition temperature (Tg) and the melting point (Tm) were measured using a differential scanning calorimeter at a heat up rate of 10° C./minute, respectively.

The tensile modulus (YM) of an olefin polymer composition was measured in compliance with ASTM D638. The Izod impact strength (IZ) was measured in compliance with ASTM D256. The melt index (MI) was measured in compliance with ASTM D256 at 190° C. under a load of 2.16 kg. The melt tension (MT) was determined by measuring the tension applied to a filament when a strand extruded under the conditions of a measurement temperature of 190° C. and extrusion rate of 15 mm/minute, is drawn out at a constant speed by means of Melt Tension Tester produced by Toyo Seiki Co., Ltd. The film impact strength was measured by means of a pendulum type film impact tester (Film Impact Tester) produced by Toyo Seiki Producing Co., Ltd.

Example 1

250 ml of toluene were placed in a 500-ml glass autoclave thoroughly purged with nitrogen and a mixed gas of ethylene and propylene (120 l/hr and 80 l/hr, respectively) was passed through the autoclave at 25° C. for 10 minutes. Thereafter, 1.25 mmol, in terms of aluminum atom, of methylaluminoxane, and then a mixture of 0.0005 mmol of bis(1,2,4-trimethylcyclopentadienyl)zirconium dichloride and 0.005 mmol of a transition metal compound of formula (1) below (transition metal compound (1)) were added to start polymerization. Polymerization was carried out at 25° C. under atmospheric pressure for 30 minutes while continuously feeding the mixed gas of ethylene and propylene. After the end of polymerization, a small amount of methanol was added to stop the polymerization. The polymer solution was then added to a large excess of methanol to precipitate a polymer, and the polymer was dried at 130° C. under reduced pressure for 12 hours. As a result, 14.4 g of a polymer having a weight average molecular weight (Mw) of $1.2 \times 10^5$ and an Mw/Mn of 4.3 were obtained.

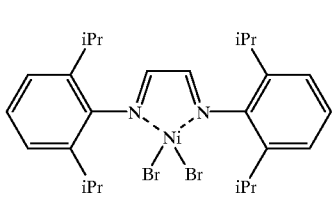

(1)

Comparative Example 1

Ethylene and propylene were polymerized in the same manner as in Example 1 except that 0.0005 mmol of bis(1,2,4-trimethylcyclopentadienyl)zirconium dichloride was used alone in place of the mixture of 0.0005 mmol of bis(1,2,4-trimethylcyclopentadienyl)zirconium dichloride and 0.005 mmol of the above-mentioned transition metal compound (1). As a result, 8.2 g of a polymer having an Mw of $1.9 \times 10^5$ and an Mw/Mn of 2.1 were obtained.

Comparative Example 2

Ethylene and propylene were polymerized in the same manner as in Example 1 except that 0.005 mmol of the above-mentioned transition metal compound (1) was used alone in place of the mixture of 0.0005 mmol of bis(1,2,4-trimethylcyclopentadienyl)zirconium dichloride and 0.005 mmol of the above-mentioned transition metal compound (1). As a result, 7.9 g of a polymer having an Mw of $4.3 \times 10^4$ and an Mw/Mn of 1.8 were obtained.

Example 2

Ethylene and propylene were polymerized in the same manner as in Example 1 except that a mixture of 0.001 mmol of bis(indenyl)zirconium dichloride and 0.005 mmol of the above-mentioned transition metal compound (1) was used in place of the mixture of 0.0005 mmol of bis(1,2,4-trimethylcyclopentadienyl)zirconium dichloride and 0.005 mmol of the above-mentioned transition metal compound (1). As a result, 13.8 g of a polymer having an Mw of $1.8 \times 10^5$ and an Mw/Mn of 4.8 were obtained.

Comparative Example 3

Ethylene and propylene were polymerized in the same manner as in Example 2 except that 0.001 mmol of bis (indenyl)zirconium dichloride was used alone in place of the mixture of 0.001 mmol of bis(indenyl)zirconium dichloride and 0.005 mmol of the above-mentioned transition metal compound (1). As a result, 7.3 g of a polymer having an Mw of $3.3 \times 10^5$ and an Mw/Mn of 2.9 were obtained.

Example 3

Ethylene and propylene were polymerized in the same manner as in Example 1 except that a mixture of 0.001 mmol of bis(1,3-dimethylcyclopentadienyl)hafnium dichloride and 0.005 mmol of a transition metal compound of formula (2) below (transition metal compound (2)) was used in place of the mixture of 0.0005 mmol of bis(1,2,4-trimethylcyclopentadienyl)zirconium dichloride and 0.005 mmol of the above-mentioned transition metal compound (1). As a result, 8.2 g of a polymer having an Mw of $2.1 \times 10^5$ and an Mw/Mn of 4.2 were obtained.

(2)

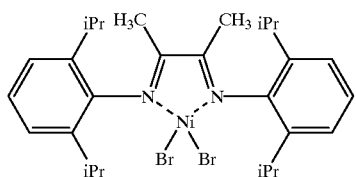

Comparative Example 4

Ethylene and propylene were polymerized in the same manner as in Example 3 except that 0.001 mmol of bis(1,3-dimethylcyclopentadienyl)hafnium dichloride was used alone in place of the mixture of 0.001 mmol of bis(1,3-dimethylcyclopentadienyl)hafnium dichloride and 0.005 mmol of the above-mentioned transition metal compound (2). As a result, 4.9 g of a polymer having an Mw of $3.2 \times 10^5$ and an Mw/Mn of 2.3 were obtained.

Comparative Example 5

Ethylene and propylene were polymerized in the same manner as in Example 3 except that 0.005 mmol of the above-mentioned transition metal compound (2) was used in place of the mixture of 0.001 mmol of bis(1,3-dimethylcyclopentadienyl)hafnium dichloride and 0.005 mmol of the above-mentioned transition metal compound (2). As a result, 3.9 g of a polymer having an MW of $7.8 \times 10^4$ and an Mw/Mn of 1.9 were obtained.

Example 4

240 ml of toluene and then 10 ml of 1-octene were placed in a 500-ml glass autoclave thoroughly purged with nitrogen. Ethylene was passed through the autoclave at a rate of 200 l/hr at 25° C. for 10 minutes. Thereafter, 1.25 mmol, in terms of aluminum atom, of methylaluminoxane, and then a mixture of 0.0005 mmol of bis(1,2,4-trimethylcyclopentadienyl)zirconium dichloride and 0.005 mmol of transition metal compound (1), were added to start polymerization. Polymerization was carried out at 25° C. under atmospheric pressure for 10 minutes while continuously feeding ethylene gas at a rate of 200 l/hr. After the end of polymerization, a small amount of methanol was added to stop the polymerization. The polymer solution was then added to a large excess of methanol to precipitate a polymer, and the polymer was dried at 130° C. under reduced pressure for 12 hours. As a result, 3.9 g of a polymer having an Mw of $1.5 \times 10^5$ and an Mw/Mn of 4.6 were obtained.

Comparative Example 6

Ethylene and 1-octene were polymerized in the same manner as in Example 4 except that 0.0005 mmol of bis(1,2,4-trimethylcyclopentadienyl)zirconium dichloride was used alone in place of the mixture of 0.0005 mmol of bis(1,2,4-trimethylcyclopentadienyl)zirconium dichloride and 0.005 mmol of the above-mentioned transition metal compound (1). As a result, 2.2 g of a polymer having an Mw of $2.5 \times 10^5$ and an Mw/Mn of 2.0 were obtained.

Comparative Example 7

Ethylene and 1-octene were polymerized in the same manner as in Example 4 except that 0.005 mmol of the above-mentioned transition metal compound (1) was used alone in place of the mixture of 0.0005 mmol of bis(1,2,4-trimethylcyclopentadienyl)zirconium dichloride and 0.005 mmol of the above-mentioned transition metal compound (1). As a result, 1.8 g of a polymer having an Mw of $5.2 \times 10^4$ and an Mw/Mn of 1.9 were obtained.

Example 5

250 ml of toluene were placed in a 500-ml glass autoclave thoroughly purged with nitrogen and a mixed gas of ethylene and propylene (120 l/hr and 80 l/hr, respectively) was passed through the autoclave at 25° C. for 10 minutes. Thereafter, 0.25 mmol, in terms of aluminum atom, of triisobutylaluminum, then a mixture of 0.0002 mmol of bis(1,3-dimethylcyclopentadienyl)zirconium dichloride and 0.005 mmol of the above-mentioned transition metal compound (1), and further 0.006 mmol of triphenylcarbenium tetrakis(pentafluorophenyl)borate, were added to start polymerization. Polymerization was carried out at 25° C. under atmospheric pressure for 30 minutes while continuously feeding the mixed gas of ethylene and propylene. After the end of polymerization, a small amount of methanol was added to stop the polymerization. The polymer solution was then added to a large excess of methanol to precipitate a polymer, and the polymer was dried at 130° C. under reduced pressure for 12 hours. As a result, 7.7 g of a polymer having an Mw of $1.6 \times 10^5$ and an Mw/Mn of 4.4 were obtained.

Comparative Example 8

Ethylene and propylene were polymerized in the same manner as in Example 5 except that 0.0002 mmol of bis(1,3-dimethylcyclopentadienyl)zirconium dichloride was used alone in place of the mixture of 0.0002 mmol of bis(1,3-dimethylcyclopentadienyl)zirconium dichloride and 0.005 mmol of the above-mentioned transition metal compound (1) and the amount used of triphenylcarbenium tetrakis(pentafluorophenyl)borate was changed from 0.006 mmol to 0.0004 mmol. As a result, 4.2 g of a polymer having an Mw of $2.6 \times 10^5$ and an Mw/Mn of 2.2 were obtained.

Comparative Example 9

Ethylene and propylene were polymerized in the same manner as in Example 5 except that 0.005 mmol of the above-mentioned transition metal compound (1) was used alone in place of the mixture of 0.0002 mmol of bis(1,3-dimethylcyclopentadienyl)zirconium dichloride and 0.005 mmol of the above-mentioned transition metal compound (1). As a result, 3.7 g of a polymer having an Mw of $5.6 \times 10^4$ and an Mw/Mn of 1.9 were obtained.

Example 6

Preparation of titanium catalyst component (a-1) 5.1 g of commercially available anhydrous magnesium chloride and 194 ml of decane were placed in a 400-ml glass flask and 18.8 ml of ethanol were dropwise added over 10 minutes while stirring. After the end of dropwise addition, stirring was carried out for 1 hour at room temperature. Thereafter, 17.5 ml of diethylaluminum chloride diluted with 20 ml of decane were dropwise added over 1 hour while keeping the internal temperature of the system at 35 to 40° C. After the end of dropwise addition, the system was stirred further for 1 hour at room temperature. 70.6 ml of titanium tetrachloride were dropwise added over 30 minutes and then the temperature of the system was raised to 80° C. and stirring was continued at 80° C. for 2 hours. The reaction mixture was then filtered through a glass filter with jacket maintained at a temperature of 80° C. and washed a few times with decane. As a result, a solid titanium catalyst component (a-1) was obtained, which contained 4.8 wt. % of titanium, 14 wt. % of magnesium, 57 wt. % of chlorine, 2.2 wt. % of aluminum, and 9.7 wt. % of ethoxy group.

Polymerization 250 ml of toluene were placed in a 500-ml glass autoclave thoroughly purged with nitrogen and a mixed gas of ethylene and propylene (160 l/hr and 40 l/hr, respectively) was passed through the autoclave at 50° C. for 10 minutes. Thereafter, 1.25 mmol, in terms of Al atom, of methylaluminoxane, and then 0.004 g-atom, in terms of titanium atom, of the titanium catalyst component (a-1) obtained above and 0.002 mmol of the above-mentioned transition metal compound (1), were added to start polymerization. Polymerization was carried out at 50° C. under atmospheric pressure for 1 hour while continuously feeding the mixed gas of ethylene and propylene. After the end of polymerization, a small amount of methanol was added to stop the polymerization. The polymer solution was then added to a large excess of methanol to precipitate a polymer, and the polymer was dried at 130° C. under reduced pressure for 12 hours. As a result, 6.1 g of a polymer having an Mw of $2.4 \times 10^5$ and an Mw/Mn of 8.9 were obtained.

Comparative Example 10

Ethylene and propylene were polymerized in the same manner as in Example 6 except that 0.004 g-atom, in terms of titanium atom, of the above-mentioned titanium catalyst component (a-1) was used alone in place of 0.004 g-atom, in terms of titanium atom, of the above-mentioned titanium catalyst component (a-1) and 0.002 mmol of the above-mentioned transition metal compound (1). As a result, 2.4 g of a polymer having an Mw of $4.2 \times 10^5$ and an Mw/Mn of 5.9 were obtained.

Comparative Example 11

Ethylene and propylene were polymerized in the same manner as in Example 6 except that 0.002 mmol of the above-mentioned transition metal compound (1) was used alone in place of 0.004 g-atom, in terms of titanium atom, of the above-mentioned titanium catalyst component (a-1) and 0.002 mmol of the above-mentioned transition metal compound (1). As a result, 3.9 g of a polymer having an Mw of $3.8 \times 10^4$ and an Mw/Mn of 1.8 were obtained.

Example 7

250 ml of toluene were placed in a 500-ml glass autoclave thoroughly purged with nitrogen and a mixed gas of ethylene and butene (160 l/hr and 40 l/hr, respectively) was passed through the autoclave at 50° C. for 10 minutes. Thereafter, 0.4 mmol of diethylaluminum chloride, and then 0.003 g-atom, in terms of titanium atom, of the above-mentioned titanium catalyst component (a-1) and 0.002 mmol of the above-mentioned transition metal compound (2), were added to start polymerization. Polymerization was carried out at 50° C. under atmospheric pressure for 1 hour while continuously feeding the mixed gas of ethylene and butene. After the end of polymerization, a small amount of methanol was added to stop the polymerization. The polymer solution was then added to a large excess of methanol to precipitate a polymer, and the polymer was dried at 130° C. under reduced pressure for 12 hours. As a result, 6.2 g of a polymer having an Mw of $1.9 \times 10^5$ and an Mw/Mn of 8.3 were obtained.

Comparative Example 12

Ethylene and butene were polymerized in the same manner as in Example 7 except that 0.003 g-atom, in terms of titanium atom, of the above-mentioned titanium catalyst component (a-1) was used alone in place of 0.003 g-atom, in terms of titanium atom, of the above-mentioned titanium catalyst component (a-1) and 0.002 mmol of the above-mentioned transition metal compound (2). As a result, 3.1 g of a polymer having an Mw of $3.7 \times 10^5$ and an Mw/Mn of 6.1 were obtained.

Comparative Example 13

Ethylene and butene were polymerized in the same manner as in Example 7 except that 0.002 mmol of the above-mentioned transition metal compound (2) was used alone in place of 0.003 g-atom, in terms of titanium atom, of the above-mentioned titanium catalyst component (a-1) and 0.002 mmol of the above-mentioned transition metal compound (2). As a result, 3.4 g of a polymer having an Mw of $2.9 \times 10^4$ and an Mw/Mn of 1.9 were obtained.

Preparation Example 1

(A-i) Preparation of Ethylene Homopolymer

A 100-ml vessel equipped with a magnetic stirrer was purged with argon, and 0.94 mmol of a transition metal compound of formula (3) below and then 0.94 mmol of a boron compound of formula (4) below were placed in the vessel. 50 ml of diethyl ether were added to the mixture while cooling at −78° C. After elevating the temperature to −30° C. and stirring at −30° C. for 45 minutes, the reaction mixture was filtered through a glass filter while cooling at −78° C. The solvent was distilled off from the filtrate at −50 to −30° C. under reduced pressure to obtain 1.31 g of a palladium cation complex of formula (5) below as an orange crystal.

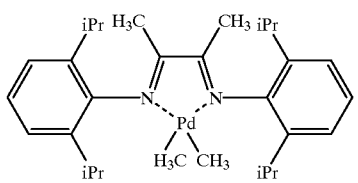
(3)

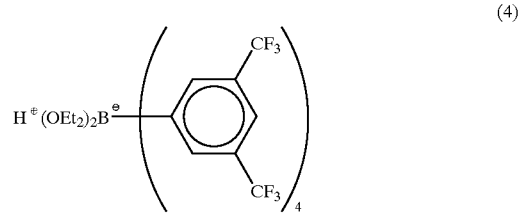
(4)

-continued

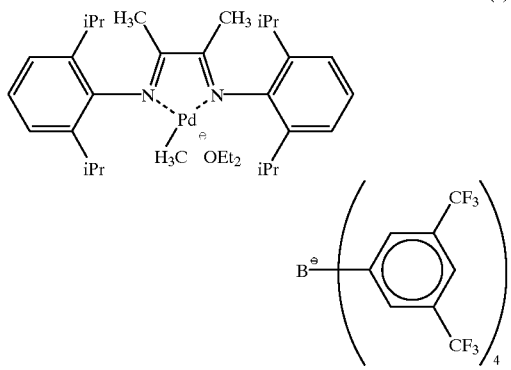

(5)

0.5 mmol of the palladium cation complex obtained above was placed in a 1-liter glass autoclave thoroughly purged with nitrogen, and cooled to −78° C., followed by purging the autoclave with ethylene (1 atm). Thereafter, 500 ml of dry toluene (distilled and purified using $CaH_2$) were added and the mixture was stirred at −65° C. for 30 minutes, followed by elevating the temperature to 25° C. The polymerization was carried out by stirring the mixture at 25° C. for 4 hours while keeping the pressure at 1 atm with ethylene. After the end of polymerization, 3 ml of methanol and 250 ml of hexane were added and the mixture was filtered. The solvents were distilled off from the filtrate under reduced pressure. After diluting the resulting crude product with hexane, the mixture was filtered through a neutral alumina to remove the catalyst. The solvent was distilled off under reduced pressure and the residue was dried under reduced pressure using a vacuum pump. As a result, 63.5 g of an ethylene homopolymer (A-1) shown in Table 1 were obtained.

Preparation Example 2

(A-ii) Preparation of Ethylene-propylene Copolymer 1.5 liters of toluene was placed in a 2-liter glass autoclave thoroughly purged with nitrogen and a mixed gas of ethylene and propylene (240 l/hr and 160 l/hr, respectively) was passed through the autoclave at 20° C. for 10 minutes. Thereafter, 0.5 mmol of triisobutylaluminum, then 5 mmol, in terms of Al atom, of methylaluminoxane, and further 0.02 mmol of the above-mentioned transition metal compound (1), were added to start polymerization. Polymerization was carried out at 25° C. under atmospheric pressure for 1 hour while continuously feeding the mixed gas of ethylene and propylene. After the end of polymerization, a small amount of methanol was added to stop the polymerization. The polymer solution was then added to a large excess of methanol to precipitate a polymer, and the polymer was dried at 130° C. under reduced pressure for 12 hours. As a result, 47.0 g of an ethylene-propylene copolymer (A-ii) shown in Table 1 were obtained.

Preparation Example 3

(A-iii) Preparation of Ethylene-1-butene Copolymer 1.5 liters of toluene was placed in a 2-liter glass autoclave thoroughly purged with nitrogen and a mixed gas of ethylene and 1-butene (240 l/hr and 160 l/hr, respectively) was passed through the autoclave at 20° C. for 10 minutes. Thereafter, 0.5 mmol of triisobutylaluminum, then 5 mmol, in terms of Al atom, of methylaluminoxane, and further 0.02 mmol of the above-mentioned transition metal compound (1), were added to start polymerization. Polymerization was carried out at 20° C. under atmospheric pressure for 1 hour while continuously feeding the mixed gas of ethylene and 1-butene. After the end of polymerization, a small amount of methanol was added to stop the polymerization. The polymer solution was then added to a large excess of methanol to precipitate a polymer, and the polymer was dried at 130° C. under reduced pressure for 12 hours. As a result, 40.7 g of an ethylene-1-butene copolymer (A-iii) shown in Table 1 were obtained.

Example 8

0.2 weight part of tetrakis[methylene-3(3,5-di-t-butyl-4-hydroxyphenyl)propionate]methane (antioxidant) and 0.1 weight part of calcium stearate (hydrochloric acid absorbent) were added to a mixture consisting of 30 weight parts of ethylene homopolymer (A-1) obtained by Preparation Example 1 above, as olefin polymer (A-1), and 70 weight parts of a propylene homopolymer (B-i)(trade name: Hypol J400; produced by Mitsui Petrochemical Industries, Ltd.) shown in Table 1 and produced using a known Ziegler catalyst, as olefin polymer (B). The mixture was then melted and kneaded at 200° C. using a 20 mmφ single screw extruder to obtain an olefin polymer composition.

The tensile modulus (YM) and Izod impact strength (IZ) were measured for the olefin polymer composition obtained. The results are shown in Table 1.

Example 9

An olefin polymer composition was obtained in the same manner as in Example 8 except that ethylene-propylene copolymer (A-ii) obtained by Preparation Example 2 was used in place of ethylene homopolymer (A-i). The results are shown in Table 1.

Example 10

An olefin polymer composition was obtained in the same manner as in Example 8 except that ethylene-1-butene copolymer (A-iii) obtained in Preparation Example 3 was used in place of ethylene homopolymer (A-1). The results are shown in Table 1.

Comparative Example 14

An olefin polymer composition was obtained in the same manner as in Examples 8 to 10 except that the antioxidant and hydrochloric acid absorbent were added to propylene homopolymer (B-i), without using olefin polymer (A-1). The results are shown in Table 1.

Example 11

An olefin polymer composition was obtained in the same manner as in Example 8 except that an ethylene homopolymer (B-ii)(trade name: Hyzex HZ1700J; produced by Mitsui Petrochemical Industries, Ltd.) shown in Table 1 and produced using a known Ziegler catalyst was used in place of propylene homopolymer (B-i). The results are shown in Table 1.

Comparative Example 15

An olefin polymer composition was obtained in the same manner as in Example 11 except that the antioxidant and hydrochloric acid absorbent was added to ethylene homopolymer (A-ii), without using olefin polymer (A-1). The results are shown in Table 1.

TABLE 1

|  | Ex. 8 | Ex. 9 | Ex. 10 | Comp. Ex. 14 |
|---|---|---|---|---|
| (A-1) Olefin polymer | (A-i) Ethylene homo- polymer | (A-ii) Ethylene- propylene copolymer | (A-iii) Ethylene-1- butene copolymer |  |
| Intrinsic viscosity [η] (dl/g) | 1.5 | 1.8 | 1.6 |  |
| Glass transition temperature Tg (°C.) | −78 | −58 | −62 |  |
| Density (g/cm³) | 0.855 | 0.856 | 0.860 |  |
| (B) Other olefin polymer |  | (B-i) Propylene homopolymer |  |  |
| Intrinsic viscosity [η] (dl/g) |  | 2.6 |  |  |
| Melting point Tm (°C.) |  | 160 |  |  |
| Density (g/cm³) |  | 0.903 |  |  |
| YM (MPa) | 490 | 500 | 520 | 1737 |
| IZ (J/m) | not broken | not broken | not broken | 37 |

|  | Ex. 11 | Comp. Ex. 15 |
|---|---|---|
| (A-1) Olefin polymer | (A-i) Ethylene homopolymer |  |
| Intrinsic viscosity [η] (dl/g) | 1.5 |  |
| Glass transition temperature Tg (°C.) | −78 |  |
| Density (g/cm³) | 0.855 |  |
| (B) Other olefin polymer |  | (B-ii) Ethylene homopolymer |
| Intrinsic viscosity [η] (dl/g) |  | 1.5 |
| Melting point Tm (°C.) |  | 135 |
| Density (g/cm³) |  | 0.968 |
| YM (MPa) | 375 | 1330 |
| IZ (J/m) | not broken | 50 |

Preparation Example 4

(A-iv) Preparation of Ethylene Homopolymer 1.5 liters of toluene were placed in a 2-liter glass autoclave thoroughly purged with nitrogen and ethylene was passed through the autoclave at a rate of 200 l/hr for 10 minutes at 25° C. Thereafter, 0.5 mmol of triisobutylaluminum, and then 5 mmol, in terms of Al atom of methylaluminoxane and 0.02 mmol of a transition metal compound of formula (6) below, were added to start polymerization. Polymerization was carried out at 25° C. under atmospheric pressure for 1 hour while continuously feeding ethylene gas. After the end of polymerization, a small amount of methanol was added to stop the polymerization. The polymer solution was then added to a large excess of methanol to precipitate a polymer, and the polymer was dried at 80° C. under reduced pressure for 12 hours. As a result, 42.7 g of an ethylene homopolymer (A-iv) shown in Table 2 were obtained.

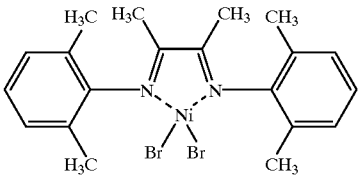

(6)

Preparation Example 5

(A-v) Preparation of Ethylene-1-octene Copolymer 1.5 liters of toluene were placed in a 2-liter of glass autoclave thoroughly purged with nitrogen and then 15 ml of 1-octene were added. Ethylene was passed through the autoclave at a rate of 200 l/hr at 5° C. for 10 minutes. Thereafter, 0.5 mmol of triisobutylaluminum, 7.5 mmol, in terms of Al atom, of methylaluminoxane, and 0.03 mmol of the above-mentioned transition metal compound (1), were added to start polymerization. Polymerization was carried out at 50° C. under atmospheric pressure for 1 hour while continuously feeding ethylene gas. After the end of polymerization, a small amount of methanol was added to stop the polymerization. The polymer solution was then added to a large excess of methanol to precipitate a polymer, and the polymer was dried at 80° C. under reduced pressure for 12 hours. As a result, 41.3 g of an ethylene-1-octene copolymer (A-v) shown in Table 1 were obtained.

Preparation Example 6

(A-vi) Preparation of Ethylene Homopolymer 1.5 liters of toluene were placed in a 2-liter glass autoclave thoroughly purged with nitrogen and a mixed gas of ethylene and hydrogen (200 l/hr and 2 l/hr, respectively) was passed through the autoclave at 5° C. for 10 minutes. Thereafter, 0.5 mmol of triisobutylaluminum, 5 mmol, in terms of Al atom, of methylaluminoxane, and 0.01 mmol of the above-mentioned transition metal compound (1), were added to start polymerization. Polymerization was carried out at 5° C. under atmospheric pressure for 1 hour while continuously feeding the mixed gas of ethylene and hydrogen. After the end of polymerization, a small amount of methanol was added to stop the polymerization. The polymer solution was then added to a large excess of methanol to precipitate a polymer, and the polymer was dried at 80° C. under reduced pressure for 12 hours. As a result, 51.4 g of an ethylene homopolymer (A-vi) shown in Table 2 were obtained.

Preparation Example 7

(A-vii) Preparation of Ethylene Homopolymer 1.5 liters of toluene were placed in a 2-liter glass autoclave thoroughly purged with nitrogen and ethylene was passed through the autoclave at a rate of 200 l/hr for 10 minutes at 10° C. Thereafter, 0.5 mmol of triisobutylaluminum, 5 mmol, in terms of Al atom, of methylaluminoxane, and 0.01 mmol of the above-mentioned transition metal compound (1), were added to start polymerization. Polymerization was carried out at 10° C. under atmospheric pressure for 1 hour while continuously feeding ethylene gas. After the end of polymerization, a small amount of methanol was added to stop the polymerization. The polymer solution was then added to a large excess of methanol to precipitate a polymer, and the polymer was dried at 80° C. under reduced pressure for 12 hours. As a result, 56.1 g of an ethylene homopolymer (A-vii) were obtained.

Example 12

0.2 weight part of tetrakis[methylene-3(3,5-di-t-butyl-4-hydroxyphenyl)propionate]methane (antioxidant) and 0.1 weight part of calcium stearate (hydrochloric acid absorbent) were added to a mixture consisting of 40 weight parts of ethylene homopolymer (A-iv) obtained by Preparation Example 4 above, as olefin polymer (A-2), and 60 weight parts of an ethylene homopolymer (B-iii) shown in Table 2 and produced using a known Ziegler catalyst, as olefin polymer (B). The mixture was then melted and kneaded at 200° C. using a 20 mmφ single screw extruder to obtain an olefin polymer composition. The melt index (MI) and melt tension (MT) of the obtained polymer composition are shown in Table 2.

This olefin polymer composition was molded into a blown film. The film impact strength of the obtained film was measured. The results are shown in Table 2.

Example 13

An olefin polymer composition and a blown film were obtained in the same manner as in Example 12 except that 80 weight parts of ethylene-1-octene copolymer (A-v) obtained by Preparation Example 5, as olefin polymer (A-2), and 20 weight parts of an ethylene homopolymer (B-iv) shown in Table 2 and produced by a high-pressure radical method, as olefin polymer (B). The results are shown in Table 2.

Example 14

An olefin polymer composition and a blown film were obtained in the same manner as in Example 12 except that 34 weight parts of ethylene homopolymer (A-vi) obtained by Preparation Example 6, as olefin polymer (A-2), and 53 weight parts of ethylene-1-hexene copolymer (B-v) shown in Table 2 and produced using a known metallocene catalyst, and 12 weight parts of ethylene homopolymer (B-vi) shown in Table 2 and produced by a high-pressure radical method, as olefin polymer (B). The results are shown in Table 2.

Example 15

An olefin polymer composition and a blown film were obtained in the same manner as in Example 12 except that 90 weight parts of ethylene homopolymer (A-vii) obtained by Preparation Example 7, as olefin polymer (A-2), and 10 weight parts of an ethylene-1-butene copolymer (B-vii) shown in Table 2 and produced using a known vanadium catalyst, as olefin polymer (B). The results are shown in Table 2.

TABLE 2

| | Ex. 12 | Ex. 13 |
|---|---|---|
| (A-2) Olefin polymer | (A-iv) Ethylene homopolymer | (A-v) Ethylene-1-octene copolymer |
| Intrinsic viscosity [η] (dl/g) | 1.9 | 1.6 |
| Glass transition temperature Tg (°C.) | 84 | 115 |
| Density (g/cm³) | 0.900 | 0.918 |
| (B) Other olefin polymer | (B-iii) Ethylene homopolymer | (B-iv) Ethylene homopolymer |
| Intrinsic viscosity [η] (dl/g) | 1.5 | 1.1 |
| Melting point Tm (°C.) | 135 | 106 |
| Density (g/cm³) | 0.970 | 0.920 |
| MI (g/10 min.) | 2.8 | 3.4 |
| MT (mM) | 1.5 | 2.5 |
| Film impact strength (kJ/m) | 28.5 | 30.4 |

| | Ex. 14 | Ex. 15 |
|---|---|---|
| (A-2) Olefin polymer | (A-vi) Ethylene homopolymer | (A-vii) Ethylene homopolymer |
| Intrinsic viscosity [η] (dl/g) | 0.7 | 1.6 |
| Glass transition temperature Tg (°C.) | 126 | 118 |
| Density (g/cm³) | 0.944 | 0.927 |
| (B) Other olefin polymer | (B-v) Ethylene-1-hexene copolymer | (B-vi) Ethylene homopolymer | (B-vii) Ethylene-1-butene copolymer |
| Intrinsic viscosity [η] (dl/g) | 1.5 | 1.2 | 1.8 |
| Melting point Tm (°C.) | 120 | 111 | 70 |
| Density (g/cm³) | 0.916 | 0.924 | 0.885 |
| MI (g/10 min.) | | 1.1 | 1.2 |
| MT (mM) | | 3.6 | 3.0 |
| Film impact strength (kJ/m) | 23.5 | 27.3 |

What is claimed is:

1. An olefin polymerization catalyst comprising:
   (a) (a-1) a compound of a transition metal from Group 4 of the periodic table, which contains a ligand having a cyclopentadienyl skeleton, or
   (a-2) a titanium catalyst component containing magnesium, titanium, and halogen,
   (b) a compound of a transition metal from any of Groups 8 to 10 of the periodic table, expressed by the general formula (I) below,
   (c) at least one compound selected from among (c-1) organic aluminum oxycompounds, (c-2) alkylboronic acid derivatives, and (c-3) compounds reacting with the transition metal compound to form an ion pair, and if necessary,
   (d) an organometallic compound:

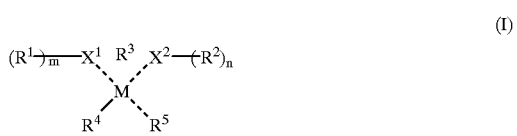

(I)

wherein M indicates a transition metal atom from any of Groups 8 to 10 of the periodic table, $X^1$ and $X^2$ may be the same as or different from each other and are each a nitrogen atom or a phosphorus atom, $R^1$ and $R^2$ may be the same as or different from each other and are each a hydrogen atom or hydrocarbon group, m and n may be the same as or different from each other and are each a value of 1 or 2 that satisfies the valence of $X^1$ and $X^2$, respectively, R³ is a group that binds X¹ and X² and indicates

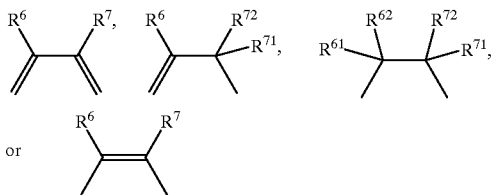

(where $R^6$, $R^7$, $R^{61}$, $R^{62}$, $R^{71}$, and $R^{72}$ may be the same as or different from each other and are each a hydrogen atom or hydrocarbon group), $R^4$ and $R^5$ may be the same as or different from each other and are each a hydrogen atom, halogen atom, hydrocarbon group, $-OR^8$, $-SR^9$, $-N(R^{10})_2$, or $-P(R^{11})_2$ (where each of $R^8$ to $R^{11}$ indicates an alkyl group, cycloalkyl group, aryl group, aralkyl group, or organic silyl group, the groups $R^{10}$ may be bonded mutually to form a ring, and the groups $R^{11}$ may be bonded mutually to form a ring), $R^4$ and $R^5$ may be bonded to each other to form a ring, and two or more among $R^1$, $R^2$, $R^6$ (or $R^{61}$, $R^{62}$), and $R^7$ (or $R^{71}$, $R^{72}$) may be bonded to each other to form a ring.

2. An olefin polymerization catalyst as claimed in claim 1, wherein the transition metal compound of the general formula (I) is a compound expressed by the following general formula (I'):

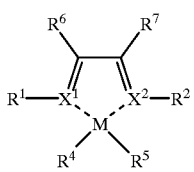

(I')

wherein M indicates a transition metal atom from any of Groups 8 to 10 of the periodic table, $X^1$ and $X^2$ may be the same as or different from each other and are each a nitrogen atom or a phosphorus atom, $R^1$ and $R^2$ may be the same as or different from each other and are each a hydrogen atom or hydrocarbon group, $R^6$ and $R^7$ may be the same as or different from each other and are each a hydrogen atom or hydrocarbon group, $R^4$ and $R^5$ may be the same as or different from each other and are each a hydrogen atom, halogen atom, hydrocarbon group, $-OR^8$, $-SR^9$, $-N(R^{10})_2$, or $-P(R^{11})_2$ (where each of $R^8$ to $R^{11}$ indicates an alkyl group, cycloalkyl group, aryl group, aralkyl group, or organic silyl group, the groups $R^{10}$ may be bonded mutually to form a ring, and the groups $R^{11}$ may be bonded mutually to form a ring), $R^4$ and $R^5$ may be bonded to each other to form a ring, and two or more among $R^1$, $R^2$, $R^6$ and $R^7$ may be bonded to each other to form a ring.

3. An olefin polymerization method characterized in that an olefin is polymerized or copolymerized in the presence of the olefin polymerization catalyst as defined in claim 1 or 2.

4. An olefin polymer composition characterized in being obtained by the method as defined in claim 3.

5. An olefin polymer composition comprising (A-1) 99 to 1 weight parts of a non-crystalline olefin polymer which is produced using a catalyst containing a transition metal compound (b) expressed by the general formula (I) above and which has (1) an intrinsic viscosity [η] within the range of 0.5 to 20 dl/g, as measured in decalin at 135° C., (2) a glass transition temperature (Tg) of −40° C. or less, as measured by a differential scanning calorimeter (DSC), and (3) a density of 0.88 g/cm³ or less; and (B) 1 to 99 weight parts of at least one olefin polymer produced using a catalyst other than mentioned above.

6. An olefin polymer composition as claimed in claim 5, wherein the olefin polymer (B) is produced using a catalyst comprising (a) (a-1) a compound of a transition metal from Group 4 of the periodic table, which contains a ligand having a cyclopentadienyl skeleton, or (a-2) a titanium catalyst component containing magnesium, titanium, and halogen, (c) at least one compound selected from among (c-1) organic aluminum oxycompounds, (c-2) alkylboronic acid derivatives, and (c-3) compounds reacting with the transition metal compound to form an ion pair, and if necessary, (d) an organometallic compound.

7. A heat molded product characterized in being obtained by heat molding the olefin polymer composition as defined in claim 5 or 6.

8. An olefin polymer composition comprising (A-2) 99 to 1 weight parts of a crystalline olefin polymer which is produced using a catalyst containing a transition metal compound (b) expressed by the general formula (I) above and which has (1) an intrinsic viscosity [η] within the range of 0.5 to 20 dl/g, as measured in decalin at 135° C., (2) a melting point (Tm) of 60° C. or more, as measured by a differential scanning calorimeter (DSC), and (3) a density of 0.88 g/cm³ or more; and (B) 1 to 99 weight parts of at least one olefin polymer produced using a catalyst other than that mentioned above.

9. An olefin polymer composition as claimed in claim 8, wherein the olefin polymer (B) is produced using a catalyst comprising (a) (a-1) a compound of a transition metal from Group 4 of the periodic table, which contains a ligand having a cyclopentadienyl skeleton, or (a-2) a titanium catalyst component containing magnesium, titanium, and halogen, (c) at least one compound selected from among (c-1) organic aluminum oxycompounds, (c-2) alkylboronic acid derivatives, and (c-3) compounds reacting with the transition metal compound to form an ion pair, and if necessary, (d) an organometallic compound.

10. A heat molded product characterized in being obtained by heat molding the olefin polymer composition as defined in claim 8 or 9.

11. The olefin polymerization catalyst of claim 1, wherein the compound (a-1) has the following formula (II-1)

$$M^1L_x \ldots \quad (II\text{-}1)$$

wherein $M^1$ indicates a transition metal atom selected from among Group 4 of the periodic table;

x is the valence of the transition metal atom and indicates the number of ligand L coordinated to the transition metal $M^1$; and L is the ligand coordinated to the transition metal, wherein at least one ligand L has a cyclopendtadienyl skeleton and L which do not have a cyclopentradienyl skeleton are a hydrocarbon group of 1 to 20 carbon atoms, a halogenated hydrocarbon group of 1 to °carbon atoms, an oxygen-containing group, a sulfur containing group, a silicon-containing group, a halogen atom or a hydrogen atom.

12. The olefin polymerization catalyst of claim 11, wherein the transition metal $M^1$ is zirconium, titanium, or hafnium.

13. The olefin polymerization catalyst of claim 1, wherein the titanium catalyst component (a-2) further comprises an electron donor.

14. The olefin polymerization catalyst of claim 1, wherein the titanium catalyst component (a-2) is prepared from a compound of the formula:

$$Ti(OR)_zX_{4-n}$$

wherein R indicates a halogen atom; and

X indicates a halogen atom; and n satisfies $0 \leq n \leq 4$.

15. The olefin polymerization catalyst of claim 13, wherein the electron donor is selected form the group consisting of alcohols, phenols, ketones, aldehydes, carboxylic acids, acid halides, esters of organic or inorganic acids, ethers, acid amides, acid anhydrides, ammonia, amines, nitriles, isocyanates, nitrogen-containing ring compounds, and oxygen-containing ring compounds.

* * * * *

UNITED STATES PATENT AND TRADEMARK OFFICE
CERTIFICATE OF CORRECTION

PATENT NO. : 6,136,743
DATED : October 24, 2000
INVENTOR(S) : Kenji Sugimura et al.

It is certified that error appears in the above-identified patent and that said Letters Patent is hereby corrected as shown below:

Title page,
Please isnert category [30] Foreign Application Priority Data, as follows:

-- [30] Foreign Application Priority Data

| April 9, 1996 | [JP] Japan | 86698/1996 |
| April 9, 1996 | [JP] Japan | 86699/1996 |
| April 10, 1996 | [JP] Japan | 88658/1996 |
| April 10, 1996 | [JP] Japan | 88659/1996 -- |

Signed and Sealed this

Eleventh Day of September, 2001

Attest:

*Nicholas P. Godici*

*Attesting Officer*

NICHOLAS P. GODICI
*Acting Director of the United States Patent and Trademark Office*